US009524746B2

(12) United States Patent
Nakano et al.

(10) Patent No.: US 9,524,746 B2
(45) Date of Patent: Dec. 20, 2016

(54) SERVER DEVICE, PLAYBACK DEVICE AND CONTENT DISTRIBUTION SYSTEM

(71) Applicant: Panasonic Corporation, Osaka (JP)

(72) Inventors: Toshihisa Nakano, Osaka (JP); Takahiro Yamaguchi, Osaka (JP); Masataka Minami, Tokyo (JP); Masayuki Kozuka, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 329 days.

(21) Appl. No.: 14/117,205

(22) PCT Filed: Mar. 15, 2013

(86) PCT No.: PCT/JP2013/001793

§ 371 (c)(1),
(2) Date: Nov. 12, 2013

(87) PCT Pub. No.: WO2013/140774

PCT Pub. Date: Sep. 26, 2013

(65) Prior Publication Data

US 2015/0287432 A1 Oct. 8, 2015

Related U.S. Application Data

(60) Provisional application No. 61/613,150, filed on Mar. 20, 2012.

(51) Int. Cl.
*H04N 9/80* (2006.01)
*G11B 20/00* (2006.01)
(Continued)

(52) U.S. Cl.
CPC ......... *G11B 20/00224* (2013.01); *G06F 21/10* (2013.01); *G11B 20/0021* (2013.01);
(Continued)

(58) Field of Classification Search
USPC .................................................. 386/239–262
See application file for complete search history.

(56) References Cited

U.S. PATENT DOCUMENTS 5,392,351 A 2/1995 Hasebe et al.
5,555,304 A 9/1996 Hasebe et al.
(Continued)

FOREIGN PATENT DOCUMENTS

JP 5-257816 10/1993
JP 10-283268 10/1998
(Continued)

OTHER PUBLICATIONS

International Search Report issued Jun. 18, 2013 in corresponding International Application No. PCT/JP2013/001793.

*Primary Examiner* — Hung Dang
(74) *Attorney, Agent, or Firm* — Wenderoth, Lind & Ponack, L.L.P.

(57) ABSTRACT

A server device (100*a*) includes a first generation unit (102*a*) generating binding information binding a user with content, a second acquisition unit (103*a*) acquiring a usage rule, a second generation unit (104*a*) generating a converted title key from a title key by using the binding information and the usage rule, and an output unit (105*a*) outputting content encrypted using the title key, the converted title key and the usage rule to the storage medium (600*a*). A playback device (700*a*) includes a generation unit (704*a*) performing the reverse of the conversion on the converted title key of the storage medium (600*a*) to generate a decrypted title key, by using the binding information received from the server device (100*a*) and the usage rule of the storage medium (600*a*), and a decryption unit (705*a*) decrypting the encrypted content of the storage medium (600*a*) by using the title key.

2 Claims, 67 Drawing Sheets

(51) Int. Cl.

| | |
|---|---|
| ***H04L 9/08*** | (2006.01) |
| ***G06F 21/10*** | (2013.01) |
| ***H04L 29/06*** | (2006.01) |

(52) U.S. Cl.

CPC .. *G11B 20/00086* (2013.01); *G11B 20/00492* (2013.01); *G11B 20/00855* (2013.01); *H04L 9/088* (2013.01); *H04L 9/0866* (2013.01); *H04L 63/061* (2013.01); *H04L 63/0823* (2013.01); *G06F 2221/0717* (2013.01); *H04L 2209/60* (2013.01); *H04L 2463/101* (2013.01)

(56) References Cited

U.S. PATENT DOCUMENTS

| | | | | |
|---|---|---|---|---|
| 5,796,824 | A | 8/1998 | Hasebe et al. | |
| 6,144,743 | A | 11/2000 | Yamada et al. | |
| 7,984,489 | B2 | 7/2011 | Matsuzaki et al. | |
| 2003/0083954 | A1* | 5/2003 | Namba | G06Q 30/0601 705/26.1 |
| 2003/0198351 | A1* | 10/2003 | Foster | G06F 21/10 380/281 |
| 2004/0078586 | A1* | 4/2004 | Sato | G06F 21/10 713/193 |
| 2004/0249768 | A1* | 12/2004 | Kontio | G06F 21/10 705/65 |
| 2006/0174026 | A1* | 8/2006 | Robinson | H04N 7/17336 709/231 |
| 2008/0167954 | A1* | 7/2008 | Kawakami | G06F 21/10 705/14.52 |
| 2011/0202981 | A1* | 8/2011 | Tamai | G06F 21/10 726/6 |

FOREIGN PATENT DOCUMENTS

| | | |
|---|---|---|
| JP | 2006-18335 | 1/2006 |
| JP | 2006-277830 | 10/2006 |

* cited by examiner

Content distribution system
10a
100a
Server device
101a
First acquisition unit
102a
First generation unit
103a
Second acquisition unit
104a
Second generation unit
105a
Output unit
600a
Storage medium
700a
Playback device
701a
Reception unit
702a
Acquisition unit
703a
Read unit
704a
Generation unit
705a
Decryption unit
706a
Playback unit

FIG. 4A

Usage rule 123b

| Usage rule |
|---|
| NO MOVE |
| NO COPY |

FIG. 4B

User table 125b

| User data | | |
|---|---|---|
| User ID | Password | User name |
| A0001 | ab164xy | MaryA Mount |
| A0002 | ef9920 | JohnB River |
| A0003 | di364q1 | JohnD Marine |

FIG. 4C

Binding information table 126b 127b, 122b

| User ID | Binding information |
|---|---|
| A0001 | ef1634 |
| A0002 | ac13ed4 |
| A0003 | 1690afe3 |

500b
600b
Memory card
601b
Controller
602b
Input/output unit
603b
Memory unit
621b
Calculated title key
622b
Usage rule
623b
Encrypted content
505b
Input/output unit
503b
Display unit
504b
Control unit
Processor
502b
Input unit
501b
Transmission/reception unit
Calculated title key, usage rule, encrypted content
Download device
To network

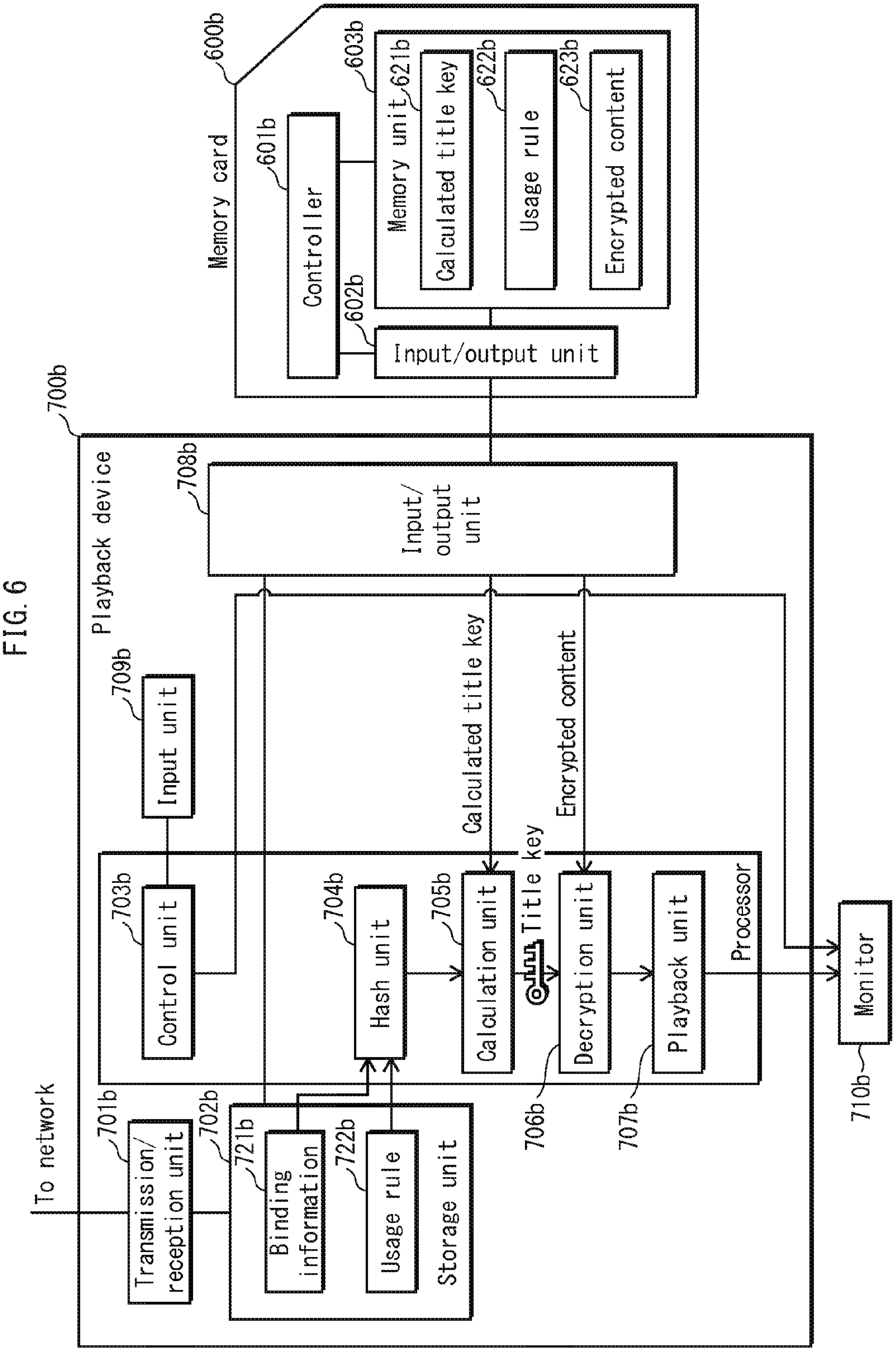

FIG. 6
Memory card
600b
601b
Controller
603b
Memory unit
621b
Calculated title key
622b
Usage rule
623b
Encrypted content
602b
Input/output unit
700b
Playback device
708b
Input/ output unit
709b
Input unit
Calculated title key
Encrypted content
703b
Control unit
704b
Hash unit
705b
Calculation unit
Title key
Decryption unit
Playback unit
Processor
Monitor
706b
707b
710b
To network
701b
Transmission/ reception unit
702b
721b
Binding information
722b
Usage rule
Storage unit

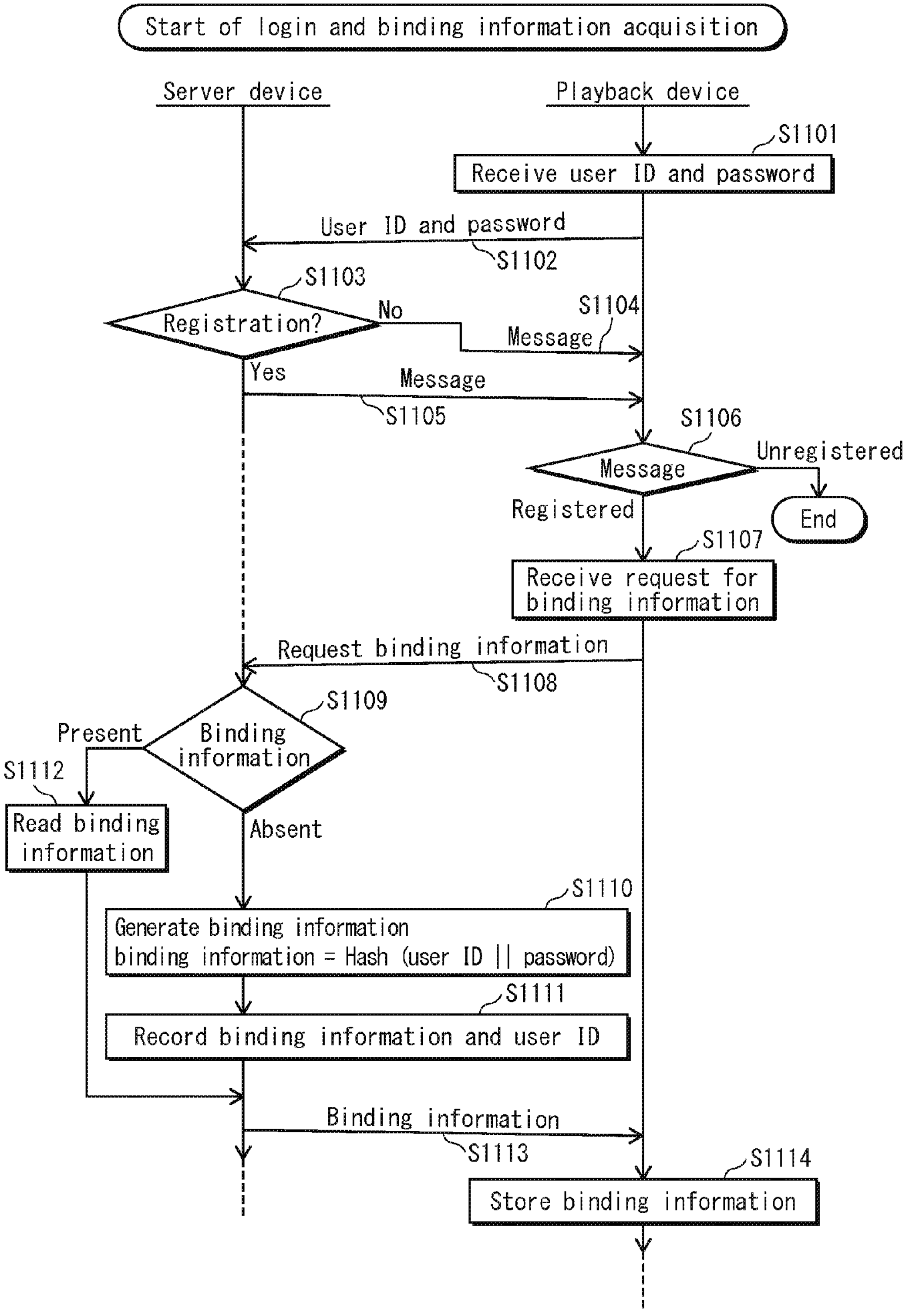

FIG. 7
Start of login and binding information acquisition
Server device
Playback device
S1101
Receive user ID and password
User ID and password
S1102
S1103
Registration?
No
S1104
Message
Yes
Message
S1105
S1106
Message
Unregistered
End
Registered
S1107
Receive request for binding information
Request binding information
S1108
S1109
Binding information
Present
S1112
Read binding information
Absent
S1110
Generate binding information
binding information = Hash (user ID || password)
S1111
Record binding information and user ID
Binding information
S1113
S1114
Store binding information Content distribution system
10c
Key issuing device
200
Permission management device
700
Storage medium device
600
Terminal device
500
Key distribution device
400
Content production device
100
Content distribution device
300

Operation of content production
Edit material
S102
Encrypt and store content
S104
Generate and store title key
S103
Input and store UR
S108
Register content
S107
Generate, provide signature to, and store content identification information
S106
Receive and store pair
S101
Register title key and UR
S109

FIG.14A

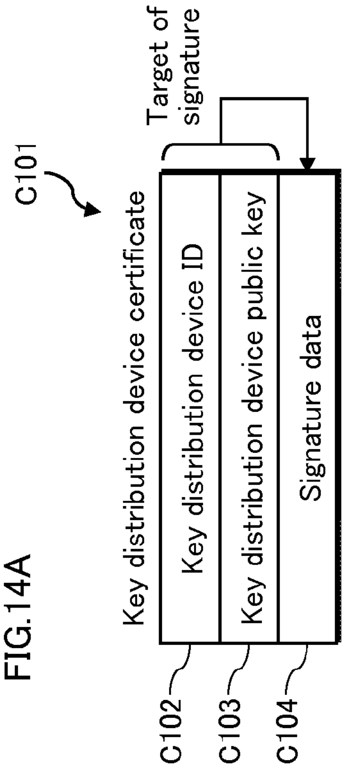

FIG.14B

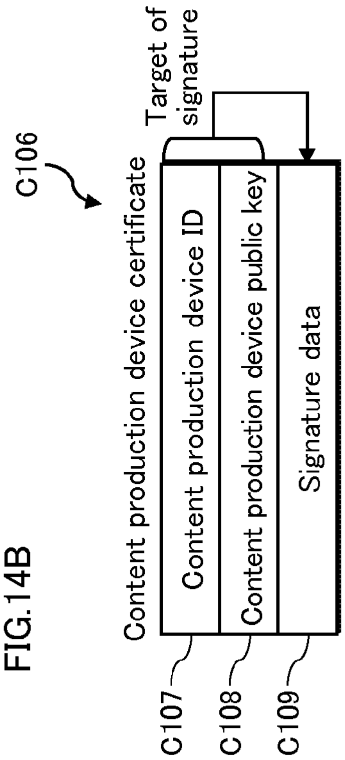

FIG.14C

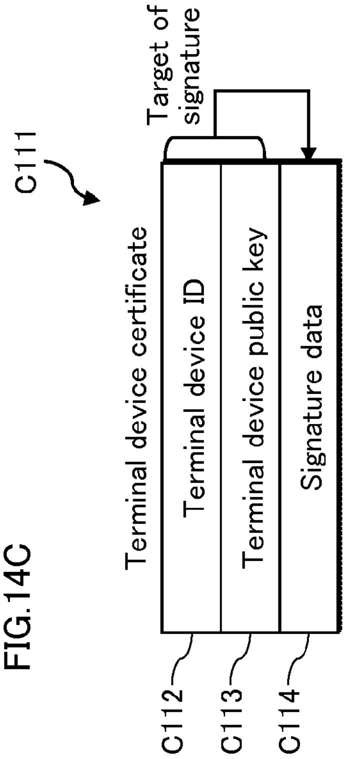

FIG.14D

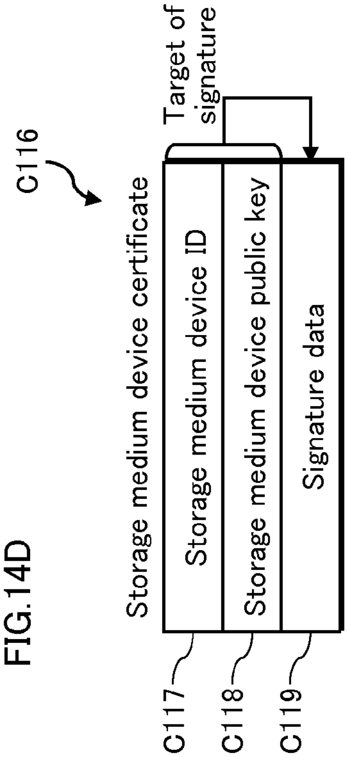

C101
Key distribution device certificate
Key distribution device ID
Key distribution device public key
Signature data
Target of signature
C102
C103
C104
C111
Terminal device certificate
Terminal device ID
Terminal device public key
Signature data
Target of signature
C112
C113
C114

C106
Content production device certificate
Content production device ID
Content production device public key
Signature data
Target of signature
C107
C108
C109

C116
Storage medium device certificate
Storage medium device ID
Storage medium device public key
Signature data
Target of signature
C117
C118
C119

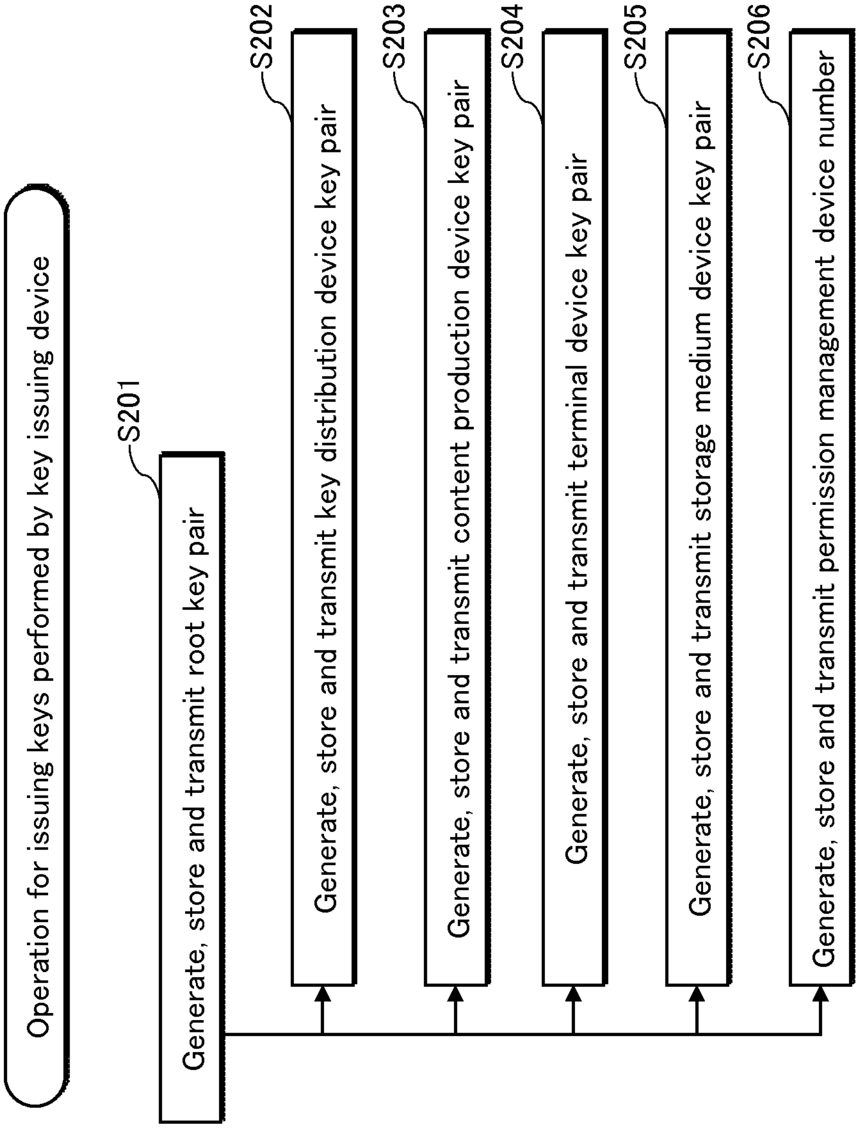

FIG.15
Operation for issuing keys performed by key issuing device
S201
Generate, store and transmit root key pair
S202
Generate, store and transmit key distribution device key pair
S203
Generate, store and transmit content production device key pair
S204
Generate, store and transmit terminal device key pair
S205
Generate, store and transmit storage medium device key pair
S206
Generate, store and transmit permission management device number

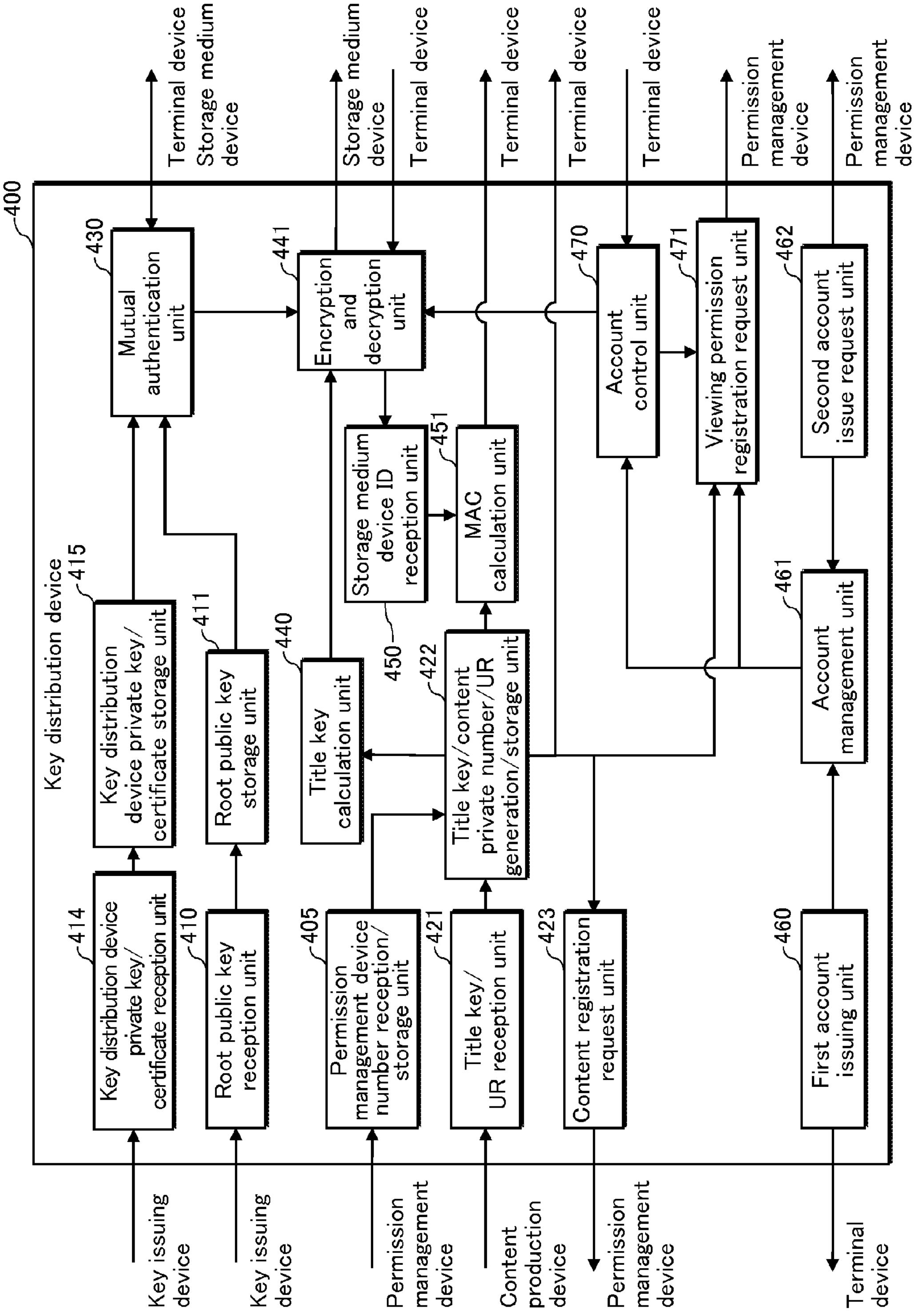

FIG.19
400
Key distribution device
Key issuing device
Key issuing device
Permission management device
Content production device
Permission management device
Terminal device
414
Key distribution device private key/ certificate reception unit
415
Key distribution device private key/ certificate storage unit
410
Root public key reception unit
411
Root public key storage unit
430
Mutual authentication unit
Terminal device
Storage medium device
405
Permission management device number reception/ storage unit
440
Title key calculation unit
441
Encryption and decryption unit
Storage medium device
Terminal device
421
Title key/ UR reception unit
422
Title key/content private number/UR generation/storage unit
450
Storage medium device ID reception unit
451
MAC calculation unit
Terminal device
Terminal device
423
Content registration request unit
470
Account control unit
Terminal device
471
Viewing permission registration request unit
Permission management device
460
First account issuing unit
461
Account management unit
462
Second account issue request unit
Permission management device

| | | |
|---|---|---|
| 1411 | Output control information area | NO MOVE<br>NO COPY<br>Only digital output |
| 1412 | Domain identification information area | 1: Domain<br>(or 0: Non-domain) |
| 1413 | Content private number area | 00 00 00 00 00 00 00 00<br>00 00 00 00 00 00 00 00 |
| 1414 | Permission management device number area | R01 |
| 1415 | Content number area | C01 |

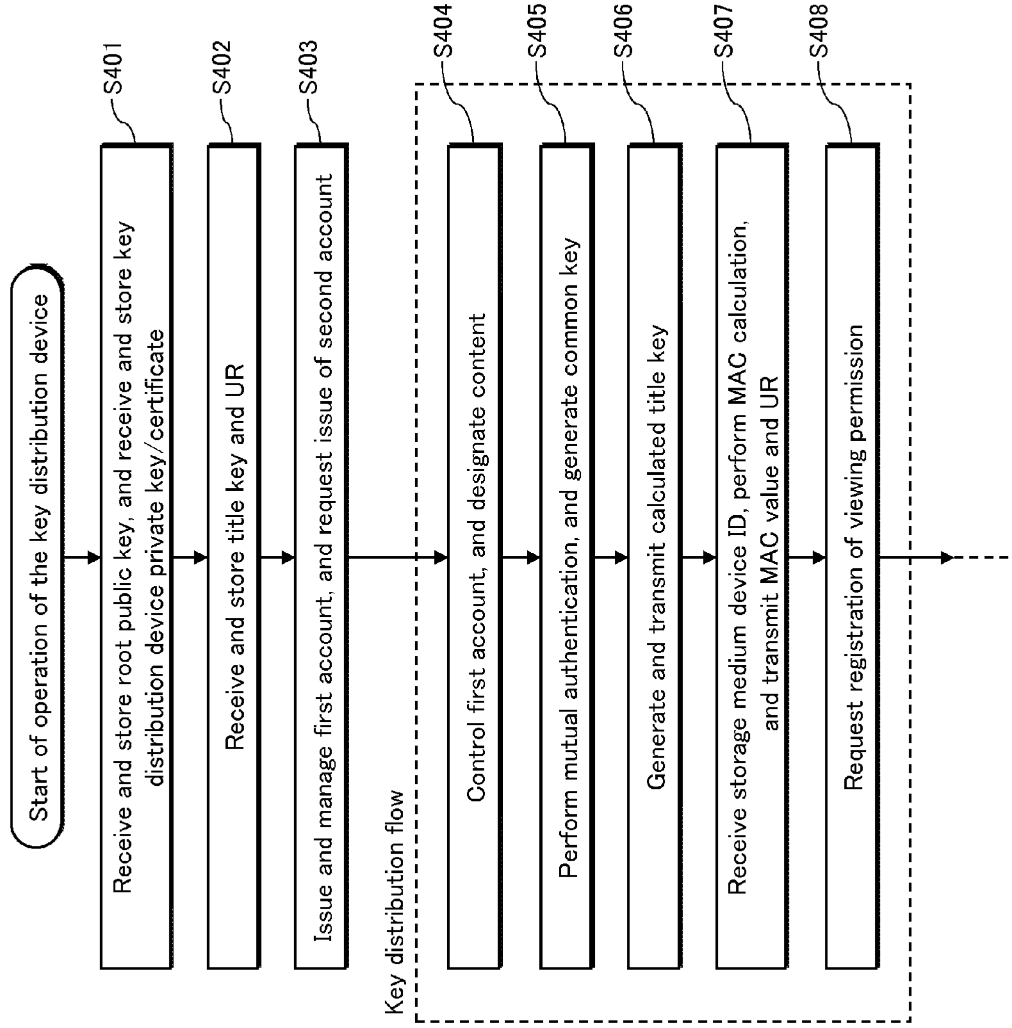

FIG.22
Start of operation of the key distribution device
S401
Receive and store root public key, and receive and store key distribution device private key/certificate
S402
Receive and store title key and UR
S403
Issue and manage first account, and request issue of second account
Key distribution flow
S404
Control first account, and designate content
S405
Perform mutual authentication, and generate common key
S406
Generate and transmit calculated title key
S407
Receive storage medium device ID, perform MAC calculation, and transmit MAC value and UR
S408
Request registration of viewing permission

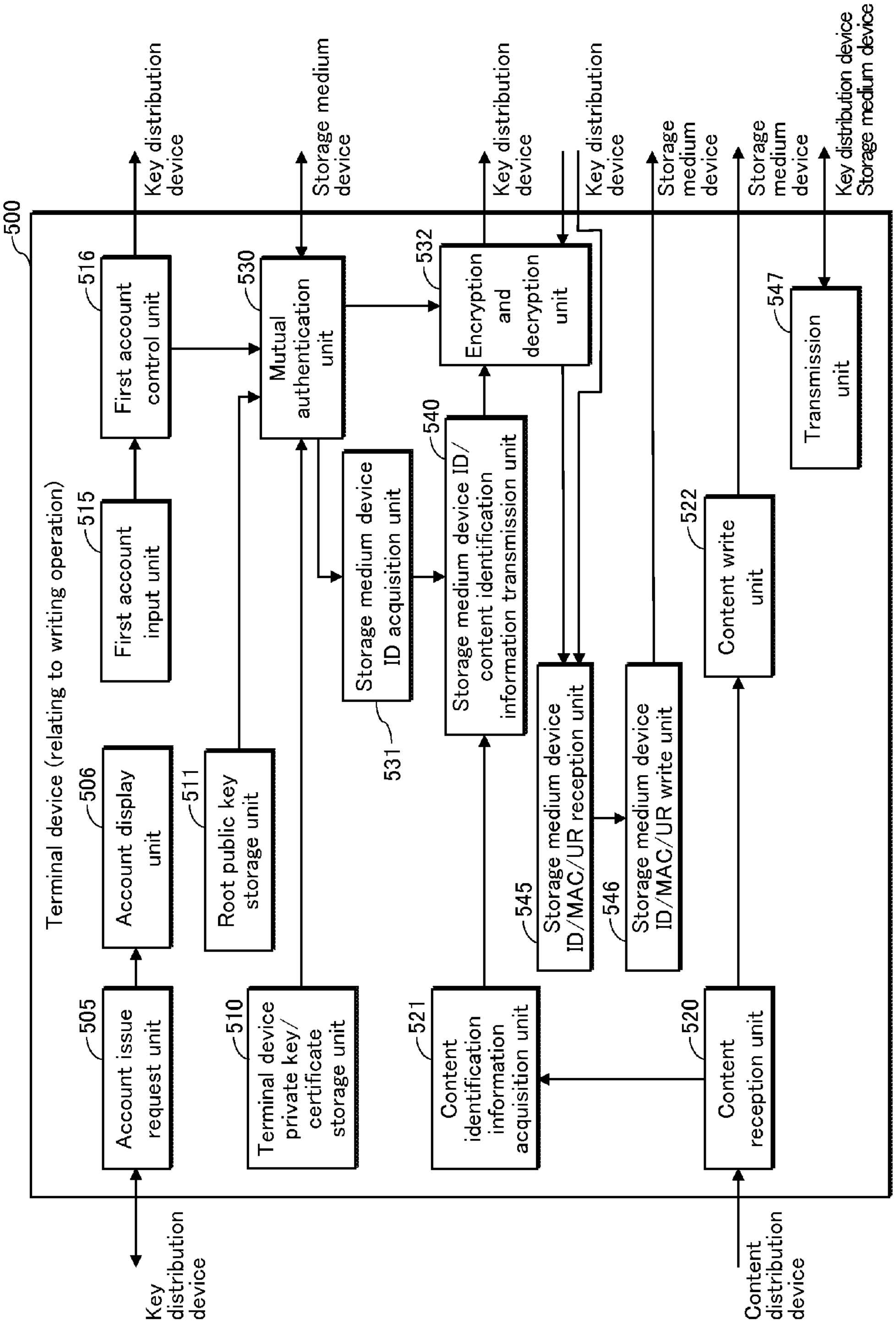

FIG.23
Terminal device (relating to writing operation)
500
505 Account issue request unit
506 Account display unit
515 First account input unit
516 First account control unit
510 Terminal device private key/certificate storage unit
511 Root public key storage unit
530 Mutual authentication unit
531 Storage medium device ID acquisition unit
532 Encryption and decryption unit
540 Storage medium device ID/content identification information transmission unit
545 Storage medium device ID/MAC/UR reception unit
546 Storage medium device ID/MAC/UR write unit
521 Content identification information acquisition unit
520 Content reception unit
522 Content write unit
547 Transmission unit
Key distribution device
Storage medium device
Content distribution device
Key distribution device Storage medium device

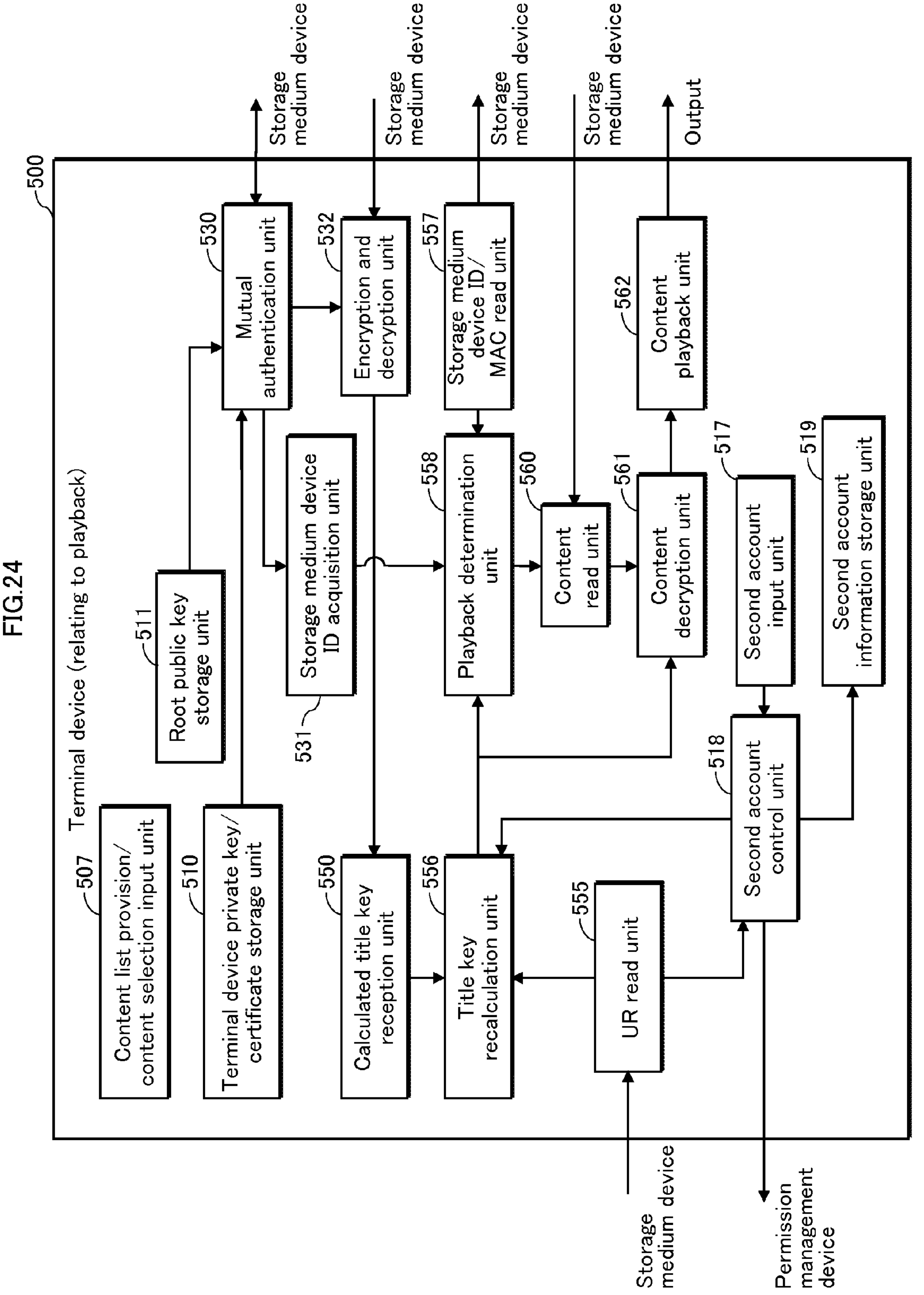

FIG.24
Terminal device (relating to playback)
500
507 Content list provision/ content selection input unit
510 Terminal device private key/ certificate storage unit
511 Root public key storage unit
530 Mutual authentication unit
531 Storage medium device ID acquisition unit
532 Encryption and decryption unit
550 Calculated title key reception unit
555 UR read unit
556 Title key recalculation unit
557 Storage medium device ID/ MAC read unit
558 Playback determination unit
560 Content read unit
561 Content decryption unit
562 Content playback unit
517 Second account input unit
518 Second account control unit
519 Second account information storage unit
Storage medium device
Storage medium device
Storage medium device
Storage medium device
Output
Storage medium device
Permission management device

Second account information

| Account name (1511) | Password (1512) | Content permission information (1513) | | | | |
|---|---|---|---|---|---|---|
| | | Permission management device number (1514) | Content number (1515) | Permission (1516) | Content private number (1517) | Condition (1518) |
| Rio | 54 AA 9B 1F BC CE | R01 | C01 | Present | 68 1D F3 47 12 EA B1 38 9D E8 38 E1 2C 9C E2 A2 | Until March 25, 2012 |
| | | | C02 | Absent | — | — |

1530

Login second account information

| | | |
|---|---|---|
| 1531 | Login permission management device number area | R01 |
| 1532 | Login account name area | Rio |

Account display screen

1550

| First account name (1551) | First account password (1552) | Second account name (1553) | Second account password (1554) |
|---|---|---|---|
| rio1 | BD F4 BA FD 37 31 43 25 | Rio | 54 AA 9B 1F BC CE |

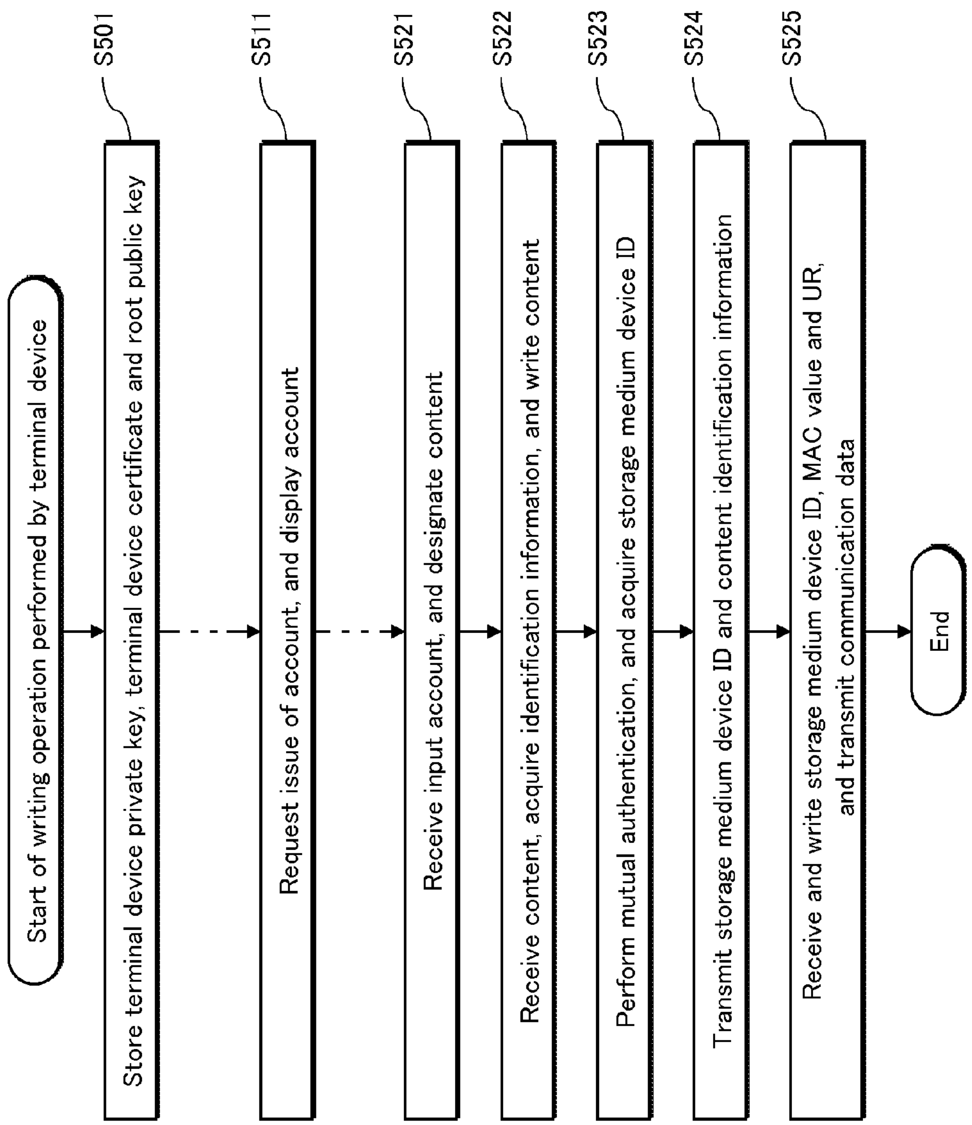

FIG.29
Start of writing operation performed by terminal device
Store terminal device private key, terminal device certificate and root public key
S501
Request issue of account, and display account
S511
Receive input account, and designate content
S521
Receive content, acquire identification information, and write content
S522
Perform mutual authentication, and acquire storage medium device ID
S523
Transmit storage medium device ID and content identification information
S524
Receive and write storage medium device ID, MAC value and UR, and transmit communication data
S525
End

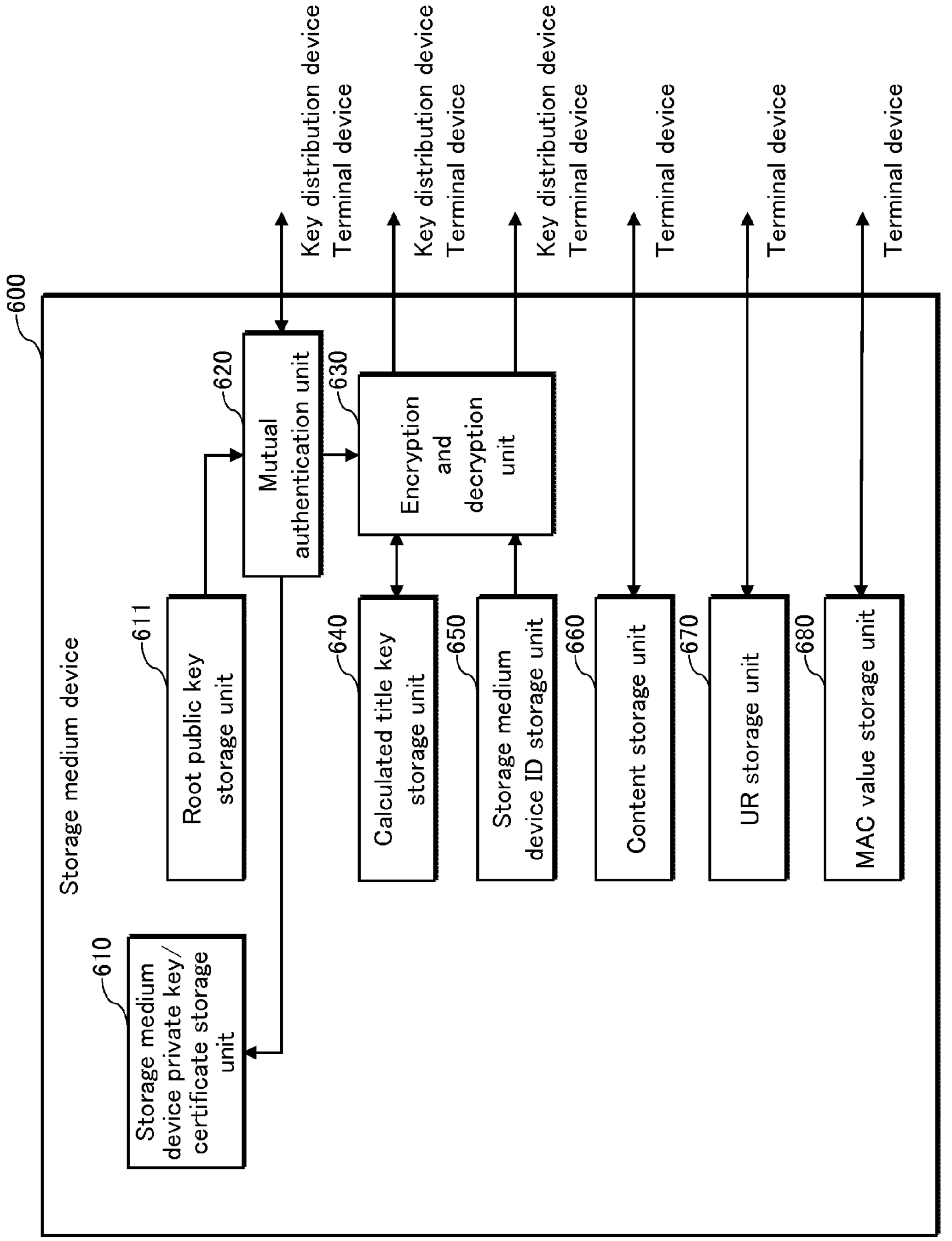

FIG.31
600
Storage medium device
610
Storage medium device private key/ certificate storage unit
611
Root public key storage unit
620
Mutual authentication unit
630
Encryption and decryption unit
640
Calculated title key storage unit
650
Storage medium device ID storage unit
660
Content storage unit
670
UR storage unit
680
MAC value storage unit
Key distribution device
Terminal device
Key distribution device
Terminal device
Key distribution device
Terminal device
Terminal device
Terminal device
Terminal device

Content management information table

| Content number | Title key | Content private number |
|---|---|---|
| C01 | 48 7F 48 75 64 D5 2F D7<br>B9 59 6E 7C 7A 9A 8D BD | 68 1D F3 47 12 EA B1 38<br>9D E8 38 E1 2C 9C E2 A2 |
| C02 | 09 68 47 B8 BD 56 A7 4D<br>C7 0A 2A DC DB E9 89 08 | 0A B7 FA 97 4A 5C 9B 42<br>08 6D 78 A7 92 91 36 43 |
| ... | ... | ... |

Second account management information table

| Account number | Account name | Password |
|---|---|---|
| A01 | Kakeru | FE 47 42 0D FB 47 |
| A02 | Rio | 54 AA 9B 1F BC CE |
| ... | ... | ... |

Viewing permission management information table 1721 1722 1723 1724 1725 1726 1727

Figure 36:
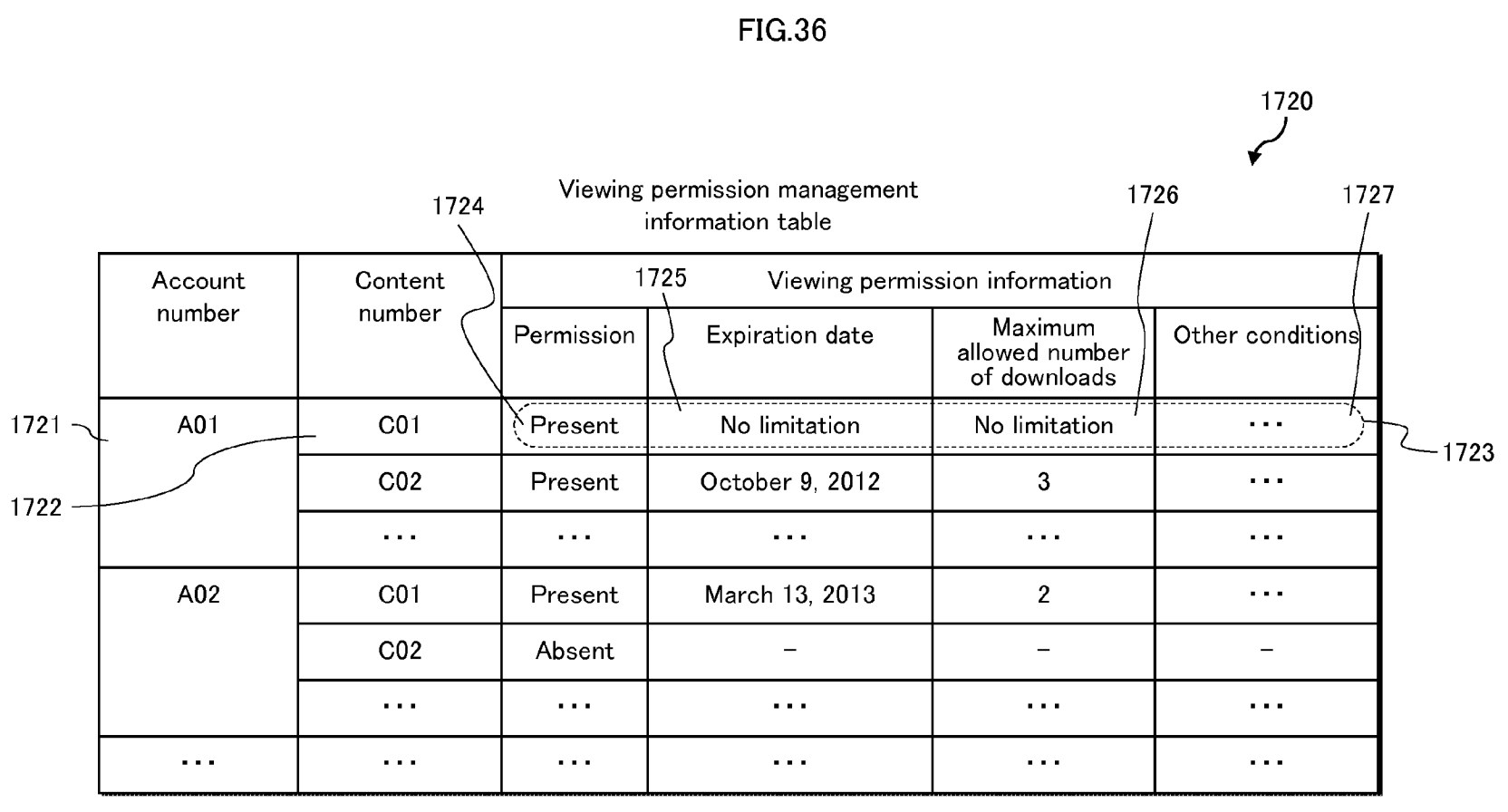

| Account number | Content number | Viewing permission information | | | |
|---|---|---|---|---|---|
| | | Permission | Expiration date | Maximum allowed number of downloads | Other conditions |
| A01 | C01 | Present | No limitation | No limitation | ... |
| | C02 | Present | October 9, 2012 | 3 | ... |
| | ... | ... | ... | ... | ... |
| A02 | C01 | Present | March 13, 2013 | 2 | ... |
| | C02 | Absent | – | – | – |
| | ... | ... | ... | ... | ... |
| ... | ... | ... | ... | ... | ... |

Viewing permission confirmation request data

| | | |
|---|---|---|
| 1731 | Permission management device number area | R01 |
| 1732 | Terminal device certificate area | Terminal device certificate |
| 1733 | Account name area | Kakeru |
| 1734 | Password area | FE 47 42 0D FB 47 |
| 1735 | Content number area | C01 |
| 1736 | Login state area | No automatic logout |

Viewing permission confirmation response data

| | | |
|---|---|---|
| 1741 | Account name area | Kakeru |
| 1742 | Content number area | C01 |
| 1743 | Permission area | Present |
| 1744 | Content private number area | 68 1D F3 47 12 EA B1 38<br>9D E8 38 E1 2C 9C E2 A2 |
| 1745 | Reason area | — |

Viewing permission management information table 1724 1725 1728 1729 17232 1721 1722

| Account number | Content number | Viewing permission information | | | |
|---|---|---|---|---|---|
| | | Permission | Expiration date | Maximum allowed number of logins | Number of logins |
| A01 | C01 | Present | No limitation | No limitation | 6 |
| | C02 | Present | October 9, 2012 | 3 | 1 |
| | ... | ... | ... | ... | ... |
| A02 | C01 | Present | March 13, 2013 | 1 | 1 |
| | C02 | Absent | – | – | – |
| | ... | ... | ... | ... | ... |
| ... | ... | ... | ... | ... | ... |

Viewing permission confirmation request data

| | | |
|---|---|---|
| 1731 | Permission management device number area | R01 |
| 1732 | Terminal device certificate area | Terminal device certificate |
| 1733 | Account name area | Rio |
| 1734 | Password area | 54 AA 9B 1F BC CE |
| 1735 | Content number area | C02 |
| 1736 | Login state area | Keep login for two weeks |

Viewing permission confirmation response data

| | | |
|---|---|---|
| 1741 | Account name area | Rio |
| 1742 | Content number area | C02 |
| 1743 | Permission area | Absent |
| 1744 | Content private number area | — |
| 1745 | Reason area | No viewing permission |

10d
Content distribution system
(while recording content)
3401
Server device
3402
Terminal device
3403
Storage medium device
・Encrypted content
・Title key
・Usage rule
・User ID
・Password
・Content ID
・Encrypted content, title key, usage rule 3401
Server device
3509
Control unit
3501
Transmission/reception unit
3502
Encrypted content storage unit
3503
Title key storage unit
3504
Mutual authentication unit (including key storage unit)
3505
Usage rule storage unit
3506
Usage rule update unit
3507
Content playback permission management unit
3508
User ID management unit 3403
Storage medium device
3702
Encrypted content storage unit
3703
Title key storage unit
3704
Usage rule storage unit
3804
Usage rule
3801
3802
3803
Content number storage area
0x01234567
Binding identification flag storage area
1
Binding information storage area
0xACE482D7

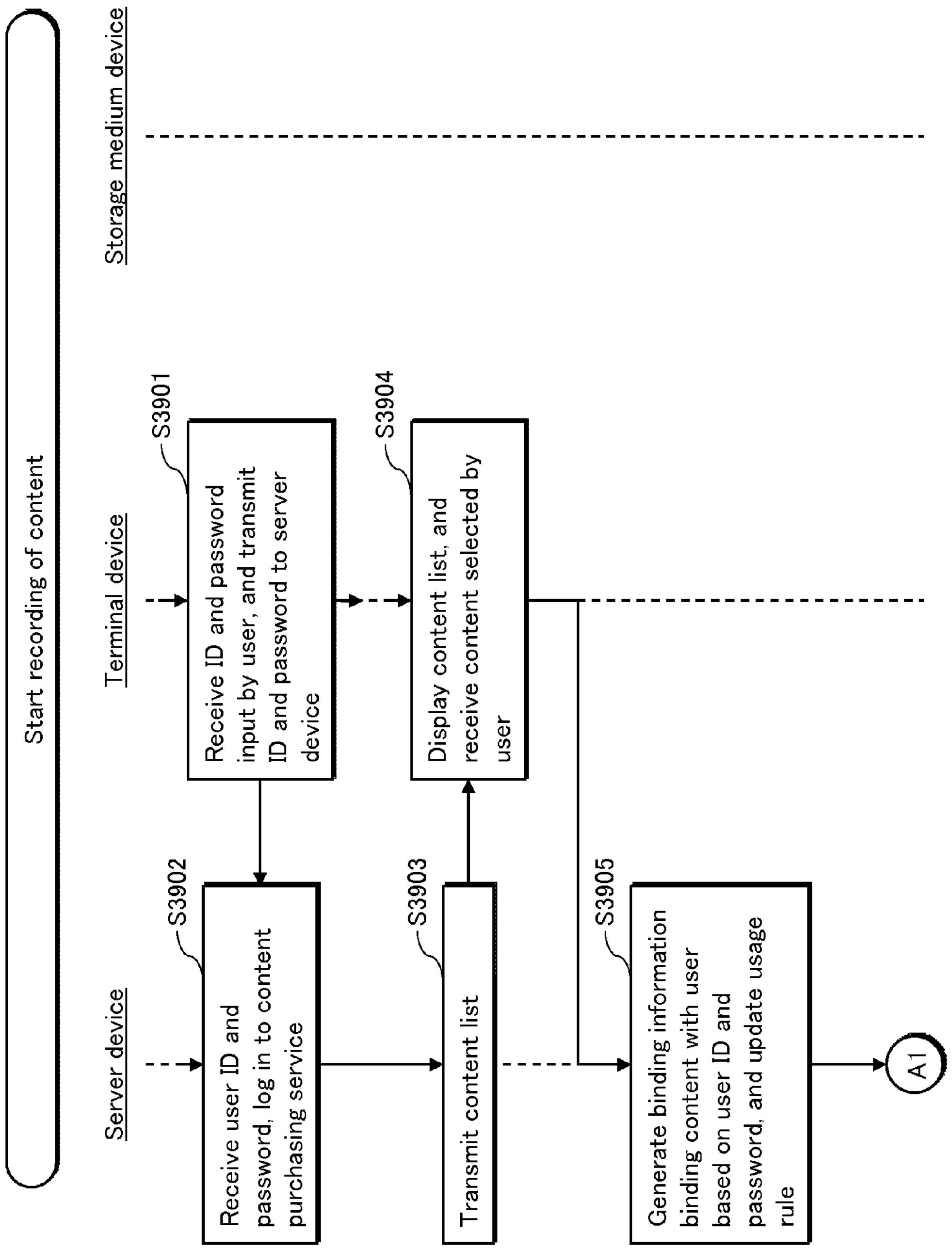

FIG.48
Start recording of content
Server device
Terminal device
Storage medium device
S3901
Receive ID and password input by user, and transmit ID and password to server device
S3902
Receive user ID and password, log in to content purchasing service
S3903
Transmit content list
S3904
Display content list, and receive content selected by user
S3905
Generate binding information binding content with user based on user ID and password, and update usage rule
A1

Content distribution system
(while playing back content (online))
10e
4101
Server device
4102
Terminal device
3403
Storage medium device
·OK or NG
·User ID
· Password
·Content ID
·Encrypted content, title key, usage rule Server device
Terminal device
Storage medium device
B1
B3
S4601
Perform mutual authentication between terminal device and storage medium device
S4602
Perform mutual authentication between terminal device and storage medium device
S4603
Transmit encrypted content and title key
S4604
Receive encrypted content and title key, and perform playback Screen displayed when user is not logged in with user ID

SERVER DEVICE, PLAYBACK DEVICE AND CONTENT DISTRIBUTION SYSTEM

This application is the National Phase of International Application No. PCT/JP2013/001793, filed Mar. 15, 2013, which claims the benefit of U.S. Provisional Application No. 61/613,150, filed Mar. 20, 2012.

TECHNICAL FIELD

The present invention relates to a technology for managing permission that allows a user to use digital content.

TECHNICAL FIELD

Digital content such as movies, music, games and digital books are easily copied. Therefore, there is a demand to prevent unauthorized copying.

According to Patent Literature 1, in a storage medium, a medium unique number that is unique to the storage medium and encrypted digital data are stored. A licenser device generates a medium unique key based on the medium unique number stored in the storage medium, encrypts a decryption key for decrypting the encrypted digital data with the generated medium unique key, and writes the encrypted decryption key to the storage medium as license information. A user device reads the medium unique number from the storage medium, generates the medium unique key based on the read medium unique number, generates the decryption key by decrypting the license information stored in the storage medium with the generated medium unique key, and generates plaintext by decrypting the encrypted digital data stored in the storage medium with the decryption key.

According to this technology, even if an attempt is made to copy the encrypted digital data and the license information stored in the storage medium (hereinafter, referred to as authorized storage medium) to the other storage medium (hereinafter, referred to as unauthorized storage medium), the medium unique number stored in the authorized storage medium cannot be copied to the unauthorized storage medium. Therefore, the medium unique number of the authorized storage medium cannot be read from the unauthorized storage medium. Accordingly, the medium unique key cannot be properly generated, and thus, the decryption key cannot be properly decrypted from the license information. As a result, it is impossible to properly decrypt the encrypted digital data. In this way, unauthorized copying of content is prevented.

CITATION LIST

Patent Literature

[Patent Literature 1]
Japanese Patent Application Publication No. H05-257816
[Patent Literature 2]
U.S. Pat. No. 7,984,489

SUMMARY OF INVENTION

Technical Problem

According to the technology disclosed in Patent Literature 1, any user can decrypt content stored in the storage medium insofar as the user uses the authorized storage medium. Therefore, a user not permitted to use the content stored in the authorized storage medium can use the content fraudulently.

Further, according to the technology disclosed by Patent Literature 1, a user cannot copy the content stored in the authorized storage medium to another storage medium as a back up. Therefore, when the authorized storage medium is damaged, the user has to purchase another authorized storage medium.

The present invention aims to provide a server device that employs an alternative licensing scheme to provide content and a playback device, taking content provider's rights and user convenience into consideration.

Solution to Problem

In order to achieve the above aim, one aspect of the present invention is a content distribution system comprising a playback device and a server device that provides content, wherein the server device includes: a first acquisition unit that acquires unique information that identifies a user; a first generation unit that generates binding information that binds the user identified by the unique information with the content; a second acquisition unit that acquires a usage rule of the content; a second generation unit that performs a conversion that is reversible on a title key to generate a converted title key, by using the binding information and the usage rule; and an output unit that outputs, to a storage medium, the converted title key, the usage rule, and encrypted content generated by encrypting content with the title key, and the playback device includes: a reception unit that receives, from a user, unique information that identifies the user; a third acquisition unit that acquires binding information that binds the user identified by the unique information received by the reception unit, with the content; a read unit that reads the encrypted content, the converted title key and the usage rule from the storage medium; a third generation unit that performs a reverse conversion on the converted title key to generate a title key, by using the acquired binding information and the read usage rule, the reverse conversion being a reverse of the conversion; a decryption unit that decrypts the encrypted content by using the title key; and a playback unit that plays back decrypted content.

Advantageous Effects of Invention

According to this aspect, it is possible to bind the content license with users. It is therefore possible to provide content according to a licensing scheme that achieves a proper balance between the protection of content provider's rights and user convenience.

BRIEF DESCRIPTION OF DRAWINGS

FIG. 4A shows a data structure of a usage rule 123*b*. FIG. 4B shows a data structure of a user table 125*b*. FIG. 4C shows a data structure of a binding information table 126*b*.

FIG. 6 is a block diagram showing structures of a playback device 700*b* and the memory card 600*b*.

FIG. 7 is a sequence diagram for showing a login operation and a binding information acquisition operation.

FIG. 14A shows a data structure of a key distribution device certificate C101. FIG. 14B shows a data structure of a content production device certificate C106. FIG. 14C shows a data structure of a terminal device certificate C111. FIG. 14D shows a data structure of a storage medium device certificate C116.

FIG. 15 is a flowchart showing an operation of the key issuing device 200.

FIG. 19 is a block diagram showing a structure of a key distribution device 400.

FIG. 20 shows a data structure of a UR (usage rule) 1410.

FIG. 22 is a flowchart showing an operation of the key distribution device 400.

FIG. 23 is a block diagram showing components of a terminal device 500 related to writing.

FIG. 24 is a block diagram showing components of the terminal device 500 related to playback.

FIG. 25 shows data structures of second account information 1510 and login second account information 1530.

FIG. 29 is a flowchart showing an operation of the terminal device 500 during writing.

FIG. 31 is a block diagram showing a structure of a storage medium device 600.

FIG. 34 shows a data structure of a content management information table 1700.

FIG. 35 shows a data structure of a second account management information table 1710.

FIG. 36 shows a data structure of a viewing permission management information table 1720.

FIG. 37 shows a data structure of viewing permission confirmation request data 17301.

FIG. 38 shows a data structure of viewing permission confirmation response data 17401.

FIG. 39 shows a data structure of a viewing permission management information table 17202.

FIG. 40 shows a data structure of viewing permission confirmation request data 17302.

FIG. 41 shows a data structure of viewing permission confirmation response data 17402.

FIG. 48 is a sequence diagram showing operations during content recording, continuing to FIG. 49.

DESCRIPTION OF EMBODIMENTS

Figure 1:
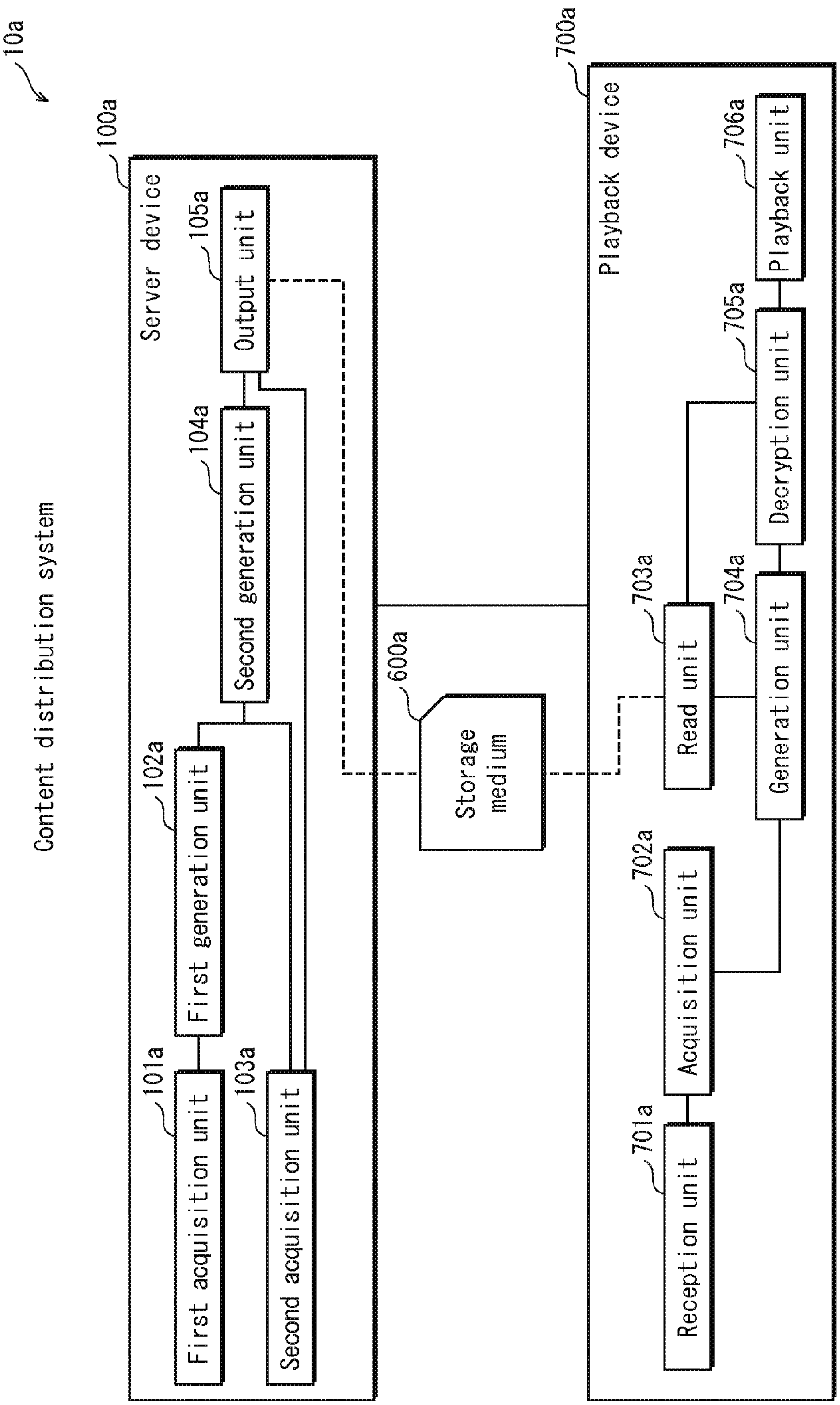
FIG. 1 shows a structure of a content distribution system 10*a* as Embodiment 1 of the present invention.

One aspect of the present invention provides a content distribution system comprising a playback device and a server device that provides content, wherein the server device includes: a first acquisition unit that acquires unique information that identifies a user; a first generation unit that generates binding information that binds the user identified by the unique information with the content; a second acquisition unit that acquires a usage rule of the content; a second generation unit that performs a conversion that is reversible on a title key to generate a converted title key, by using the binding information and the usage rule; and an output unit that outputs, to a storage medium, the converted title key, the usage rule, and encrypted content generated by encrypting content with the title key, and the playback device includes: a reception unit that receives, from a user, unique information that identifies the user; a third acquisition unit that acquires binding information that binds the user identified by the unique information received by the reception unit, with the content; a read unit that reads the encrypted content, the converted title key and the usage rule from the storage medium; a third generation unit that performs a reverse conversion on the converted title key to generate a title key, by using the acquired binding information and the read usage rule, the reverse conversion being a reverse of the conversion; a decryption unit that decrypts the encrypted content by using the title key; and a playback unit that plays back decrypted content.

According to this aspect, it is possible to bind the content license with users. It is therefore possible to provide content according to a licensing scheme that achieves a proper balance between the protection of content provider's rights and user convenience.

Another aspect of the present invention is a server device for providing content, comprising: a first acquisition unit that acquires unique information that identifies a user; a first generation unit that generates binding information that binds the user identified by the unique information with the content; a second acquisition unit that acquires a usage rule of the content; a second generation unit that performs a conversion that is reversible on a title key to generate a converted title key, by using the binding information and the usage rule; and an output unit that outputs, to the storage medium, the converted title key, the usage rule, and encrypted content generated by encrypting content with the title key.

According to this aspect, it is possible to bind content with a user and to provide such content. It is therefore possible to employ a licensing scheme that achieves a proper balance between the protection of content provider's rights and user convenience.

Here, the first acquisition unit may acquire user identification information identifying the user as the unique information, and the binding information generated by the first generation unit may include the user identification information.

According to this aspect, the binding information includes the user identification information, and it is therefore possible to bind content with a user.

Here, the first acquisition unit may acquire user identification information identifying the user as the unique information, and the first generation unit may generate a digest value using the user identification information, and generate the binding information including the digest value.

According to this aspect, the binding information includes the digest value generated by using the user identification information, and it is therefore possible to bind content with a user.

Here, the second generation unit may generate a digest value by using the binding information and the usage rule, and generate the converted title key by performing an exclusive OR operation on the title key and the digest value as the conversion.

According to this aspect, the converted title key is generated by using the binding information and the usage rule to generate the digest value, and performing an exclusive OR operation on the title key and the digest value as the conversion, and it is therefore possible to bind the converted title key with the binding information.

Here, the second generation unit may generate concatenated data by concatenating the binding information and the usage rule, and generate the digest value by performing a one-way operation on the generated concatenated data.

According to this aspect, the digest value is generated by concatenating the binding information and the usage rule to generate concatenated data, and performing a one-way operation on the generated concatenated data, and it is therefore possible to bind the digest value with the binding information.

Yet another aspect of the present invention provides a method used by a server device for providing content, the method comprising: a first acquisition step of acquiring unique information that identifies a user; a first generation step of generating binding information that binds the user identified by the unique information with the content; a second acquisition step of acquiring a usage rule of the content; a second generation step of performing a conversion that is reversible on a title key to generate a converted title key, by using the binding information and the usage rule; and an output step of outputting, to the storage medium, the converted title key, the usage rule, and encrypted content generated by encrypting content with the title key.

According to this aspect, it is possible to bind content with a user and to provide such content. It is therefore possible to employ a licensing scheme that achieves a proper balance between the protection of content provider's rights and user convenience.

Yet another aspect of the present invention provides a computer readable program recording medium for storing therein a computer program used by a server device that provides content, the program recording medium causing the server device that is a computer to perform the following processing, the following processing comprising: a first acquisition step of acquiring unique information that identifies a user; a first generation step of generating binding information that binds the user identified by the unique information with the content; a second acquisition step of acquiring a usage rule of the content; a second generation step of performing a conversion that is reversible on a title key to generate a converted title key, by using the binding information and the usage rule; and an output step of outputting, to a storage medium, the converted title key, the usage rule, and encrypted content generated by encrypting content with the title key.

According to this aspect, it is possible to bind content with a user and to provide such content. It is therefore possible to employ a licensing scheme that achieves a proper balance between the protection of content provider's rights and user convenience.

Yet another aspect of the present invention provides an integrated circuit built in a server device for providing content, the integrated circuit comprising: a first acquisition unit that acquires unique information that identifies a user; a first generation unit that generates binding information that binds the user identified by the unique information with the content; a second acquisition unit that acquires a usage rule of the content; a second generation unit that performs a conversion that is reversible on a title key to generate a converted title key, by using the binding information and the usage rule; and an output unit that outputs, to a storage medium, the converted title key, the usage rule, and encrypted content generated by encrypting content with the title key.

According to this aspect, it is possible to bind content with a user and to provide such content. It is therefore possible to employ a licensing scheme that achieves a proper balance between the protection of content provider's rights and user convenience.

Yet another aspect of the present invention provides a playback device for playing back content provided by a server device, the server device acquiring unique information that identifies a user, performing a conversion that is reversible on a title key to generate a converted title key, by using a usage rule of the content and binding information binding the user identified by the unique information with the content, and outputting, to a storage medium, the converted title key, the usage rule, and encrypted content generated by encrypting content with the title key, the playback device comprising: a reception unit that receives, from a user, unique information that identifies the user; an acquisition unit that acquires binding information that binds the user identified by the unique information received by the reception unit, with the content; a read unit that reads the encrypted content, the converted title key and the usage rule from the storage medium; a generation unit that performs a reverse conversion on the converted title key to generate a title key, by using the acquired binding information and the read usage rule, the reverse conversion being a reverse of the conversion; a decryption unit that decrypts the encrypted content by using the title key; and a playback unit that plays back decrypted content.

According to this aspect, it is possible to bind content with a user and to use such content. It is therefore possible to provide content according to a licensing scheme that achieves a proper balance between the protection of content provider's rights and user convenience.

Here, the usage rule may include a binding identification flag, the reception unit may receive user identification information and a password as the unique information, the playback device may further comprise: a check unit that checks whether the binding identification flag included in the read usage rule indicates that the content is bound with the user, and the acquisition unit may calculate the binding information based on the user identification information and the password received by the reception unit when the binding identification flag indicates that the content is bound with the user.

According to this aspect, it is possible to simultaneously handle content bound with a user and content not bound with the user. Further, the binding information is calculated based on the user identification information and the password received by the reception unit. Therefore, it is possible for the playback device to calculate the binding information and use the content bound with the user.

Here, the generation unit may generate a digest value by using the binding information and the usage rule, and generate the title key by performing an exclusive OR operation on the converted title key and the digest value as the reverse conversion.

According to this aspect, the title key is generated by using the binding information and the usage rule to generate a digest value, and performing an exclusive OR operation on the converted title key and the digest value as the reverse conversion. Therefore, only when the binding information is authorized, the title key is properly generated.

Here, the generation unit may generate concatenated data by concatenating the binding information and the usage rule, and generate the digest value by performing a one-way operation on the generated concatenated data.

According to this aspect, the digest value is generated by concatenating the binding information and the usage rule to generate concatenated data, and by performing a one-way operation on the generated concatenated data. Therefore, only when the binding information is authorized, the digest value is properly generated.

Here, the server device may acquire user identification information identifying the user as the unique information, bind the binding information with the user identification information, and store therein the binding information, and the acquisition unit may acquire the stored binding information bound with the user identification information when the reception unit receives the user identification information.

According to this aspect, the server device acquires the user identification information identifying a user as the unique information, binds the binding information with the user identification information, and stores therein the binding information. The playback device acquires the stored binding information corresponding to the user identification information when receiving the user identification information. Therefore, the playback device properly acquires the binding information only when the received user identification information is authorized.

Yet another aspect of the present invention provides a method used by a playback device for playing back content provided by a server device, the server device acquiring unique information that identifies a user, performing a conversion that is reversible on a title key to generate a converted title key, by using a usage rule of the content and binding information binding the user identified by the unique information with the content, and outputting, to a storage medium, the converted title key, the usage rule, and encrypted content generated by encrypting content with the title key, the method comprising: a reception step of receiving, from a user, unique information that identifies the user; an acquisition step of acquiring binding information that binds the user identified by the unique information received in the reception step, with the content; a read step of reading the encrypted content, the converted title key and the usage rule from the storage medium; a generation step of performing a reverse conversion on the converted title key to generate a title key, by using the acquired binding information and the read usage rule, the reverse conversion being a reverse of the conversion; a decryption step of decrypting the encrypted content by using the title key; and a playback step of playing back decrypted content.

According to this aspect, it is possible to bind content with a user and to use such content. It is therefore possible to provide content according to a licensing scheme that achieves a proper balance between the protection of content provider's rights and user convenience.

Here, the usage rule may include a binding identification flag, in the reception step, user identification information and a password may be received as the unique information, the method may further comprise: a checking step of checking whether the binding identification flag included in the read usage rule indicates that the content is bound with the user, and in the acquisition step, the binding information may be calculated based on the user identification information and the password received in the reception step when the binding identification flag indicates that the content is bound with the user.

Yet another aspect of the present invention provides a computer readable program recording medium for storing therein a computer program used by a playback device that plays back content provided by a server device, the server device acquiring unique information that identifies a user, performing a conversion that is reversible on a title key to generate a converted title key, by using a usage rule of the content and binding information binding the user identified by the unique information with the content, and outputting, to a storage medium, the converted title key, the usage rule, and encrypted content generated by encrypting content with the title key, the computer program causing the playback device that is a computer to perform the following processing, the following processing comprising: a reception step of receiving, from a user, unique information that identifies the user; an acquisition step of acquiring binding information that binds the user identified by the unique information received in the reception step, with the content; a read step of reading the encrypted content, the converted title key and the usage rule from the storage medium; a generation step of performing a reverse conversion on the converted title key to generate a title key, by using the acquired binding information and the read usage rule, the reverse conversion being a reverse of the conversion; a decryption step of decrypting the encrypted content by using the title key; and a playback step of playing back decrypted content.

According to this aspect, it is possible to bind content with a user and to use such content. It is therefore possible to provide content according to a licensing scheme that achieves a proper balance between the protection of content provider's rights and user convenience.

Yet another aspect of the present invention provides an integrated circuit built in a playback device for playing back content provided by a server device, the server device acquiring unique information that identifies a user, performing a conversion that is reversible on a title key to generate a converted title key, by using a usage rule of the content and binding information binding the user identified by the unique information with the content, and outputting, to a storage medium, the converted title key, the usage rule, and encrypted content generated by encrypting content with the title key, the integrated circuit comprising: a reception unit that receives, from a user, unique information that identifies the user; an acquisition unit that acquires binding information that binds the user identified by the unique information received by the reception unit, with the content; a read unit that reads the encrypted content, the converted title key and the usage rule from the storage medium; a generation unit that performs a reverse conversion on the converted title key to generate a title key, by using the acquired binding information and the read usage rule, the reverse conversion being a reverse of the conversion; a decryption unit that decrypts the encrypted content by using the title key; and a playback unit that plays back decrypted content.

According to this aspect, it is possible to bind content with a user and to use content. It is therefore possible to provide content according to a licensing scheme that achieves a proper balance between the protection of content provider's rights and user convenience.

According to conventional art, any user can decrypt content stored in the storage medium insofar as the user uses the authorized storage medium. In this case, the content provider can collect usage fees from the first user who first purchased the authorized storage medium. However, when the first user resells the storage medium to the second user, the content provider has difficulty in collecting usage fees from the second user.

In the content distribution system of the present invention, it is possible to bind the content license with users. This can prevent unauthorized usage of content by the unauthorized second user, and permit the authorized first user to copy the content to the other storage medium.

1. Embodiment 1

The following describes a content distribution system 10*a* as Embodiment 1 of the present invention with reference to the drawings.

(1) Content Distribution System 10*a*

The content distribution system 10*a* includes a server device 100*a*, a storage medium 600*a* and a playback device 700*a*, as shown in FIG. 1.

The server device 100*a* that provides content to the playback device 700*a* includes a first acquisition unit 101*a*, a first generation unit 102*a*, a second acquisition unit 103*a*, a second generation unit 104*a* and an output unit 105*a*, as shown in FIG. 1.

The first acquisition unit 101*a* acquires unique information that identifies a user.

The first generation unit 102*a* generates binding information that binds the user identified by the unique information with the content.

The second acquisition unit 103*a* acquires a usage rule of the content.

The second generation unit 104*a* performs a conversion that is reversible on a title key to generate a converted title key, by using the binding information and the usage rule.

The output unit 105*a* outputs, to the storage medium 600*a*, the converted title key, the usage rule, and encrypted content generated by encrypting content with the title key.

The playback device 700*a* that receives content from the server device 100*a* includes a reception unit 701*a*, an acquisition unit 702*a*, a read unit 703*a*, a generation unit 704*a*, a decryption unit 705*a* and a playback unit 706*a*, as shown in FIG. 1.

The reception unit 701*a* receives, from a user, unique information that identifies the user.

The acquisition unit 702*a* acquires binding information that binds the user identified by the unique information received by the reception unit 701*a*, with the content.

The read unit 703*a* reads the encrypted content, the converted title key and the usage rule from the storage medium 600*a*.

The generation unit 704*a* performs a reverse conversion on the converted title key to generate a title key, by using the acquired binding information and the read usage rule, the reverse conversion being a reverse of the conversion.

The decryption unit 705*a* decrypts the encrypted content by using the title key.

The playback unit 706*a* plays back decrypted content.

(2) Here, the first acquisition unit 101*a* may acquire user identification information identifying the user as the unique information, and the binding information generated by the first generation unit 102*a* may include the user identification information.

(3) Here, the first acquisition unit 101*a* may acquire user identification information identifying the user as the unique information, and the first generation unit 102*a* may generate a digest value using the user identification information, and generate the binding information including the digest value.

(4) Here, the second generation unit 104*a* may generate a digest value by using the binding information and the usage rule, and generate the converted title key by performing an exclusive OR operation on the title key and the digest value as the conversion.

(5) Here, the second generation unit 104*a* may generate concatenated data by concatenating the binding information and the usage rule, and generate the digest value by performing a one-way operation on the generated concatenated data.

(6) Here, the usage rule may include a binding identification flag. The reception unit 701*a* receives user identification information and a password as the unique information. The playback device 700*a* further includes a check unit that checks whether the binding identification flag included in the read usage rule indicates that the content is bound with a user. The acquisition unit 702*a* calculates the binding information based on the user identification information and the password received by the reception unit 701*a* when the binding identification flag indicates that the content is bound with the user.

(7) Here, the generation unit 704*a* may generate a digest value by using the binding information and the usage rule, and generate the title key by performing an exclusive OR operation on the converted title key and the digest value as the reverse conversion.

(8) Here, the generation unit 704*a* may generate concatenated data by concatenating the binding information and the usage rule, and generate the digest value by performing a one-way operation on the generated concatenated data.

(9) The server device 100*a* may acquire user identification information identifying the user as the unique information, bind the binding information with the user identification information, and store therein the binding information.

The acquisition unit 702*a* may acquire the stored binding information bound with the user identification information when the reception unit 701*a* receives the user identification information.

2. Embodiment 2

The following describes a content distribution system 10*b* as Embodiment 2 of the present invention with reference to the drawings.

2.1 Content Distribution System 10*b*

Figure 2:
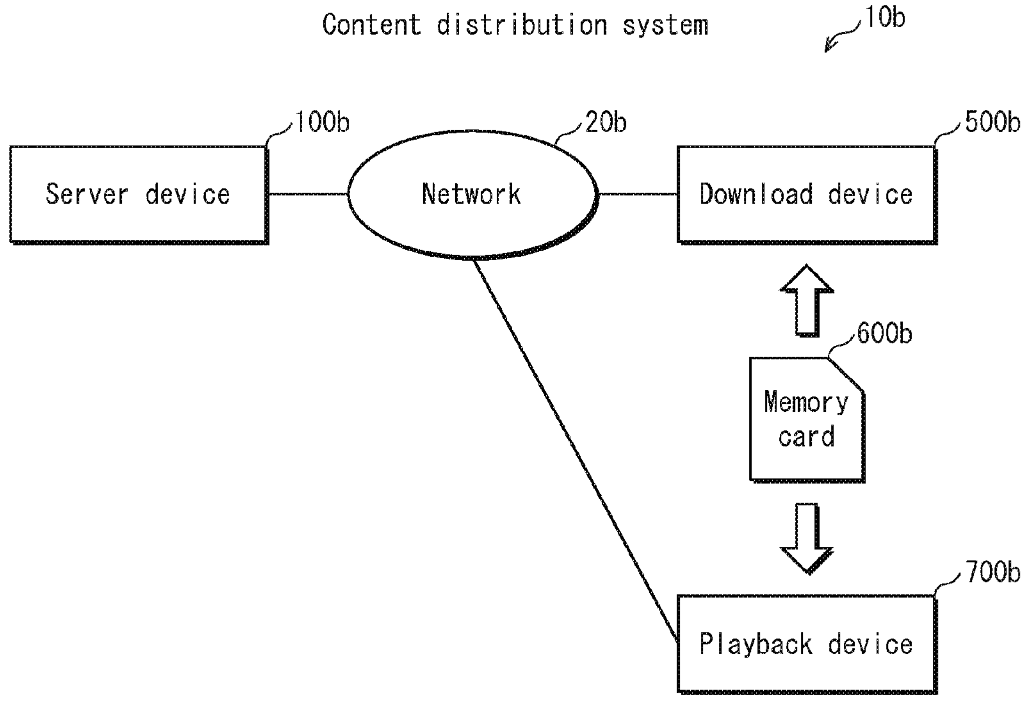
FIG. 2 shows a structure of a content distribution system 10*b* as Embodiment 2 of the present invention.

The content distribution system 10*b* includes a server device 100*b*, a download device 500*b*, a playback device 700*b* and a memory card 600*b*, as shown in FIG. 2. The server device 100*b*, the download device 500*b* and the playback device 700*b* are connected to a network 20*b* represented by the Internet. The memory card 600*b* is a portable storage medium device.

In the content distribution system 10*b*, the server device 100*b* provides content to the playback device 700*b* owned by a user.

The playback device 700*b* receives a user ID and a password input by a user. Here, the user ID is identification information identifying a user, and the password is authentication information for confirming the identity of the user. The user ID and the password are unique information unique to the user. The user logs in to the playback device 700*b* with the user ID and the password. When login is successful, the playback device 700*b* requests acquisition of binding information according to the user instruction. Here, the binding information is information binding the user with the content. The binding information is generated based on the user ID and the password that are unique information unique to the user. Note that the unique information unique to the user may be only the user ID, and the binding information may be generated based on the user ID. Details of the generation of the binding information are described below. If the server device 100*b* does not store therein the binding information corresponding to the user ID, the server device 100*b* generates new binding information based on the user ID and the password, associates the new binding information with the user ID, and stores therein the new binding information. If the server device 100*b* stores therein the binding information corresponding to the user ID, the server device 100*b* reads the binding information corresponding to the user ID. Next, the server device 100*b* outputs the generated binding information or the read binding information. The playback device 700*b* acquires the binding information. The acquired binding information is authorized only while the user is logged in the playback device 700*b*. Next, the user logs out the playback device 700*b*. When the user logs out the playback device 700*b*, the received binding information is invalidated.

The user inserts the memory card 600*b* into the download device 500*b*. The download device 500*b* receives the user ID and the password input by the user, and logs in the server device 100*b* with the user ID and the password. When login is successful, the download device 500*b* acquires encrypted content, a usage rule (UR) and a calculated title key from the server device 100*b* according to the user instruction. The calculated title key is generated based on a title key, the binding information and the usage rule. The title key is an encryption key that is used for encrypting content to generate the encrypted content. The usage rule is information indicating a condition when the content is used. Next, the download device 500*b* writes the acquired encrypted content, usage rule and calculated title key to the memory card 600*b*. The user logs out from the download device 500*b*.

Next, the user removes the memory card 600*b* from the download device 500*b*, and inserts the memory card 600*b* storing the encrypted content, the usage rule and the calculated title key into the playback device 700*b*. The user inputs the user ID and the password used for logging in to the playback device 700*b*, and the playback device 700*b* receives the user ID and the password. When login is successful, the playback device 700*b* acquires the binding information corresponding to the user ID. The playback device 700*b* generates a title key based on the binding information that has been acquired and the usage rule and the calculated title key that are stored in the memory card 600*b*. Next, the playback device 700*b* decrypts the encrypted content stored in the memory card 600*b* with the title key, and plays back and outputs the decrypted content.

2.2 Server Device 100*b*

Figure 3:
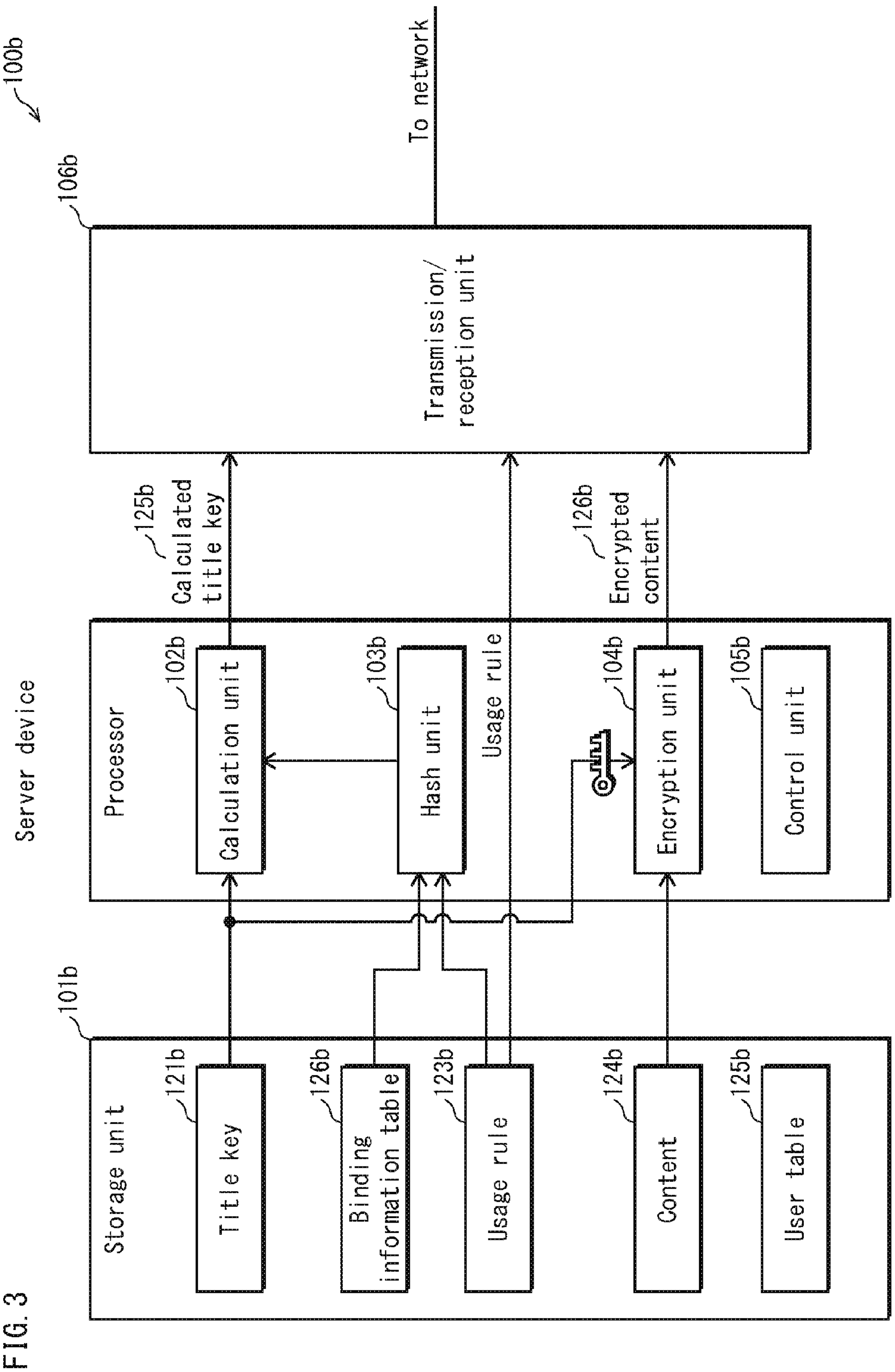
FIG. 3 is a block diagram showing a structure of a server device 100*b*.

The server device 100*b* includes a storage unit 101*b*, a calculation unit 102*b*, a hash unit 103*b*, an encryption unit 104*b*, a control unit 105*b* and a transmission/reception unit 106*b*, as shown in FIG. 3.

The server device 100*b* is specifically a computer system composed of a processor, a ROM, a RAM, a hard disk unit, a communication unit, etc. The RAM or the hard disk unit stores therein a computer program. The calculation unit 102*b*, the hash unit 103*b*, the encryption unit 104*b* and the control unit 105*b* of the server device 100*b* achieve their functions by the processor operating in accordance with the computer program.

(1) Storage Unit 101*b*

The storage unit 101*b* is composed of a hard disk unit, for example. The storage unit 101*b* has an area for storing a title key 121*b*, a binding information table 126*b*, a usage rule 123*b*, a content 124*b* and a user table 125*b*.

The title key 121*b* is an encryption key used for encrypting content. For example, the title key 121*b* is 128-bit long. The title key 121*b* is associated with a content ID that is identification information identifying content.

The binding information table 126*b* has an area for storing a plurality of pairs of a user ID and binding information, as shown in FIG. 4C. The user ID and the binding information in each pair are associated with each other.

The user ID is identification information identifying a user.

The binding information is generated based on unique information that is unique to a user, and used for binding the user with content. The method for generating the binding information is described below.

The binding information table 126*b* includes binding information 122*b* associated with a user ID (127*b*), as shown in FIG. 4C, for example.

The usage rule 123*b* is information indicating a condition of usage of content. For example, the usage rule 123*b* includes conditions "NO MOVE" and "NO COPY", as shown in FIG. 4A. "NO MOVE" indicates prohibition of moving the content. "NO COPY" indicates prohibition of copying the content. The usage rule 123*b* may include the maximum number of playbacks of the content, an available period of the content, etc. The usage rule 123*b* is associated with the content ID.

The content 124*b* is compressed data generated by compressing digital video data and audio data, for example. The content 124*b* is associated with the content ID. Note that the content 124*b* may be digital music data, digital audio data, digital moving image data, digital still image data, digital book data, a database, a spread sheet, text data and a computer program.

The user table 125*b* is composed of user data sets, as shown in FIG. 4B, for example. Each set includes a user ID, a password and a user name. The user ID and the password are as described above. The user name refers to the user.

(2) Hash Unit 103*b*

(Generation of Digest Value)

The hash unit 103*b* generates concatenated data by concatenating the binding information and the usage rule, and performs a one-way operation on the generated concatenated data to generate a digest value, as shown below.

The hash unit 103*b* acquires the binding information 122*b* by reading the binding information 122*b* corresponding to the user ID from the binding information table 126*b* in the storage unit 101*b* under the control of the control unit 105*b*. Further, the hash unit 103*b* acquires the usage rule 123*b* by reading the usage rule 123*b* corresponding to the content ID from the storage unit 101*b*. Next, the hash unit 103*b* generates concatenated data by concatenating the read binding information 122*b* and usage rule 123*b* in this order.

concatenated data=binding information||usage rule

Here, A||B denotes data acquired by concatenating data A and data B in this order.

Next, the hash unit 103*b* performs a hash calculation denoted as Hash on the concatenated data to generate a hash value.

hash value=Hash(concatenated data)=Hash(binding information||usage rule)(expression 1)

Here, Hash (A) denotes a hash value obtained by performing the hash calculation denoted as Hash on data A. The hush calculation denoted as Hash is a one-way operation, and the generated hash value is a digest value. The hash calculation denoted as Hash is SHA-1, for example. Note that SHA-224, SHA-256, SHA-384 or SHA-512 may be used instead of SHA-1.

The hash calculation denoted as Hash used in the expression 1 needs to be the same as a hash calculation denoted as Hash used in expression 3, which is described below.

Next, the hash unit 103*b* outputs the generated hash value to the calculation unit 102*b*.

(Generation of Binding Information)

Additionally, the hash unit 103*b* generates the binding information based on unique information that is unique to a user, as shown below.

The hash unit 103*b* receives a user ID and a password that are the unique information that is unique to a user from the control unit 105*b*. As described above, the user ID is identification information identifying a user, and the password is authentication information confirming the identity of the user. Next, the hash unit 103*b* generates concatenated data by concatenating the received user ID and password in this order under the control of the control unit 105*b*.

concatenated data=user ID||password

Next, the hush unit 103*b* performs a hash calculation denoted as Hush, which is a one-way operation, on the concatenated data to generate the binding information.

binding information=Hash(concatenated data)=Hash(user ID||password)(expression 2)

Here, Hash (A) denotes a hash value obtained by performing the hash calculation denoted as Hash on data A. As the hash calculation, SHA-1 is used. Note that SHA-224, SHA-256, SHA-384 or SHA-512 may be used instead of SHA-1.

In other words, the hash unit 103*b* generates the binding information by using the unique information that is unique to a user.

The hash calculation denoted as Hash used in the expression 2 may be the same as or different from the hash calculation denoted as Hash used in each embodiment and modification.

The hash unit 103*b* may generate the binding information including the user ID.

Next, the hash unit 103*b* outputs the generated binding information to the control unit 105*b*.

(3) Calculation Unit 102*b*

The calculation unit 102*b* generates a converted title key (hereinafter, referred to as calculated title key) by performing a conversion that is reversible on the title key and the digest value generated by the hash unit 103*b* using the binding information and the usage rule, as shown below. Here, one example of the conversion is exclusive OR, as shown below. Note that as the conversion, Advanced Encryption Standard (AES) may be used as the encryption algorithm, for example.

The calculation unit 102*b* reads the title key 121*b* corresponding to the content ID from the storage unit 101*b* under the control of the control unit 105*b*. Next, the calculation unit 102*b* receives the hash value from the hash unit 103*b*.

Next, the calculation unit 102*b* generates the calculated title key by performing an exclusive OR operation XOR on the read title key 121*b* and the received hash value.

calculated title key=title key XOR hash value

Here, exclusive OR denotes a conversion that is reversible. "XOR" is an operator of an exclusive OR operation. For example, "A XOR B" is a calculation result obtained by performing the exclusive OR operation on data A and data B.

Next, the calculation unit 102*b* transmits the calculated title key to the download device 500*b* via the transmission/reception unit 106*b* and the network 20*b* under the control of the control unit 105*b*.

(4) Encryption Unit 104*b*

The encryption unit 104*b* reads the title key 121*b* and content 124*b* that correspond to the content ID from the storage unit 101*b* under the control of the control unit 105*b*. Next, the encryption unit 104*b* generates encrypted content by performing an encryption algorithm E on the content 124*b* by using the title key 121*b* as an encryption key.

encrypted content=*E*(title key,content) Here, E (A, B) denotes a ciphertext generated by performing the encryption algorithm E on data B with the use of an encryption key A. The encryption algorithm E is an encryption algorithm of a common key cryptosystem. The encryption algorithm E is AES, for example.

Next, the encryption unit 104*b* transmits the generated encrypted content to the download device 500*b* via the transmission/reception unit 106*b* and the network 20*b* under the control of the control unit 105*b*.

(5) Transmission/reception Unit 106*b*

The transmission/reception unit 106*b* is composed of a communication unit, for example.

The transmission/reception unit 106*b* exchanges data among other devices connected to the network 20*b* under the control of the control unit 105*b*.

To be specific, the transmission/reception unit 106*b* transmits the calculated title key and the encrypted content to the download device 500*b*. Further, the transmission/reception unit 106*b* reads the usage rule 123*b* from the storage unit 101*b*, and transmits the read usage rule 123*b* to the download device 500*b*. In addition, the transmission/reception unit 106*b* transmits the binding information to the playback device 700*b*. Furthermore, the transmission/reception unit 106*b* transmits messages to the playback device 700*b* and the download device 500*b*.

The transmission/reception unit 106*b* receives a user ID and a password that are unique information unique to a user from the playback device 700*b* and the download device 500*b*. The transmission/reception unit 106*b* receives a request for the binding information from the playback device 700*b*. The transmission/reception unit 106*b* receives requests for the content ID and content from the download device 500*b*.

(6) Control Unit 105*b*

The control unit 105*b* controls the calculation unit 102*b*, the hash unit 103*b*, the encryption unit 104*b* and the transmission/reception unit 106*b*.

The control unit 105*b* receives a pair of the user ID and the password from the download device 500*b* or the playback device 700*b*. When receiving the pair of the user ID and the password, the control unit 105*b* judges whether the user table 125*b* includes the same pair as the received pair. When judging that the user table 125*b* includes the same pair, the control unit 105*b* allows the user to log in the download device 500*b* or the playback device 700*b*. When judging that the user table 125*b* does not include the same pair, the control unit 105*b* does not allow the user to log in the download device 500*b* or the playback device 700*b*.

While the playback device 700*b* is in a login state, the playback device 700*b* can request the server device 100*b* for the binding information. The playback device 700*b* also can decrypt the encrypted content stored in the memory card 600*b* for playback. While the download device 500*b* is in a login state, the download device 500*b* can further acquire the usage rule, the calculated title key and the encrypted content from the server device 100*b*.

The control unit 105*b* receives a request for the binding information from the transmission/reception unit 106*b*. When receiving the request for the binding information, the control unit 105*b* judges whether the binding information table 126*b* includes the received user ID. When judging that the binding information table 126*b* does not include the received user ID, the control unit 105*b* instructs the hash unit 103*b* to generate binding information. Next, the control unit 105*b* receives the binding information from the hash unit 103*b*, and writes the received binding information and the user ID in the binding information table 126*b*. When judging that the binding information table 126*b* includes the received user ID, the control unit 105*b* reads the binding information corresponding to the user ID from the binding information table 126*b*.

The control unit 105*b* controls the transmission/reception unit 106*b* to transmit the generated binding information or the read binding information to the playback device 700*b*.

2.3 Download Device 500*b*

Figure 5:
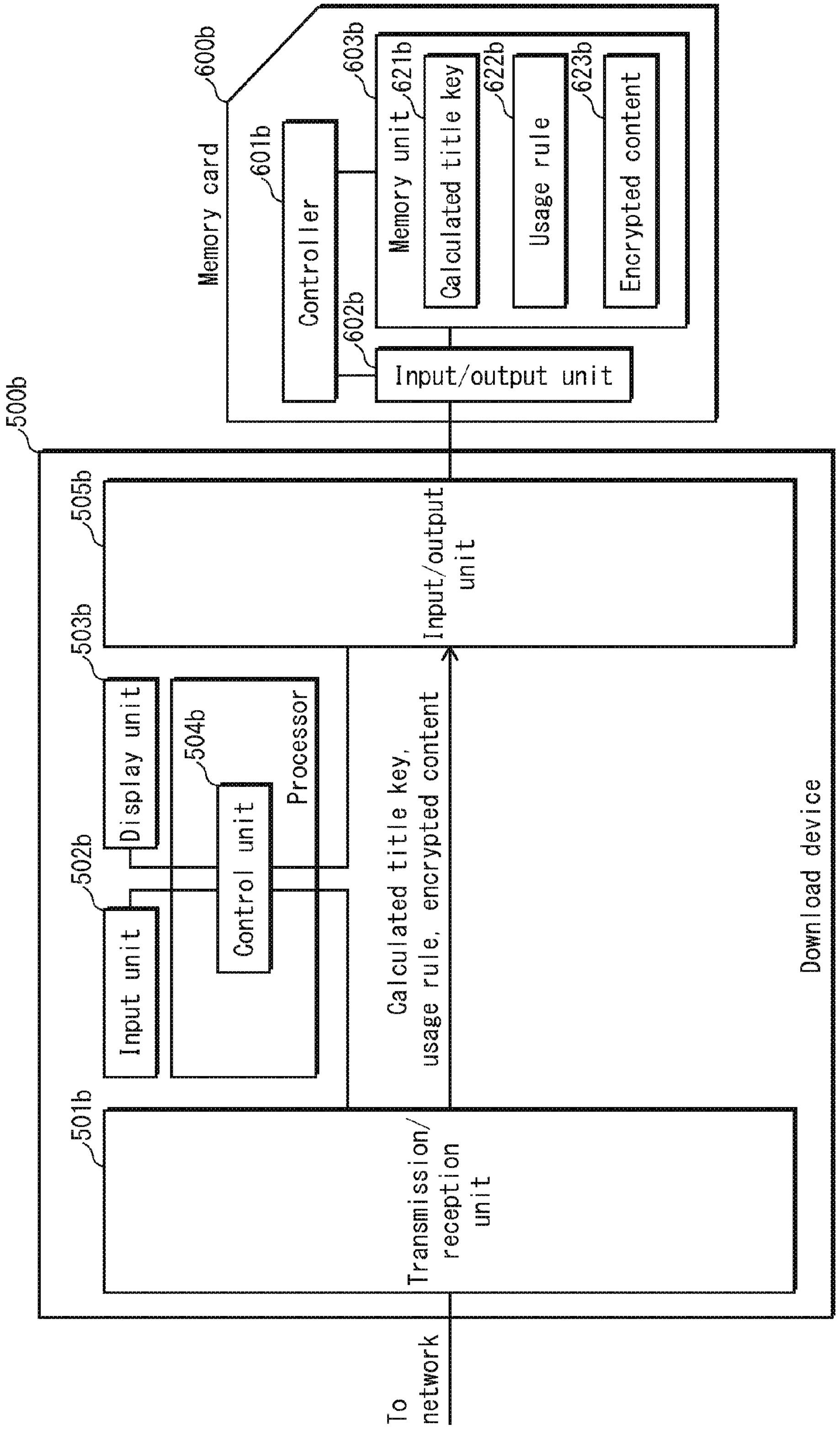
FIG. 5 is a block diagram showing structures of a download device 500*b* and a memory card 600*b*.

The download device 500*b* includes a transmission/reception unit 501*b*, an input unit 502*b*, a display unit 503*b*, a control unit 504*b* and an input/output unit 505*b*, as shown in FIG. 5.

The download device 500*b* is specifically a computer system composed of a processor, a ROM, a RAM, a hard disk unit, an input/output unit, a communication unit, a liquid crystal display, a keyboard, etc. The RAM or the hard disk unit stores therein a computer program. The control unit 504*b* of the download device 500*b* achieves its functions by the processor operating in accordance with the computer program.

(1) Transmission/reception Unit 501*b*

The transmission/reception unit 501*b* is composed of a communication unit, for example.

The transmission/reception unit 501*b* exchanges data among the input/output unit 505*b*, the control unit 504*b*, and external devices connected to the network 20*b* under the control of the control unit 504*b*.

To be specific, the transmission/reception unit 501*b* receives the calculated title key, the usage rule and the encrypted content from the server device 100*b*. The transmission/reception unit 501*b* outputs the received calculated title key, the usage rule and the encrypted content to the input/output unit 505*b*. The transmission/reception unit 501*b* receives messages from the server device 100*b*.

The transmission/reception unit 501*b* transmits requests for the user ID, the password, the content ID and the content to the server device 100*b*.

(2) Input/output Unit 505*b*

When the memory card 600*b* is inserted into the download device 500*b*, the input/output unit 505*b* outputs data to the memory card 600*b* under the control of the control unit 504*b*. Further, the input/output unit 505*b* receives data from the memory card 600*b*.

To be specific, the input/output unit 505*b* receives the calculated title key, the usage rule and the encrypted content from the transmission/reception unit 501*b* under the control of the control unit 504*b*. The input/output unit 505*b* outputs the received calculated title key, the usage rule and the encrypted content to the memory card 600*b*.

(3) Control Unit 504*b*, Input Unit 502*b* and Display Unit 503*b*

The control unit 504*b* controls the input unit 502*b*, the display unit 503*b*, the transmission/reception unit 501*b*, and the input/output unit 505*b*.

The input unit 502*b* is composed of a keyboard, for example. The input unit 502*b* receives data input by a user, and outputs the received data to the control unit 504*b*.

The display unit 503*b* is composed of a liquid crystal display, for example. The display unit 503*b* displays data under the control of the control unit 504*b*.

2.4 Memory Card 600*b*

The memory card 600*b* is a portable storage medium device. The memory card 600*b* is composed of a tamper resistant controller 601*b*, an input/output unit 602*b* and a memory unit 603*b*, as shown in FIG. 5.

(1) Memory Unit 603*b*

The memory unit 603*b* is a nonvolatile semiconductor memory.

The memory unit 603*b* has an area for storing a calculated title key 621*b*, a usage rule 622*b* and an encrypted content 623*b*, as shown in FIG. 5, for example.

The calculated title key, the usage rule and the encrypted contents are as described above.

(2) Input/output Unit 602*b*

When the memory card 600*b* is inserted into the download device 500*b* or the playback device 700*b*, the input/output unit 602*b* inputs or outputs data to or from these devices, the controller 601*b* and the memory unit 603*b*.

(3) Controller 601*b*

The controller 601*b* is a computer system composed of a processor, a ROM, a RAM, etc. The ROM or the RAM stores therein a computer program. The controller 601*b* achieves its functions by the processor operating in accordance with the computer program.

The controller 601*b* controls writing of data in the memory unit 603*b* and reading of data from the memory unit 603*b*.

2.5 Playback Device 700*b*

The playback device 700*b* includes a transmission/reception unit 701*b*, a storage unit 702*b*, a control unit 703*b*, a hash unit 704*b*, a calculation unit 705*b*, a decryption unit 706*b*, a playback unit 707*b*, an input/output unit 708*b* and an input unit 709*b*, as shown in FIG. 6. To the playback device 700*b*, a monitor 710*b* is connected.

The playback device 700*b* is specifically a computer system composed of a processor, a ROM, a RAM, a hard disk unit, an input/output unit, a communication unit, a keyboard, etc. The RAM or the hard disk unit stores therein a computer program. The control unit 703*b*, the hash unit 704*b*, the calculation unit 705*b*, the decryption unit 706*b* and the playback unit 707*b* of the playback device 700*b* achieve their functions by the processor operating in accordance with the computer program.

(1) Storage Unit 702*b*

The storage unit 702*b* is composed of a hard disk unit, for example.

The storage unit 702*b* has an area for storing binding information 721*b* and a usage rule 722*b*.

The binding information and the usage rule are as described above.

(2) Transmission/reception Unit 701*b*

The transmission/reception unit 701*b* is composed of a communication unit, for example.

The transmission/reception unit 701*b* exchanges data among the input/output unit 708*b*, the control unit 703*b*, the storage unit 702*b* and external devices connected to the network 20*b* under the control of the control unit 703*b*.

To be specific, the transmission/reception unit 701*b* receives, from the server device 100*b*, the binding information corresponding to a user ID that is received by the later described input unit 709*b*. Next, the transmission/reception unit 701*b* writes the received binding information in the storage unit 702*b*. Further, the transmission/reception unit 701*b* receives messages from the server device 100*b*.

The transmission/reception unit 701*b* transmits requests for the user ID, the password, and the binding information to the server device 100*b*.

(3) Input/output Unit 708*b*

When the memory card 600*b* is inserted into the playback device 700*b*, the input/output unit 708*b* outputs data to the memory card 600*b* under the control of the control unit 504*b*. Also, the input/output unit 708*b* receives data from the memory card 600*b*.

To be specific, the input/output unit 708*b* receives the calculated title key, the usage rule and the encrypted content from the memory card 600*b* under the control of the control unit 504*b*. Next, the input/output unit 708*b* outputs the read calculated title key to the calculation unit 705*b*. The input/output unit 708*b* also outputs the read encrypted content to the decryption unit 706*b*. Further, the input/output unit 708*b* writes the read usage rule to the storage unit 702*b*.

(4) Hash Unit 704*b*

The hash unit 704*b* generates concatenated data by concatenating the binding information and the usage rule, and generates a digest value by performing a one-way operation on the generated concatenated data, as shown below.

The hash unit 704*b* reads the binding information 721*b* and the usage rule 722*b* from the storage unit 702*b* under the control of the control unit 703*b*. Next, the hash unit 704*b* generates concatenated data by concatenating the read binding information 721*b* and usage rule 722*b* in this order.

concatenated data=binding information||usage rule

Next, the hush unit 704*b* generates a hash value as a digest value by performing a hash calculation denoted as Hush, which is a one-way operation, on the concatenated data.

hash value=Hash(concatenated data)=Hash(binding information||usage rule)(expression 3)

Here, the hash calculation denoted as Hash is as described above.

The hash calculation denoted as Hash used in the expression 3 needs to be the same as the hash calculation denoted as Hash used in the expression 1, which is described above.

Next, the hash unit 704*b* outputs the generated hash value as the digest value to the calculation unit 705*b*.

(5) Calculation Unit 705*b*

The calculation unit 705*b* generates a title key by performing, as the reverse of the conversion performed by the calculation unit 102*b*, an exclusive OR operation XOR on the calculated title key and the digest value that is generated by the hash unit 704*b* using the binding information and the usage rule, as shown below.

The calculation unit 705*b* receives the calculated title key 621*b* from the input/output unit 708*b* under the control of the control unit 703*b*. Next, the calculation unit 705*b* receives the hash value from the hash unit 704*b*.

Next, the calculation unit 705*b* generates the title key by performing an exclusive OR operation XOR on the calculated title key and the hash value.

title key=calculated title key XOR hash value

Next, the calculation unit 705*b* outputs the generated title key to the decryption unit 706*b*.

(6) Decryption Unit 706*b*

The decryption unit 706*b* receives the encrypted content from the input/output unit 708*b* under the control of the control unit 703*b*. The decryption unit 706*b* also receives the title key from the calculation unit 705*b*. Next, the decryption unit 706*b* reproduces content by performing a decryption algorithm D on the received encrypted content by using the received title key as a decryption key.

content=*D*(title key,encrypted content)

Here, D (A, B) denotes a deciphertext generated by performing the decryption algorithm D on encrypted data B with a decryption key A. The decryption algorithm D decrypts a ciphertext generated by the encryption algorithm E. The decryption algorithm D is a decryption algorithm of the common key cryptosystem. The decryption algorithm D is AES, for example.

Next, the decryption unit 706*b* outputs the reproduced content to the playback unit 707*b*.

(7) Playback Unit 707*b*, Input Unit 709*b* and Monitor 710*b*

The playback unit 707*b* receives the content from the decryption unit 706*b*. Next, the playback unit 707*b* generates image data and audio data by expanding the received content, and outputs the generated image data and audio data to the monitor 710*b*.

The input unit 709*b* receives data input by a user. To be specific, the input unit 709*b* receives, from the user, a user ID and a password that are unique information unique to the user. Next, the input unit 709*b* outputs the user ID and the password to the control unit 703*b*.

The monitor 710*b* receives the image data and the audio data from the playback unit 707*b*. Next, the monitor 710*b* displays the image data as a video. The monitor 701*b* also outputs the audio data as audio. The monitor 710*b* further displays information under the control of the control unit 703*b*.

(8) Control Unit 703*b*

The control unit 703*b* controls the transmission/reception unit 701*b*, the storage unit 702*b*, the hash unit 704*b*, the calculation unit 705*b*, the decryption unit 706*b*, the playback unit 707*b* and the input/output unit 708*b*.

2.6 Operation of Content Distribution System 10*b*

The following describes an operation of the content distribution system 10*b*.

(1) Operations for Login and Acquisition of Binding Information

The following describes operations of the playback device 700*b* of logging in the server device 100*b* and acquiring the binding information from the server device 100*b*, with reference to the sequence diagram shown in FIG. 7.

The input unit 709*b* receives a pair of a user ID and a password input by a user. Next, the input unit 709*b* outputs the received pair of the user ID and the password to the control unit 703*b* (step S1101).

Next, the control unit 703*b* outputs the pair of the user ID and the password to the transmission/reception unit 701*b*. The transmission/reception unit 701*b* transmits the received pair of the user ID and the password to the server device 100*b* via the network 20*b* (step S1102).

The transmission/reception unit 106*b* receives the pair of the user ID and the password from the playback device 700*b* via the network 20*b* (step S1102).

The control unit 105*b* receives the pair of the user ID and the password. Next, the control unit 105*b* judges whether the user table 125*b* includes the same pair as the received pair of the user ID and the password (step S1103). When the user table 125*b* does not include the same pair of the user ID and the password ("No" in step S1103), the control unit 105*b* generates a message indicating that the received pair of the user ID and the password is not registered in the user table 125*b*. Next, the control unit 105*b* transmits the generated message to the playback device 700*b* via the transmission/reception unit 106*b* (step S1104).

When the user table 125*b* includes the same pair of the user ID and the password ("Yes" in step S1103), the control unit 105*b* generates a message indicating that the received pair of the user ID and the password is registered in the user table 125*b*. Next, the control unit 105*b* transmits the generated message to the playback device 700*b* via the transmission/reception unit 106*b* (step S1105).

The transmission/reception unit 701*b* receives the message from the server device 100*b* via the network 20*b* (steps S1104, S1105). The control unit 703*b* judges whether the received message indicates that the pair of the user ID and the password is registered in the user table 125*b* (step S1106).

When the received message indicates that the pair of the user ID and the password is not registered in the user table 125*b* ("Unregistered" in step S1106), the control unit 703*b* finishes the login operation.

When the received message indicates that the pair of the user ID and the password is registered in the user table 125*b* ("Registered" in step S1106), the input unit 709*b* receives a request for the binding information from the user (step S1107).

The control unit 703*b* outputs the request for the binding information to the transmission/reception unit 701*b*. The transmission/reception unit 701*b* transmits the received request for the binding information to the server device 100*b* via the network 20*b* (step S1108).

The transmission/reception unit 106*b* receives the request for the binding information from the playback device 700*b* via the network 20*b* (step S1108).

The control unit 105*b* judges whether the binding information corresponding to the received user ID is stored in the binding information table 126*b* of the storage unit 101*b* (step S1109).

When judging that the binding information corresponding to the user ID is not stored in the binding information table 126*b* ("Absent" in step S1109), the control unit 105*b* generates the binding information by the following expression.

binding information=Hash(user ID||password)(step S1110)

Next, the control unit 105*b* associates the binding information with the user ID, and writes the binding information in the binding information table 126*b* (step S1111).

When judging that the binding information corresponding to the user ID is stored in the binding information table 126*b* ("Present" in step S1109), the control unit 105*b* reads the binding information corresponding to the user ID from the binding information table 126*b* (step S1112).

Next, the control unit 105*b* transmits the read binding information or the generated binding information to the playback device 700*b* via the transmission/reception unit 106*b* and the network 20*b* (step S1113).

The transmission/reception unit 701*b* receives the binding information (step S1113), and writes the received binding information in the storage unit 702*b* (step S1114).

This completes the operations for login and acquisition of the binding information.

(2) Operation for Downloading Content

Figure 8:
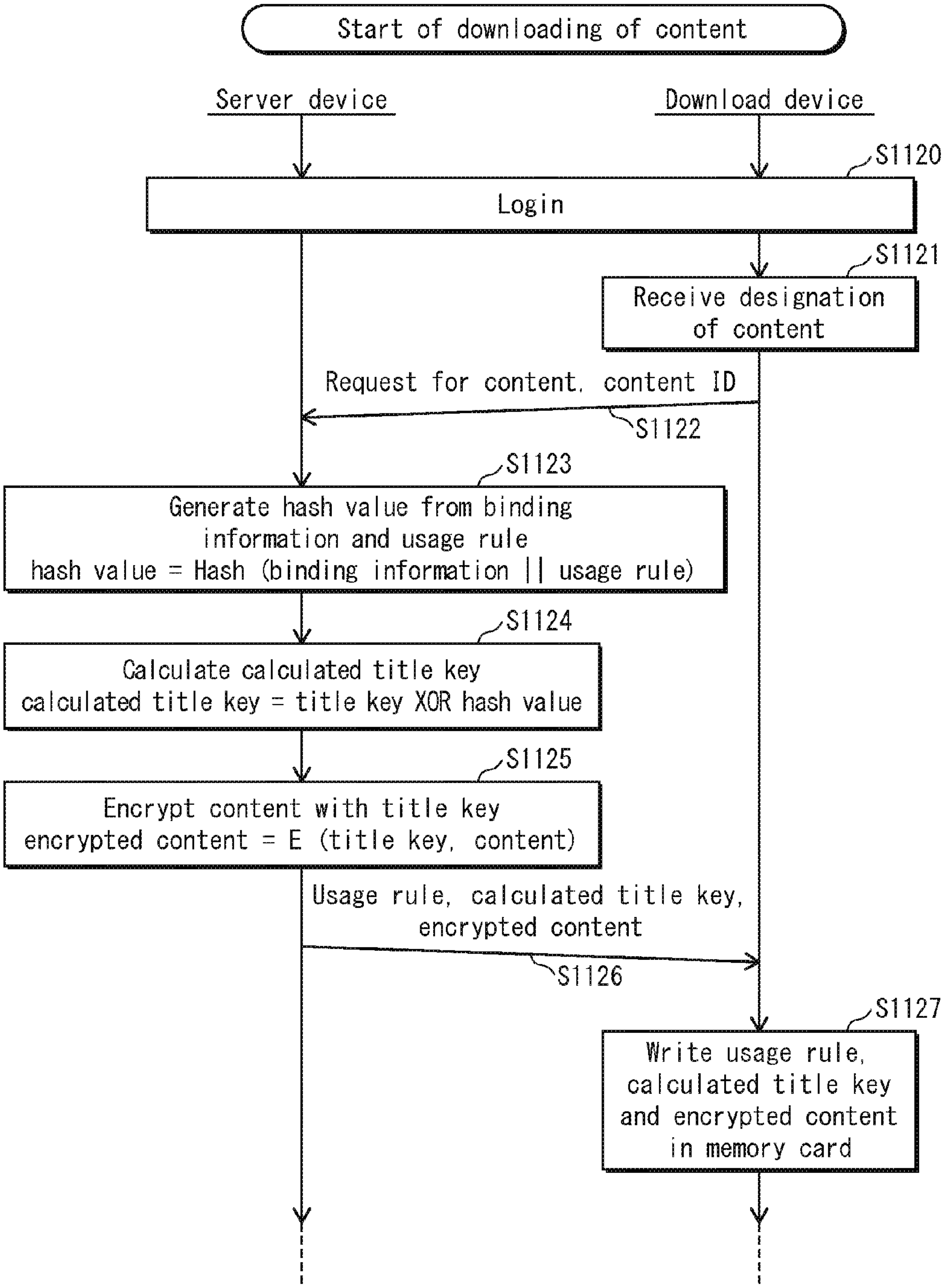
FIG. 8 is a sequence diagram showing a content download operation.

The following describes a download operation performed by the download device 500*b* to acquire the encrypted content and other information from the server device 100*b*, with reference to the sequence diagram shown in FIG. 8.

The download device 500*b* logs in the server device 100*b*. At this point, the download device 500*b* transmits the user ID and the password to the server device 100*b* (step S1120). Note that the operation for logging in the server device 100*b* is the same as steps S1101 through S1106 shown in FIG. 7, and therefore a description thereof is omitted.

The input unit 502*b* receives a designation of content from a user. To be specific, the input unit 502*b* receives a content ID. Here, the content ID is identification information identifying content. Next, the input unit 502*b* outputs the received content ID to the control unit 504*b* (step S1121).

The control unit 504*b* transmits a request for the content and the content ID to the server device 100*b* via the transmission/reception unit 501*b* and the network 20*b* (step S1122).

The transmission/reception unit 106*b* receives the request for the content and the content ID from the download device 500*b* via the network 20*b*. Next, the transmission/reception unit 106*b* outputs the request for the content and the content ID to the control unit 105*b* (step S1122).

When receiving the request for the content, the hash unit 103*b* reads the binding information corresponding to the received user ID from the binding information table 126*b* under the control of the control unit 105*b*. Next, the hash unit 103*b* reads a usage rule corresponding to the received content ID from the storage unit 101*b*. Next, the hash unit 103*b* calculates a hash value from the binding information and the usage rule by the following expression. Next, the hash unit 103*b* outputs the calculated hash value to the calculation unit 102*b*.

hash value=Hash(binding information||usage rule)(step S1123)

Next, the calculation unit 102*b* reads a title key corresponding to the received content ID from the storage unit 101*b* under the control of the control unit 105*b*. The calculation unit 102*b* also receives the hash value from the hash unit 103*b*. Next, the calculation unit 102*b* calculates the calculated title key from the title key and the hash value by the following expression.

calculated title key=title key XOR hash value (step S1124)

Next, the encryption unit 104*b* reads content corresponding to the received content ID from the storage unit 101*b* under the control of the control unit 105*b*. The encryption unit 104*b* reads the title key corresponding to the received content ID from the storage unit 101*b*. Next, the encryption unit 104*b* generates encrypted content by performing the encryption algorithm E on the content with the read title key.

encrypted content=*E*(title key,content)(step S1125)

Next, the control unit 105*b* controls the transmission/reception unit 106*b* to transmit, to the download device 500*b*, the usage rule stored in the storage unit 101*b* and corresponding to the received content ID, the calculated title key generated by the calculation unit 102*b*, and the encrypted content generated by the encryption unit 104*b* via the network 20*b* (step S1126).

The transmission/reception unit 501*b* receives the usage rule, the calculated title key and the encrypted content from the server device 100*b* via the network 20*b* (step S1126).

The input/output unit 505*b* outputs the usage rule, the calculated title key, and the encrypted content to the memory card 600*b*. The input/output unit 602*b* receives the usage rule, the calculated title key and the encrypted content, and writes the received usage rule, calculated title key and encrypted content in the memory unit 603*b* (step S1127).

Operation for downloading content ends here.

(3) Operation for Playing Back Content

Figure 9:
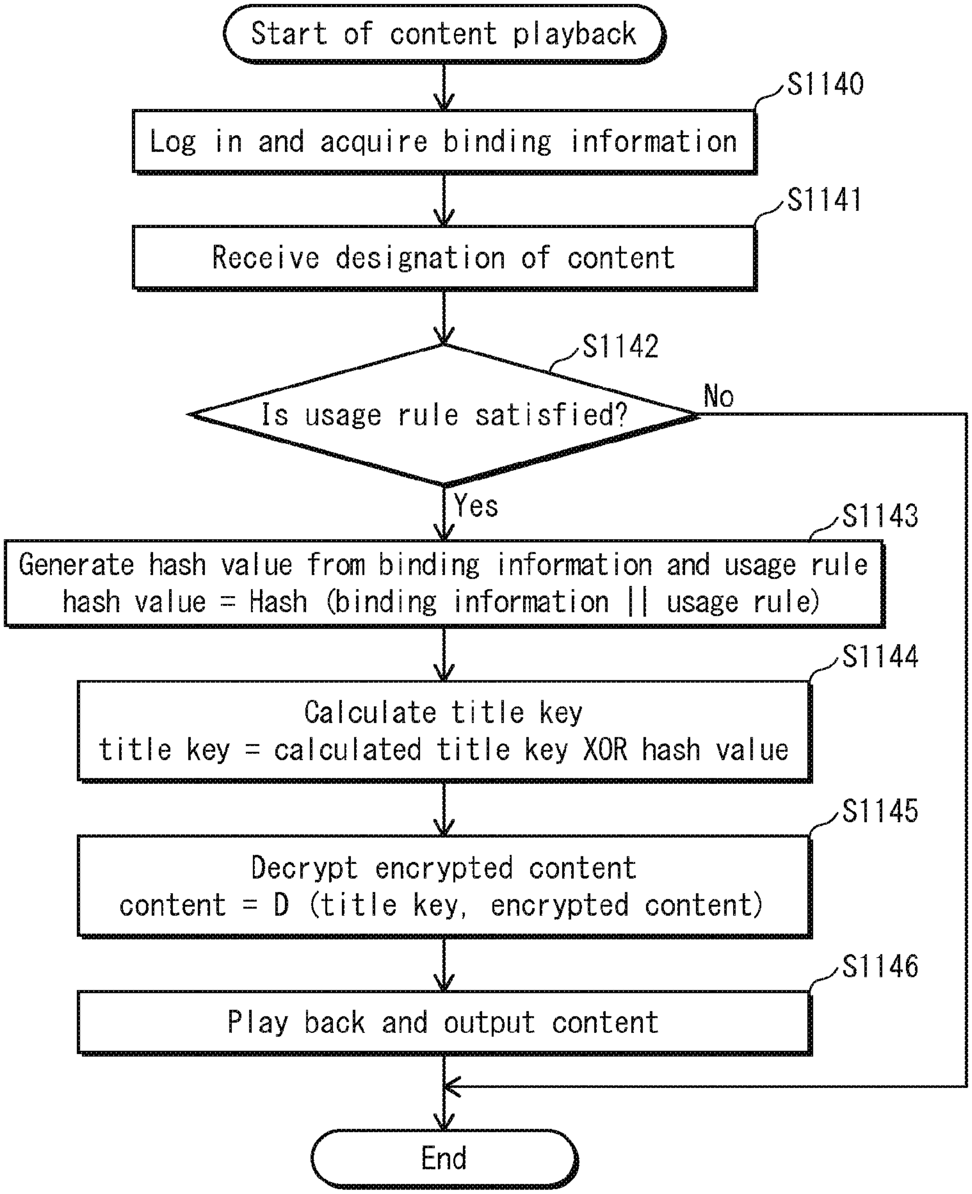
FIG. 9 is a sequence diagram showing a content playback operation.

The following describes operations of the playback device 700*b* of decrypting the encrypted content stored in the memory card 600*b* and playing back the decrypted content, with reference to FIG. 9.

The playback device 700*b* logs in the server device 100*b* and acquires the binding information corresponding to the user ID. At this point, the playback device 700*b* transmits the user ID and the password to the server device 100*b* (step S1140). Note that details on login and acquisition of the binding information are as shown in FIG. 7.

The input unit 709*b* receives a designation of content from a user. To be specific, the input unit 709*b* receives input of the content ID. Next, the input unit 709*b* outputs the received content ID to the control unit 703*b* (step S1141).

Next, the control unit 703*b* reads a usage rule corresponding to the received content ID from the memory card 600*b*, and judges whether the content identified by the content ID satisfies the read usage rule (step S1142). When the content does not satisfy the usage rule ("No" in step S1142), the playback device 700*b* ends the operation for playing back the content.

When the content satisfies the usage rule ("Yes" in step S1142), the hash unit 704*b* reads the binding information from the storage unit 702*b* under the control of the control unit 703*b*. Next, the hash unit 704*b* generates concatenated data by concatenating the read binding information and the read usage rule in this order. Next, the hash unit 704*b* performs a hash calculation on the generated concatenated data to calculate a hash value, and outputs the calculated hash value to the calculation unit 705*b*.

hash value=Hash(binding information||usage rule)(step S1143)

Next, the calculation unit 705*b* reads the calculated title key from the memory card 600*b* and receives the hash value from the hash unit 704*b* under the control of the control unit 703*b*. Next, the calculation unit 705*b* performs an exclusive OR operation XOR on the read calculated title key and the received hash value to generate a title key, and outputs the generated title key to the decryption unit 706*b*.

title key=calculated title key XOR hash value (step S1144)

Next, the decryption unit 706*b* receives the title key from the calculation unit 705*b* and reads the encrypted content 623*b* from the memory card 600*b* under the control of the control unit 703*b*. Next, the decryption unit 706*b* decrypts the read encrypted content 623*b* with the received title key to reproduce content, and outputs the reproduced content to the playback unit 707*b*.

content=D(title key,encrypted content)(step S1145)

The playback unit 707*b* receives the content from the decryption unit 706*b*. Next, the playback unit 707*b* generates image data and audio data by expanding the received content. The monitor 710*b* displays the image data as video, and outputs the audio data as audio (step S1146).

Operation for playing back content performed by the playback device 700*b* ends here.

2.7 Summary

As set forth above, the content distribution system 10*b* can permit the use of content depending on a user. It is therefore possible to provide content according to a licensing scheme that achieves a proper balance between the protection of content provider's rights and user convenience.

2.8 Modification (1) In the above description, the server device 100*b* generates the binding information by concatenating the user ID and the password in this order to generate concatenated data and performing a hash calculation denoted as Hash, which is a one-way operation, on the concatenated data. However, the generation of the binding information is not limited to this. The binding information only has to be unique to a user.

The server device 100*b* may include a generation unit, and the generation unit may generate the binding information based on a user ID that is unique information unique to a user.

For example, the generation unit may generate the binding information including the user ID.

Alternatively, the generation unit may generate the binding information by using the user ID, for example. To be specific, the generation unit may perform a hash calculation denoted as Hash, which is a one-way operation, on the user ID to generate a hash value, and use the generated hash value as the binding information.

The server device 100*b* associates the user ID with the binding information, and stores therein the user ID and the binding information. The playback device 700*b* acquires the binding information associated with the user ID from the server device 100*b*.

(2) The download device 500*b* and the playback device 700*b* may be constituted as one recording/playback device.

Also, the recording/playback device may include a memory unit composed of an internal memory device and a control LSI, instead of using the portable memory card 600*b*. The memory device stores data therein. The control LSI controls input and output of the data stored in the memory device. The memory unit has the same structure as the memory card 600*b*.

The recording/playback device receives the usage rule, the calculated title key and the encrypted content from the server device 100*b*, and writes the received usage rule, calculated title key and encrypted content to the memory unit.

Further, the recording/playback device acquires the binding information from the server device 100*b*, and reads the usage rule, the calculated title key and the encrypted content from the memory unit. Next, the recording/playback device decrypts the encrypted content with the use of the binding information, the usage rule, and the calculated title key, and plays back the decrypted content.

3. Embodiment 3

The following describes a content distribution system 10*c* as Embodiment 3 of the present invention with reference to the drawings.

3.1 Content Distribution System 10*c*

Figure 10:
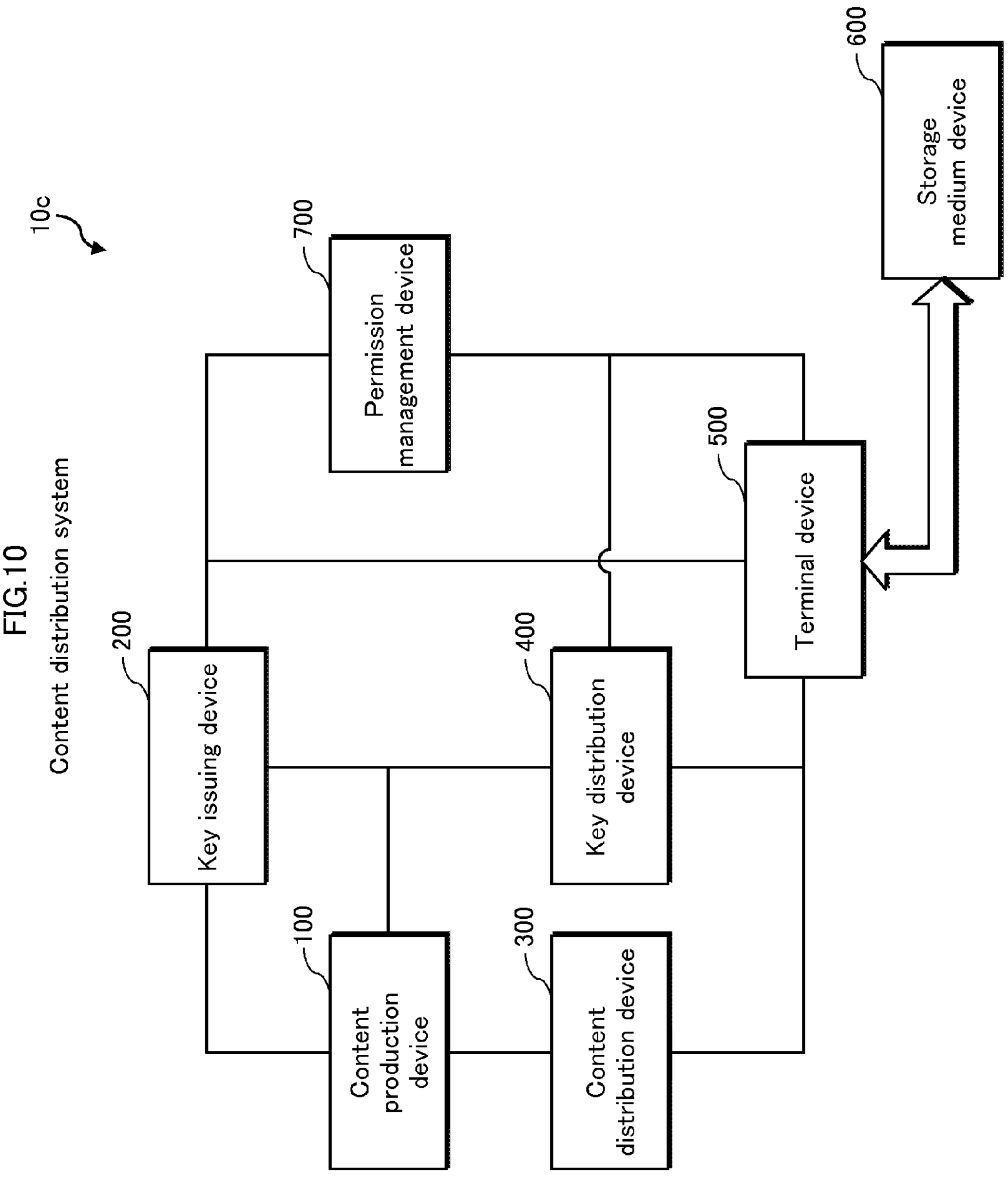
FIG. 10 shows a structure of a content distribution system 10*c* as Embodiment 3 of the present invention.

The content distribution system 10*c* includes a content production device 100, a key issuing device 200, a content distribution device 300, a key distribution device 400, a terminal device 500, a storage medium device 600 and a permission management device 700, as shown in FIG. 10.

The content production device 100, the key issuing device 200, the content distribution device 300, the key distribution device 400, the terminal device 500 and the permission management device 700 are connected to a network represented by the Internet. The storage medium device 600 is a portable memory card, and is inserted into the terminal device 500.

The following describes the outline of a distribution path through which content and a title key that are generated by the content production device 100 reach the terminal device 500 that plays back the content.

The content production device 100 transmits the produced content to the content distribution device 300. The content distribution device 300 encrypts the received content with the title key. Next, the content distribution device 300 transmits the encrypted content to the terminal device 500. The terminal device 500 receives the encrypted content, and records the received encrypted content in the storage medium device 600.

After using the title key to encrypt the content, the content production device 100 transmits the title key to the key distribution device 400. The key distribution device 400 modifies the title key along with a UR (Usage Rule). Next, the key distribution device 400 transmits the modified title key to the storage medium device 600 via the terminal device 500 as a dumb pipe. The storage medium device 600 records therein the modified title key.

The terminal device 500 reads the encrypted content and the modified title key that are stored in the storage medium device 600, and decrypts the encrypted content and plays back the decrypted content.

The key distribution device 400 manages account information. The account information is permission information used by a user to log in the server device. The key distribution device 400 registers information and a content number that are related to content owned by the user to the permission management device 700. When permission to use the content belongs to domain, the key distribution device 400 generates a content secret number that is to be embedded in a Usage Rule and used for the title key calculation, and registers the content secret number in the permission management device 700.

Here, the domain refers to a management organization that manages content. When the permission to use the content belongs to the domain, a user who desires to use the content requests permission to use the content from the management organization.

The permission management device 700 receives a content playback request from the terminal device 500, and notifies the terminal device 500 of whether the user is permitted to play the content.

3.2 Detailed Configuration of Content Production Device 100

Figure 11:
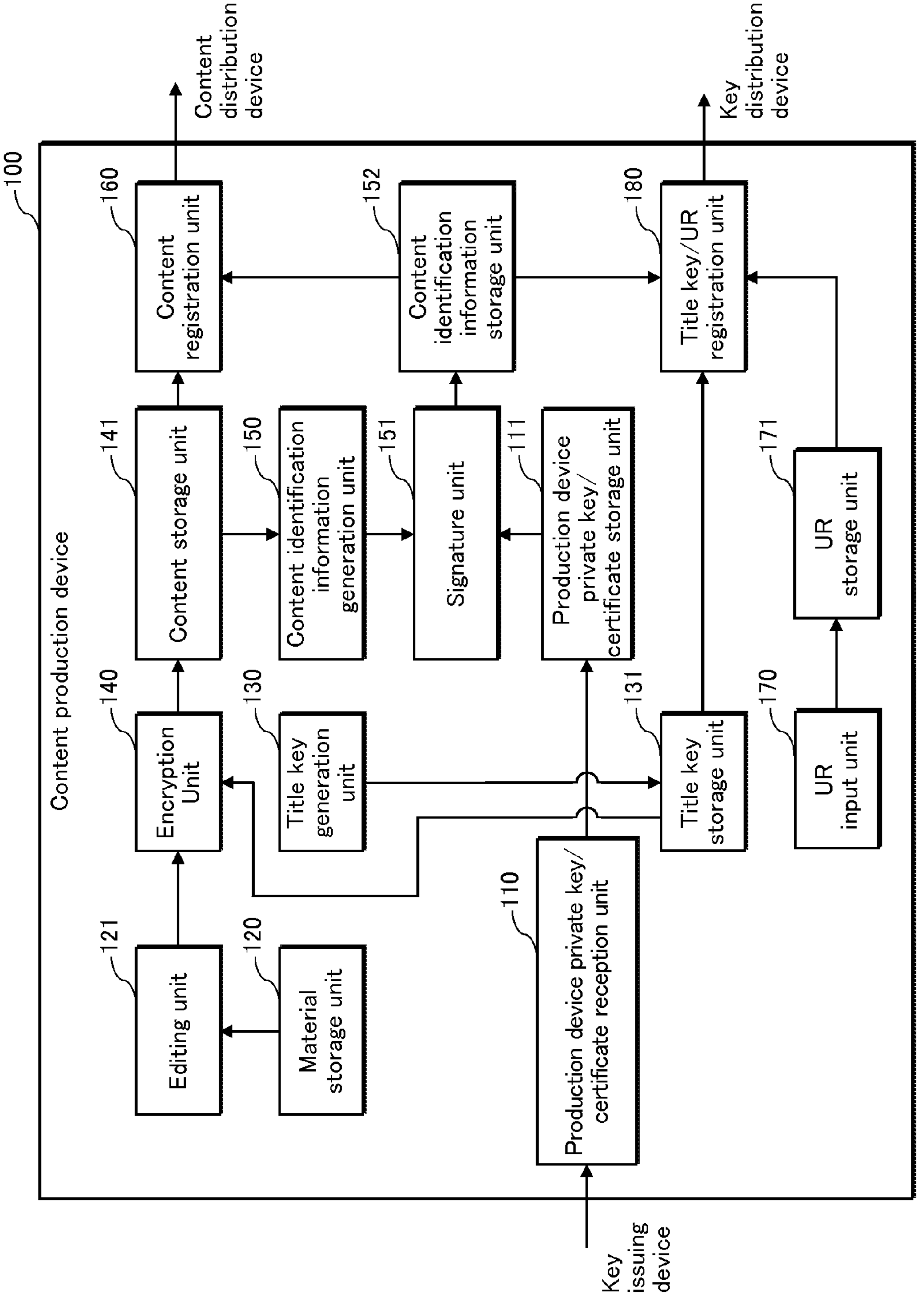
FIG. 11 is a block diagram showing a structure of a content production device 100.

FIG. 11 shows the detailed configuration of the content production device 100.

As shown in FIG. 11, the content production device 100 includes a production device private key/certificate reception unit 110, a production device private key/certificate storage unit 111, a material storage unit 120, an editing unit 121, a title key generation unit 130, a title key storage unit 131, an encryption unit 140, a content storage unit 141, a content identification information generation unit 150, a signature unit 151, a content identification information storage unit 152, a content registration unit 160, a UR input unit 170, a UR storage unit 171, and a title key/UR registration unit 180.

(Production Device Private Key/certificate Reception Unit 110)

The production device private key/certificate reception unit 110 receives a pair of a production device private key and a production device certificate from the key issuing device 200.

(Production Device Private Key/certificate Storage Unit 111)

The production device private key/certificate storage unit 111 stores therein the pair of the production device private key and the production device certificate that has been received by the production device private key/certificate reception unit 110.

(Material Storage Unit 120)

The material storage unit 120 stores materials of video, audio and the likes of a movie for example. Explanation for production of video and audio is omitted.

(Editing Unit 121)

The editing unit 121 edits the materials stored in the material storage unit 120 in response to operations by the operator. As a result of this, video/audio data is generated.

(Title Key Generation Unit 130)

The title key generation unit 130 generates a title key. The title key generation unit 130 generates a random number and determines the random number as the title key, for example. Here, the title key is 128-bit long, for example.

(Title Key Storage Unit 131)

The title key storage unit 131 stores therein the title key generated by the title key generation unit 130.

(Encryption Unit 140)

The encryption unit 140 generates content by encrypting, with the title key stored in the title key storage unit 131, the video/audio data that has been generated by the editing unit 121 through editing. Unless otherwise specified, encrypted content is hereinafter referred to as content.

(Content Storage Unit 141)

The content storage unit 141 stores therein content (encrypted video/audio data) generated by the encryption unit 140.

(Content Identification Information Generation Unit 150)

The content identification information generation unit 150 generates content identification information from the content stored in the content storage unit 141.

For example, the content identification information generation unit 150 divides the content into a plurality of portions, and calculates a hash value of each portion. Next, the content identification information generation unit 150 generates a hash table including the obtained hash values. Further, the content identification information generation unit 150 may calculate a hash value of the generated hash table, and determine the hash value as content identification information identifying the content.

Alternatively, the content identification information generation unit 150 transmits the generated hash table to the key issuing device 200. The key issuing device 200 assigns a unique value to the received hash table, and adds the unique value to hash table data. Further, the key issuing device 200 generates signature data by providing the digital signature to the hash table to which the unique value has been added. The key issuing device 200 adds the generated signature data to the hash table. By adding the signature data to the hash table in this way, the unique value is prevented from being tampered with. Next, the key issuing device 200 transmits the hash table to the content production device 100. The content identification information generation unit 150 may receive the hash table, extract the unique value from the hash table, and determine the extracted unique value as the content identification information.

(Signature Unit 151)

The signature unit 151 generates signature data by providing the digital signature to the content identification information generated by the content identification information generation unit 150 with the use of the production device private key stored in the production device private key/certificate storage unit 111. Next, the signature unit 151 adds the generated signature data to the content identification information. The content identification information is thus protected from being tampered with. Note that when the key issuing device 200 adds the signature data to the hash table, as described as an example in the description of the content identification information generation unit 150, the signature unit 151 may not add the signature data to the content identification information since the addition of the signature data by the signature unit 151 is redundant.

(Content Identification Information Storage Unit 152)

The content identification information storage unit 152 stores therein the content identification information generated by the signature unit 151 and the content identification information generation unit 150.

(Content Registration Unit 160)

The content registration unit 160 transmits the content stored in the content storage unit 141 and the hash table generated during the generation process by the content identification information generation unit 150 as one content piece to the content distribution device 300 so as to cause the content distribution device 300 to register the one content piece. Note that the hash table may not be transmitted nor registered.

(UR Input Unit 170)

The UR input unit 170 receives a UR input by the operator. Here, the UR is information indicating a condition necessary for playing back and moving content recorded in the storage medium device 600.

(UR Storage Unit 171)

The UR storage unit 171 stores therein the UR received by the UR input unit 170.

(Title Key/UR Registration Unit 180)

The title key/UR registration unit 180 reads the title key stored in the title key storage unit 131, and the UR stored in the UR storage unit 171. Next, the title key/UR registration unit 180 transmits the title key and the UR to the key distribution device 400, and causes the key distribution device 400 to register the title key and the UR.

3.3 Operation of Content Production Device 100

Figure 12:
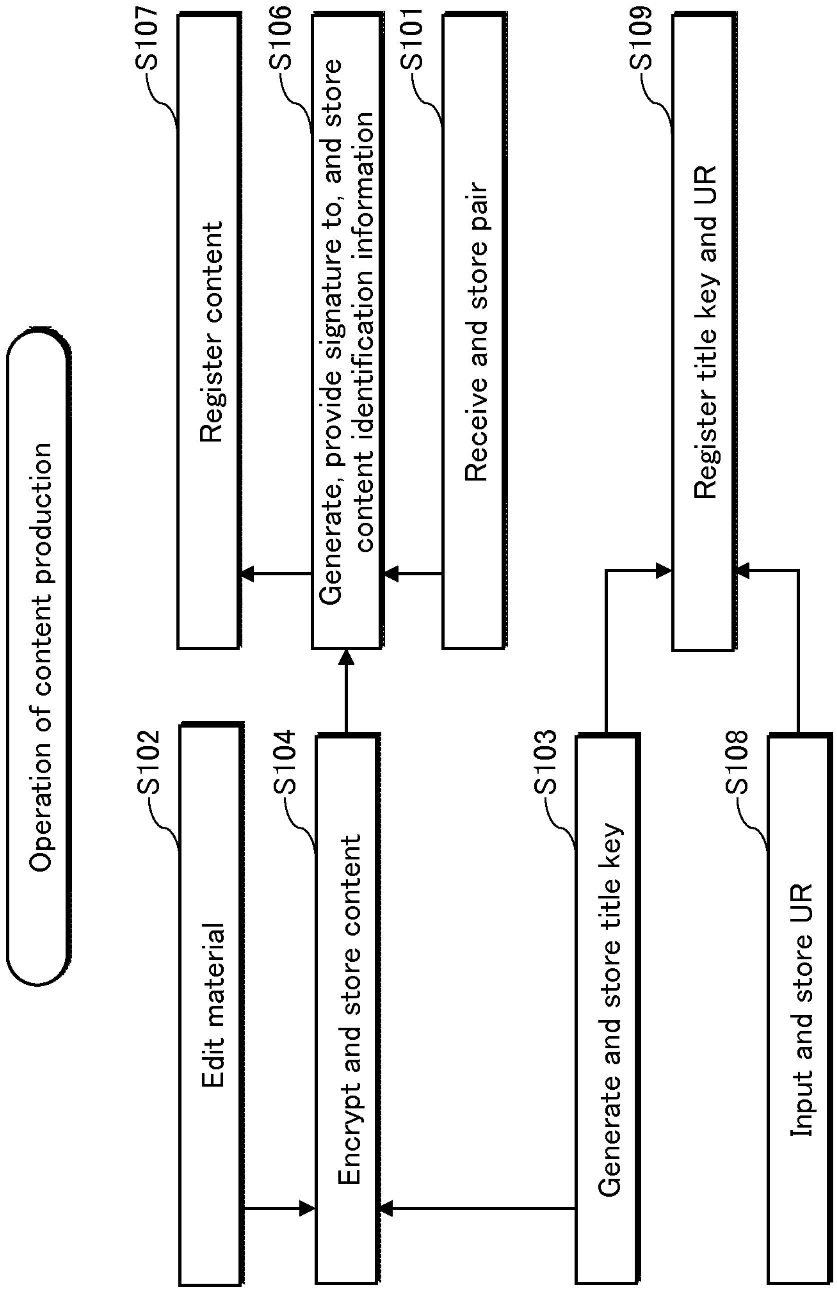
FIG. 12 is a flowchart showing an operation of the content production device 100.

The following describes an operation of the content production device 100 with reference to the flowchart shown in FIG. 12.

The production device private key/certificate reception unit 110 receives the pair of the production device private key and the production device certificate from the key issuing device 200, and the production device private key/certificate storage unit 111 stores therein the pair of the production device private key and the production device certificate (S101).

The editing unit 121 edits the material stored in the material storage unit 120 to generate video/audio data (S102).

The title key generation unit 130 generates the title key and stores the generated title key in the title key storage unit 131 (S103).

The encryption unit 140 encrypts the video/audio data generated by the editing unit 121 through editing with the title key stored in the title key storage unit 131, and stores the generated content in the content storage unit 141 (S104).

The content identification information generation unit 150 reads the content stored in the content storage unit 141, and generates content identification information unique to the content. Further, the signature unit 151 generates signature data by providing the digital signature to the content identification information generated by the content identification information generation unit 150, adds the signature data to the content identification information, and stores the content identification information in the content identification information storage unit 152 (S106).

The content registration unit 160 transmits the content stored in the content storage unit 141 to the content distribution device 300, and causes the content distribution device 300 to register the content (S107).

The UR input unit 170 receives a UR that is a rule for playing back and moving content, etc., which is input by the operator of the content production device 100, and stores the received UR in the UR storage unit 171 (S108).

The title key/UR registration unit 180 puts the title key stored in the title key storage unit 131 and the UR stored in the UR storage unit 171 into a pair, transmits the pair to the key distribution device 400, and causes the key distribution device 400 to register the title key and the UR (S109).

3.4. Detailed Configuration of Key Issuing Device 200

Figure 13:
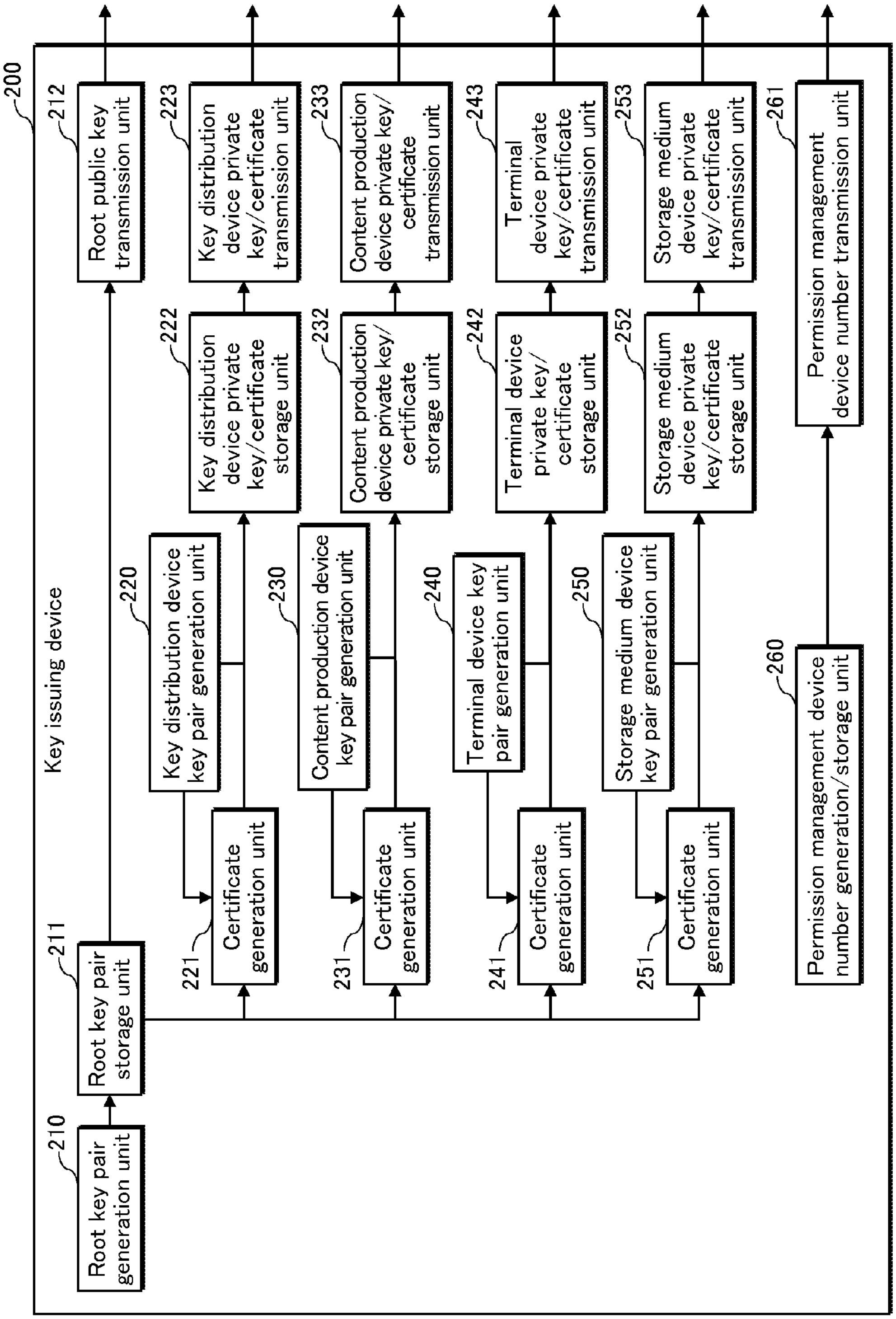
FIG. 13 is a block diagram showing a structure of a key issuing device 200.

FIG. 13 shows detailed configuration of the key issuing device 200.

As shown in FIG. 13, the key issuing device 200 includes a root key pair generation unit 210, a root key pair storage unit 211, a root public key transmission unit 212, a key distribution device key pair generation unit 220, a certificate generation unit 221, a key distribution device private key/certificate storage unit 222, a key distribution device private key/certificate transmission unit 223, a content production device key pair generation unit 230, a certificate generation unit 231, a content production device private key/certificate storage unit 232, a content production device private key/certificate transmission unit 233, a terminal device key pair generation unit 240, a certificate generation unit 241, a terminal device private key/certificate storage unit 242, a terminal device private key/certificate transmission unit 243, a storage medium device key pair generation unit 250, a certificate generation unit 251, a storage medium device private key/certificate storage unit 252, a storage medium device private key/certificate transmission unit 253, a permission management device number generation/storage unit 260 and a permission management device number transmission unit 261.

(Root Key Pair Generation Unit 210)

The root key pair generation unit 210 generates a key pair consisting of a root public key and a root private key for the key issuing device 200. The key pair consisting of the root public key and the root private key is the security core in the content distribution system 10*c*.

(Root Key Pair Storage Unit 211)

The root key pair storage unit 211 stores therein the key pair consisting of the root public key and the root private key generated by the root key pair generation unit 210.

(Root Public Key Transmission Unit 212)

The root public key transmission unit 212 transmits the root public key stored in the root key pair storage unit 211 to the key distribution device 400, the terminal device 500, and the storage medium device 600.

(Key Distribution Device Key Pair Generation Unit 220)

The key distribution device key pair generation unit 220 generates a key distribution device key pair consisting of a key distribution device public key and a key distribution device private key that is to be assigned to the key distribution device 400.

(Certificate Generation Unit 221)

The certificate generation unit 221 generates signature data by providing the digital signature to the key distribution device public key generated by the key distribution device key pair generation unit 220 and other data with the use of the root private key stored in the root key pair storage unit 211. Next, the certificate generation unit 221 adds the generated signature data to the key distribution device public key and the other data to generate a key distribution device certificate.

FIG. 14A shows an example of the key distribution device certificate. The key distribution device certificate C101 shown in FIG. 14A includes a key distribution device ID (C102), a key distribution device public key C103 and signature data C104.

(Key Distribution Device Private Key/certificate Storage Unit 222)

The key distribution device private key/certificate storage unit 222 stores therein the key distribution device private key generated by the key distribution device key pair generation unit 220 and the key distribution device certificate generated by the certificate generation unit 221 as a pair.

(Key Distribution Device Private Key/certificate Transmission Unit 223)

The key distribution device private key/certificate transmission unit 223 transmits the pair consisting of the key distribution device private key and the key distribution device certificate stored in the key distribution device private key/certificate storage unit 222 to the key distribution device 400.

(Content Production Device Key Pair Generation Unit 230)

The content production device key pair generation unit 230 generates a content production device key pair consisting of a content production device public key and a content production device private key that is to be assigned to the content production device 100.

(Certificate Generation Unit 231)

The certificate generation unit 231 generates signature data by providing the digital signature to the content production device public key generated by the content production device key pair generation unit 230 and other data with the use of the root private key stored in the root key pair storage unit 211. Next, the certificate generation unit 231 adds the signature to the content production device public key and the other data to generate a content production device certificate.

FIG. 14B shows an example of the content production device certificate. The content production device certificate C106 shown in FIG. 14B includes a content production device ID (C107), a content production device public key C108 and signature data C109.

(Content Production Device Private Key/certificate Storage Unit 232)

The content production device private key/certificate storage unit 232 stores therein the content production device private key generated by the content production device key pair generation unit 230 and the content production device certificate generated by the certificate generation unit 231 as a pair.

(Content Production Device Private Key/certificate Transmission Unit 233)

The content production device private key/certificate transmission unit 233 transmits the pair consisting of the content production device private key and the content production device certificate stored in the content production device private key/certificate storage unit 232 to the content production device 100.

(Terminal Device Key Pair Generation Unit 240)

The terminal device key pair generation unit 240 generates a terminal device key pair consisting of a terminal device public key and a terminal device private key that is to be assigned to the terminal device 500.

(Certificate Generation Unit 241)

The certificate generation unit 241 generates signature data by providing the digital signature to the terminal device public key generated by the terminal device key pair generation unit 240 and other data with the use of the root private key stored in the root key pair storage unit 211. Next, the certificate generation unit 241 adds the signature data to the terminal device public key and the other data to generate a terminal device certificate.

FIG. 14C shows an example of the terminal device certificate. The terminal device certificate C111 shown in FIG. 14C includes a terminal device ID (C112), a terminal device public key C113 and signature data C114.

(Terminal Device Private Key/certificate Storage Unit 242)

The terminal device private key/certificate storage unit 242 stores therein the terminal device private key generated by the terminal device key pair generation unit 240 and the terminal device certificate generated by the certificate generation unit 241 as a pair.

(Terminal Device Private Key/certificate Transmission Unit 243)

The terminal device private key/certificate transmission unit 243 transmits the pair consisting of the terminal device private key and the terminal device certificate stored in the terminal device private key/certificate storage unit 242 to the terminal device 500.

(Storage Medium Device Key Pair Generation Unit 250)

The storage medium device key pair generation unit 250 generates a storage medium device key pair consisting of a storage medium device public key and a storage medium device private key that is to be assigned to the storage medium device 600.

(Certificate Generation Unit 251)

The certificate generation unit 251 generates signature data by providing the digital signature to the storage medium device public key generated by the storage medium device key pair generation unit 250 and other data with the use of the root private key stored in the root key pair storage unit 211. Next, the certificate generation unit 251 adds the signature data to the storage medium device public key and the other data to generate a storage medium device certificate.

FIG. 14D shows an example of the storage medium device certificate. The storage medium device certificate C116 shown in FIG. 14D includes a storage medium device ID (C117), a storage medium device public key C118 and signature data C119.

(Storage Medium Device Private Key/certificate Storage Unit 252)

The storage medium device private key/certificate storage unit 252 stores therein the storage medium device private key generated by the storage medium device key pair generation unit 250 and the storage medium device certificate generated by the certificate generation unit 251 as a pair.

(Storage Medium Device Private Key/certificate Transmission Unit 253)

The storage medium device private key/certificate transmission unit 253 outputs the pair consisting of the storage medium device private key and the storage medium device certificate stored in the storage medium device private key/certificate storage unit 252 to the storage medium device 600.

(Permission Management Device Number Generation/storage Unit 260)

The permission management device number generation/storage unit 260 generates a unique permission management device number that is to be assigned to the permission management device 700, and stores therein the generated permission management device number.

(Permission Management Device Number Transmission Unit 261)

The permission management device number transmission unit 261 transmits one of the permission management device numbers stored in the permission management device number generation/storage unit 260 to the permission management device 700 in response to a request from the permission management device 700.

3.5 Key Issuing Operation by Key Issuing Device 200

The following describes an operation for issuing keys, performed by the key issuing device 200, with reference to the flowchart shown in FIG. 15.

The key issuing device 200 generates the root key pair consisting of the root public key and the root private key, and stores therein the root key pair. In response to a request, the key issuing device 200 transmits the root public key to the key distribution device 400 and the terminal device 500, and outputs the root public key to the storage medium device 600 (S201).

The key issuing device 200 generates the key pair consisting of the key distribution device public key and the key distribution device private key, stores therein the key pair, and transmits the key pair to the key distribution device 400 (S202).

The key issuing device 200 generates the key pair consisting of the content production device public key and the content production device private key, stores therein the key pair, and transmits the key pair to the content production device 100 (S203).

The key issuing device 200 generates the key pair consisting of the terminal device public key and the terminal device private key, stores therein the key pair, and transmits the key pair to the terminal device 500 (S204).

The key issuing device 200 generates the key pair consisting of the storage medium device public key and the storage medium device private key, stores therein the key pair, and transmits the key pair to the storage medium device 600 (S205).

The key issuing device 200 generates the permission management device number that is to be assigned to the permission management device 700, stores therein the permission management device number, and transmits the permission management device number to the permission management device 700 in response to the request from the permission management device 700 (S206).

3.6 Detailed Configuration of Content Distribution Device 300

Figure 16:
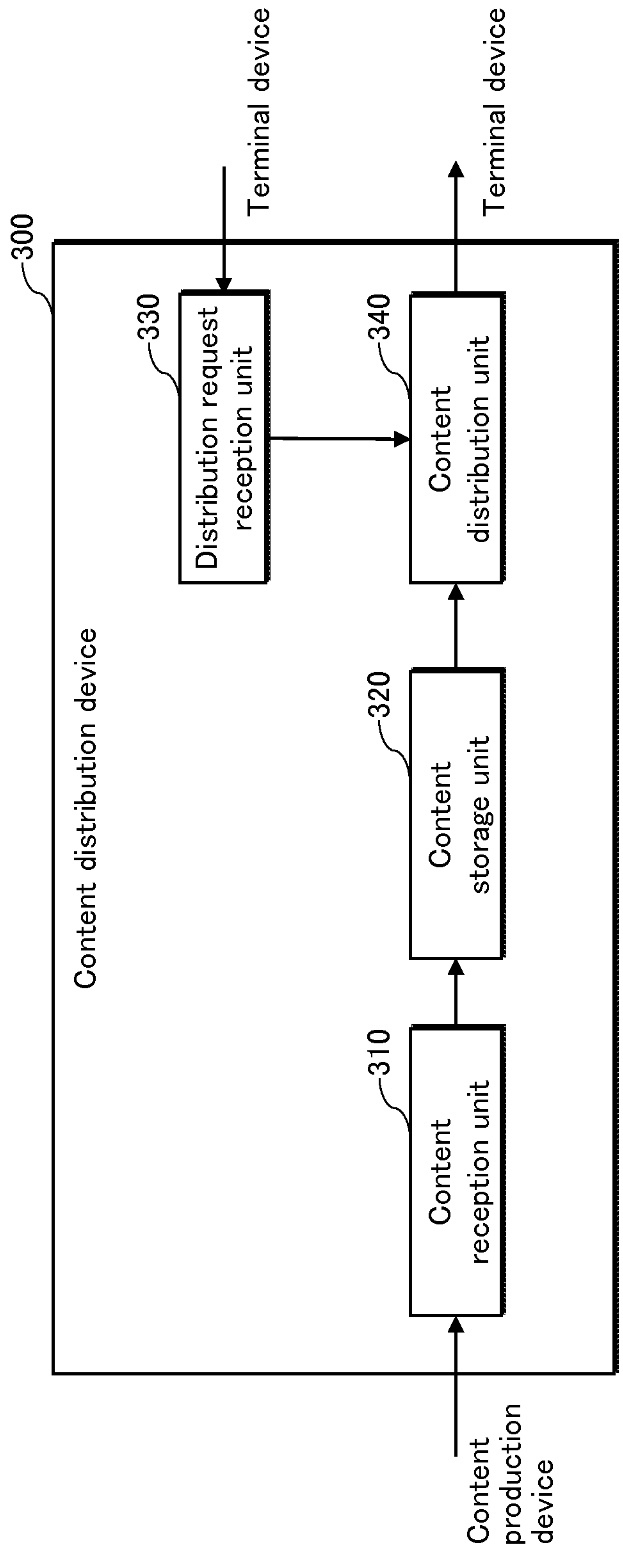
FIG. 16 is a block diagram showing a structure of a content distribution device 300.

FIG. 16 shows the detailed configuration of the content distribution device 300.

The content distribution device 300 includes a content reception unit 310, a content storage unit 320, a distribution request reception unit 330 and a content distribution unit 340, as shown in FIG. 16.

(Content Reception Unit 310)

The content reception unit 310 receives content from the content production device 100. Next, the content reception unit 310 writes the received content in the content storage unit 320.

(Content Storage Unit 320)

The content storage unit 320 is composed of a hard disk unit, for example. The content storage unit 320 has as area for storing the content received by the content reception unit 310.

(Distribution Request Reception Unit 330)

The distribution request reception unit 330 receives distribution request data for content from the terminal device 500. When receiving the distribution request data, the distribution request reception unit 330 instructs the content distribution unit 340 to distribute content designated by the distribution request data.

Figure 17:
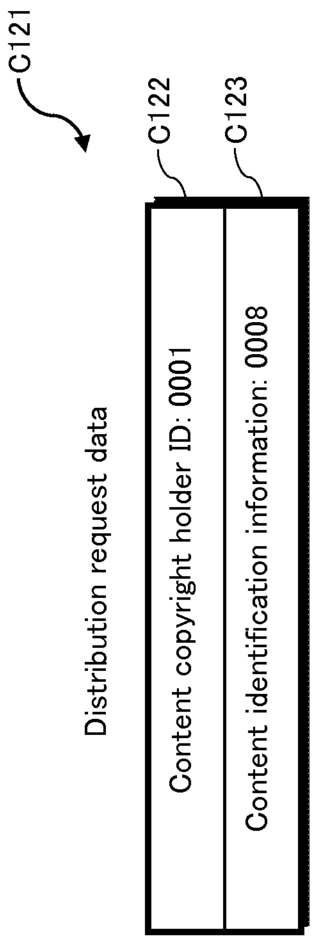
FIG. 17 shows a data structure of distribution request data C121.

FIG. 17 shows an example of the data structure of the distribution request data. The distribution request data C121 shown in FIG. 17 includes a content copyright holder ID (C122) and content identification information C123. The content copyright holder ID (C122) is identification information identifying a person holding the copyright of content. The content identification information C123 is identification information identifying the content.

(Content Distribution Unit 340)

The content distribution unit 340 receives, from the distribution request reception unit 330, an instruction to distribute content. When receiving the instruction to distribute content, the content distribution unit 340 searches the content storage unit 320 for content identified by the content identification information included in the distribution request data. When finding the content, the content distribution unit 340 distributes the found content to the terminal device 500.

3.7 Content Distribution Operation by Content Distribution Device 300

Figure 18:
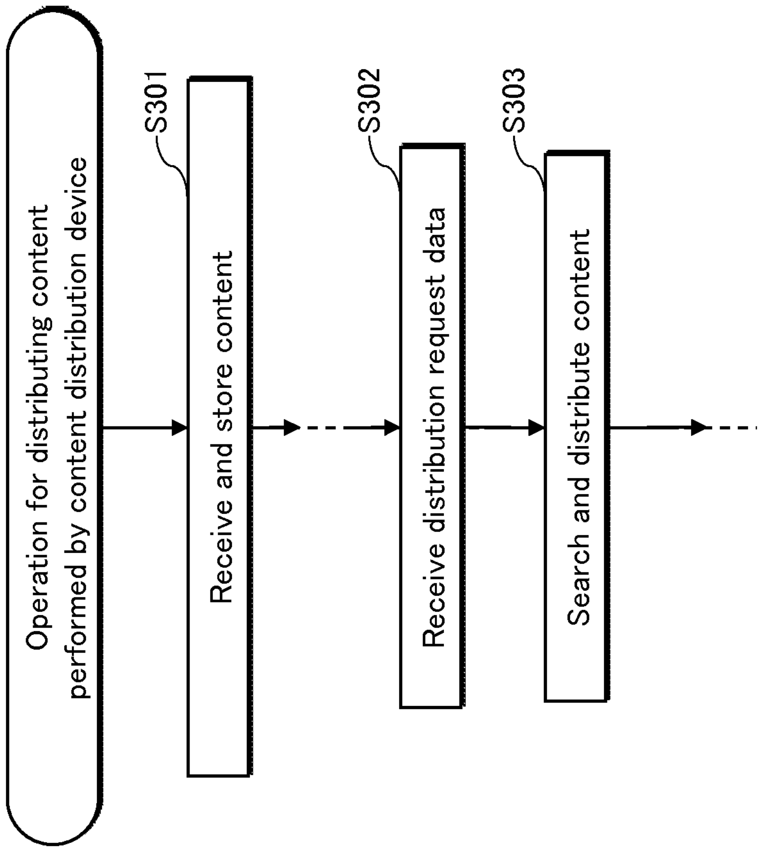
FIG. 18 is a flowchart showing an operation of the content distribution device 300.

The following describes an operation for distributing content, performed by the content distribution device 300, with reference to the flowchart shown in FIG. 18.

The content distribution device 300 receives content from the content production device 100, and stores the received content in the content storage unit 320 (S301)

The content distribution device 300 receives the distribution request data from the terminal device 500 (S302).

When receiving the distribution request data, the content distribution device 300 searches the content storage unit 320 for content corresponding to the content identification information included in the distribution request data. When finding the corresponding content, the content distribution device 300 distributes the content to the terminal device 500 that issued the request. When not finding the corresponding content, the content distribution device 300 transmits information indicating that the corresponding content was not found to the terminal device 500 that issued the request (S303).

3.8 Detailed Configuration of Key Distribution Device 400

FIG. 19 shows the detailed configuration of the key distribution device 400.

The key distribution device 400 includes a permission management device number reception/storage unit 405, a root public key reception unit 410, a root public key storage unit 411, a key distribution device private key/certificate reception unit 414, a key distribution device private key/certificate storage unit 415, a title key/UR reception unit 421, a title key/content private number/UR generation/storage unit 422, a content registration request unit 423, a mutual authentication unit 430, a title key calculation unit 440, an encryption and decryption unit 441, a storage medium device ID reception unit 450, a MAC calculation unit 451, a first account issuing unit 460, an account management unit 461, a second account issue request unit 462, an account control unit 470 and a viewing permission registration request unit 471, as shown in FIG. 19.

(Permission Management Device Number Reception/storage Unit 405)

The permission management device number reception/storage unit 405 receives the permission management device number from the permission management device 700, and stores therein the received permission management device number.

(Root Public Key Reception Unit 410)

The root public key reception unit 410 receives the root public key from the key issuing device 200, and writes the received root public key in the root public key storage unit 411.

(Root Public Key Storage Unit 411)

The root public key storage unit 411 stores therein the root public key received by the root public key reception unit 410.

(Key Distribution Device Private Key/certificate Reception Unit 414)

The key distribution device private key/certificate reception unit 414 receives the pair consisting of the key distribution device private key and the key distribution device certificate from the key issuing device 200, and writes the received pair in the key distribution device private key/certificate storage unit 415.

(Key Distribution Device Private Key/certificate Storage Unit 415)

The key distribution device private key/certificate storage unit 415 stores therein the pair consisting of the key distribution device private key and the key distribution device certificate that has been received by the key distribution device private key/certificate reception unit 414.

(Title Key/UR Reception Unit 421)

The title key/UR reception unit 421 receives the title key and the UR from the content production device 100, and writes the received title key and UR in the title key/content private number/UR generation/storage unit 422.

(Title Key/content Private Number/UR Generation/storage Unit 422)

The title key/content private number/UR generation/storage unit 422 stores therein the title key and the UR received by the title key/UR reception unit 421.

FIG. 20 shows an example of the UR. The UR (1410) shown in FIG. 20 includes an output control information area 1411, a domain identification information area 1412, a content private number area 1413, a permission management device number area 1414 and a content number area 1415.

The output control information area 1411 includes a rule regarding a method for outputting content. The rule indicates whether content can be moved, whether content can be copied, the maximum allowed number of copies, whether digital output is possible and whether analog output is possible, for example. The domain identification information area 1412 includes a flag indicating that the permission of the content belongs to domain or a flag indicating that the permission of the content does not belong to domain. Content whose permission belongs to domain is referred to as domain content. Content whose permission does not belong to domain is referred to as non-domain content. When the permission of content does not belong to domain (this is referred to as non-domain), it is possible to play back the content independently of the management by a domain management organization. When content belongs to domain, the content private number area 1413 includes a content private number. When content does not belong to domain, the content private number area 1413 includes zero-padded data. The permission management device number area 1414 includes the permission management device number. The content number area includes the content identification information (content number) identifying the content.

The title key/content private number/UR generation/storage unit 422 also generates a content private number by pairing the title key and the UR, and stores therein the generated content private number. The title key/content private number/UR generation/storage unit 422 may generate a 128-bit random number as a content private number, for example. In the case of a 128-bit random number, a random number may be generated by a random number generator.

When receiving a request for the stored UR from the terminal device 500, the title key/content private number/UR generation/storage unit 422 writes, in the domain identification information area 1412 of the UR, the flag indicating domain content or the flag indicating non-domain content according to the permission of content received by the user. The title key/content private number/UR generation/storage unit 422 writes zero-padded data in the content private number area 1413 of the UR. The title key/content private number/UR generation/storage unit 422 overwrites the permission management device number area 1414 of the UR with the permission management device number stored in the permission management device number reception/storage unit 405. The title key/content private number/UR generation/storage unit 422 overwrites the content number area 1415 of the UR with a content number that is issued when the content registration request unit 423 registers the content. Next, the title key/content private number/UR generation/storage unit 422 transmits the UR to the terminal device 500.

(Content Registration Request Unit 423)

The content registration request unit 423 requests the permission management device 700 to register content when the title key/content private number/UR generation/storage unit 422 additionally stores therein a title key, a content private number, and a UR. The content registration request unit 423 generates a content number (e.g., C01) identifying content, binds the content private number with the content number, and transmits the content private number to the permission management device 700.

(Mutual Authentication Unit 430)

The mutual authentication unit 430 performs mutual authentication with the terminal device 500 or the storage medium device 600, and shares common keys with the terminal device 500 or the storage medium device 600. Details of the mutual authentication are described later.

(Title Key Calculation Unit 440)

The title key calculation unit 440 receives the title key and the UR stored in the title key/content private number/generation/storage unit 422. Next, the title key calculation unit 440 generates a calculated title key by performing a hash calculation on the UR and performing a conversion that is reversible such as an XOR on the obtained hash value and the title key.

calculated title key=title key XOR Hash(UR)(expression 4)

The hash calculation used in the expression 4 needs to be the same as a hash calculation used in expressions 7 and 8, which are described below.

Next, the title key calculation unit 440 transmits the calculated title key to the storage medium device 600 via the encryption and decryption unit 441.

At this point, the title key calculation unit 440 changes part of the UR used in the title key calculation depending on whether the content is domain content or non-domain content.

In the case of domain content, the title key calculation unit 440 writes "1" (indicating domain content) in the domain identification information area 1412 of the UR 1410, and overwrites the content private number area 1413 of the UR 1410 with a content private number stored in the title key/content private number/UR generation/storage unit 422 and regarding the identified content.

In the case of non-domain content, the title key calculation unit 440 writes "0" (indicating non-domain content) in the domain identification information area 1412 of the UR 1410, and pads out with zero in the content private number area 1413 of the UR 1410. Although the content private number area 1413 is zero-padded in the above description, a fixed value other than zero may be used, and alternatively, a value determined according to a certain rule, e.g., a value calculated based on the content number, may be used.

(Encryption and Decryption Unit 441)

The encryption and decryption unit 441 encrypts the calculated title key generated by the title key calculation unit 440 with the common key that has been generated in the mutual authentication process performed by the mutual authentication unit 430. The encryption and decryption unit 441 transmits the encrypted calculated title key to the storage medium device 600.

(Storage Medium Device ID Reception Unit 450)

The storage medium device ID reception unit 450 receives the storage medium device ID identifying a storage medium device to which data is to be written, from the terminal device 500 via the encryption and decryption unit 441. To be specific, the storage medium device ID is encrypted with the common key when the key distribution device 400 receives the storage medium device ID, and before transmitted to the storage medium device ID reception unit 450, the encryption and decryption unit 441 decrypts the encrypted storage medium device ID with the common key and the encrypted storage medium device ID becomes the original storage medium device ID.

(MAC Calculation Unit 451)

The MAC calculation unit 451 calculates Message Authentication Code (MAC) value by a MAC calculation with the use of the title key stored in the title key/content private number/UR generation/storage unit 422 and the storage medium device ID received by the storage medium device ID reception unit 450, and transmits the calculated MAC value to the terminal device 500.

As an example of a MAC calculation, the MAC calculation unit 451 calculates a MAC value by concatenating the title key and the storage medium device ID in this order to generate concatenated data and performing a hash calculation denoted as Hash, which is a one-way operation, on the generated concatenated data, as follows.

MAC value=Hash(title key||storage medium device ID) (expression 5)

The hash calculation used in the expression 5 needs to be the same as a hash calculation used in expression 9, which is described below.

(First Account Issuing Unit 460)

The first account issuing unit 460 generates a pair of an account name and a password in response to a request from the terminal device 500. Next, the first account issuing unit 460 causes the account management unit 461 to record therein the generated pair of the account name and the password. Next, the first account issuing unit 460 transmits the pair of the account name and the password to the terminal device 500.

Note that when the first account issuing unit 460 may receive a candidate pair of an account name and a password from the terminal device 500 and if the existing accounts recorded in the account management unit 461 do not include the same account name, the first account issuing unit 460 may accept the received candidate pair of the account name and the password as an authorized account, and add the pair to the account management unit 461.

Note that while the account is issued in response to the request from the terminal device 500 in the above description, the request may not be from the terminal device 500. For example, an application installed in a device such as a tablet device, a smartphone, a feature phone, a TV, a Blu-ray player, and a DVD player, and a browser installed in a device such as a smartphone, a feature phone, a TV, a Blu-ray player, and a DVD player may transmit a request.

(Account Management Unit 461)

The account management unit 461 stores therein the pair of the account name and the password received from the first account issuing unit 460. This pair is referred to as the first account.

(Second Account Issue Request Unit 462)

When the first account issuing unit 460 newly issues the first account, the second account issue request unit 462 requests the permission management device 700 to issue the second account. Next, the second account issue request unit 462 receives the second account from the permission management device 700. The second account includes a pair of an account name and a password. When receiving the second account, the second account issue request unit 462 stores the second account with the first account stored in the account management unit 461 as a pair. Next, the second account issue request unit 462 requests the first account issuing unit 460 to transmit the newly issued second account to the terminal device 500.

(Account Control Unit 470)

When receiving the first account, which is the pair of the account name and the password, from the terminal device 500, the account control unit 470 judges whether the received first account matches the first account stored in the account management unit 461. When the received first account matches the stored first account, the account control unit 470 continues to download the title key and the UR. When the received first account does not match the stored first account, the account control unit 470 stops downloading the title key and the UR.

(Viewing Permission Registration Request Unit 471)

When content is requested regarding a certain first account, the viewing permission registration request unit 471 transmits the content and the second account corresponding to the first account to the permission management device 700 to request viewing permission registration.

3.9 Mutual Authentication Process

The following describes a mutual authentication process among devices.

Figure 21:
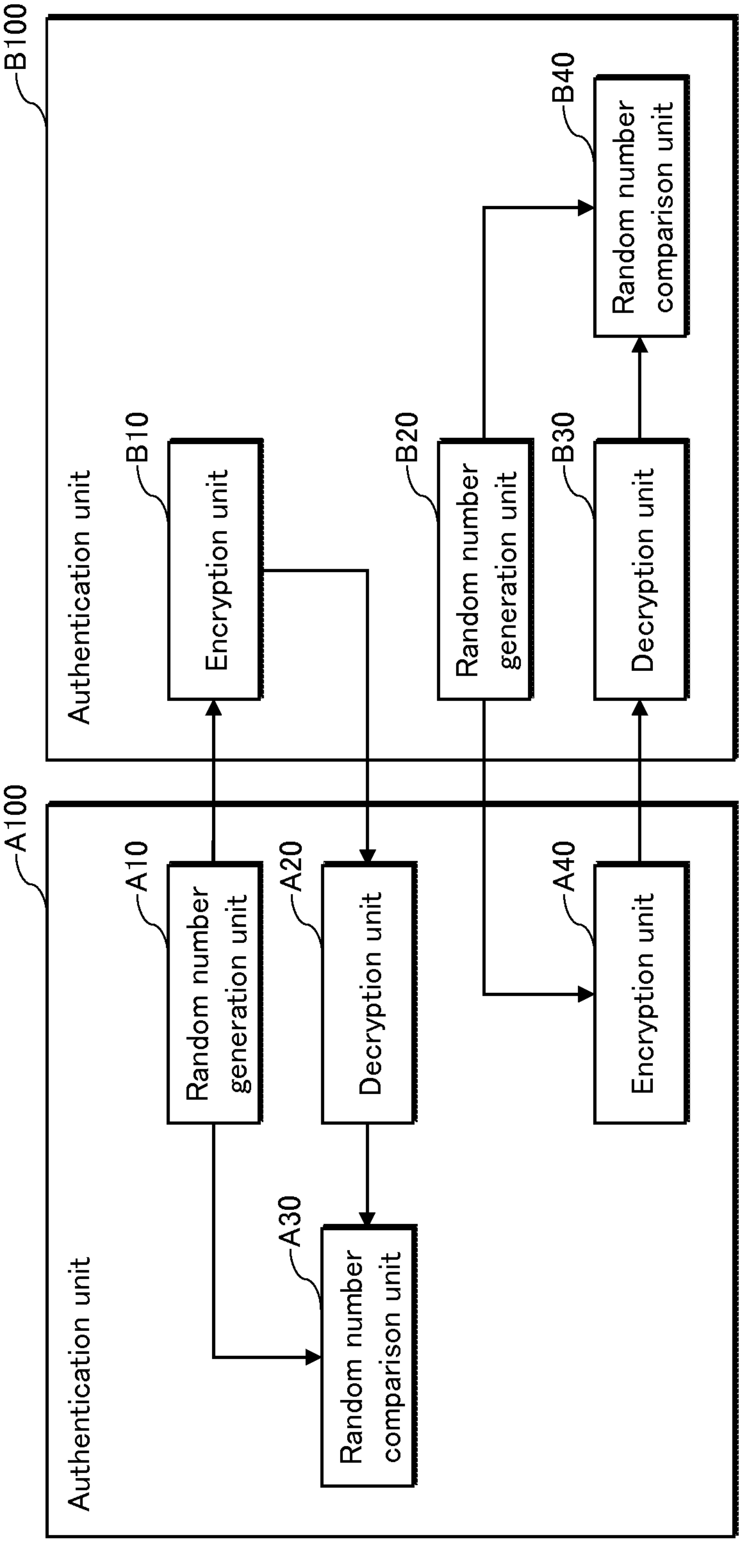
FIG. 21 is a block diagram showing structures of an authentication unit A100 and an authentication unit B100.

One example of the mutual authentication unit 430 of the key distribution device 400 is an authentication unit A100 shown in FIG. 21. One example of the mutual authentication unit 530 of the terminal device 500 or the mutual authentication unit 620 of the storage medium device 600 is an authentication unit B100 shown in FIG. 21.

The authentication unit A100 includes a random number generation unit A10, a decryption unit A20, a random number comparison unit A30 and an encryption unit A40, as shown in FIG. 21. The authentication unit B100 includes an encryption unit B10, a random number generation unit B20, a decryption unit B30 and a random number comparison unit B40, as shown in FIG. 21.

The mutual authentication process is as follows.

(a) The random number generation unit A10 generates a random number R1. The random number generation unit A10 transmits the generated random number R1 to the encryption unit B10 of the authentication unit B100.

(b) The encryption unit B10 receives the random number R1, generates a ciphertext (E (Ksc, R1)) by encrypting the received random number R1 with a unique key Ksc, and transmits the ciphertext (E (Ksc, R1)) to the decryption unit A20 of the authentication unit A100.

(c) The decryption unit A20 of the authentication unit A100 decrypts the received ciphertext (E (Ksc, R1)) with the unique key Ksc.

deciphertext=D(Ksc,(E(Ksc,R1)))

(d) The random number comparison unit A30 of the authentication unit A100 judges whether the result of decryption in (c) and the random number generated in (a) match. If the decryption result and the random number match, the authentication unit A100 determines the authentication unit B100 as an authorized module.

(e) The random number generation unit B20 of the authentication unit B100 generates a random number R2, and transmits the generated random number R2 to the encryption unit A40 of the authentication unit A100.

(f) The encryption unit A40 of the authentication unit A100 receives the random number R2, generates a ciphertext (E (Ksc, R2)) by encrypting the random number R2 with the unique key Ksc, and transmits the ciphertext E (Ksc, R2)) to the decryption unit B30 of the authentication unit B100.

(g) The decryption unit B30 of the authentication unit B100 generates a deciphertext by decrypting the ciphertext E (Ksc, R2) received with the unique key Ksc.

deciphertext=D(Ksc,(E(Ksc,R2)))

(h) The random number comparison unit B40 of the authentication unit B100 judges whether the result of decryption in (g) and the random number generated in (e) match. If the decryption result and the random number match, the authentication unit B100 determines the authentication unit A100 as an authorized module.

(i) The authentication unit A100 and the authentication unit B100 each concatenate the random number R1 and the random number R2 to generate concatenated data R1||R2. Next, the authentication unit A100 and the authentication unit B100 each perform a one-way operation denoted as Hash with the use of Ksc on the generated concatenated data to obtain a certain value, and determine the obtained value as a common key.

common key=Hash(Ksc,R1||R2)(expression 6)

Here, Hash (A, B) denotes a hash value obtained by performing the hash calculation on data B with the use of a key A. Such a hash calculation is referred to as a keyed hash calculation.

The Hash calculations used in the authentication unit A100 and the authentication unit B100 need to be the same.

Note that operations of the mutual authentication described here is just an example, and mutual authentication may be performed by using the other methods.

3.10 Operation of Key Distribution Device 400

The following describes an operation of the key distribution device 400 with reference to the flowchart shown in FIG. 22.

The distribution device 400 receives the root public key and the pair consisting of the key distribution device private key and the key distribution device certificate from the key issuing device 200, and stores therein the root public key and the pair consisting of the key distribution device private key and the key distribution device certificate (S401).

Next, the key distribution device 400 receives the title key and the UR from the content production device 100, and stores therein the received title key and UR. At this point in time, the flag (indicating whether content belong to domain or non-domain) stored in the domain identification information area 1412 of the UR 1410 shown in FIG. 20 may not be determined or may be determined. It may be possible to determine whether content belongs to domain or non-domain at the point of storing the title key and the UR, or whether content belongs to domain or non-domain may be determined when the key distribution device 400 distributes the title key and the UR 1410 (S402).

When the key distribution device 400 receives the account issue request from the terminal device 500, the first account issuing unit 460 issues the first account consisting of a pair of an account name and a password, and stores the issued first account in the account management unit 461. When the first account is stored in the account management unit 461, the second account issue request unit 462 transmits an account issue request to the permission management device 700. Next, the second account issue request unit 462 receives the issued second account consisting of a pair of an account name and a password. The account management unit 461 binds the issued first account with the issued second account, and stores these accounts therein. The first account issuing unit 460 transmits the issued second account to the terminal device 500 (S403).

When receiving a transmission request for the title key from the terminal device 500 or the storage medium device 600, the key distribution device 400 performs the following processes S404, S405, S406, S407 and S408.

The key distribution device 400 receives the account name and the password of the issued first account from the terminal device 500. The key distribution device 400 judges whether the information of the received first account matches the information stored in the account management unit 461. If the received information and the stored information match, the key distribution device 400 continues the following processes. The terminal device 500 further displays a content list on a display device such as a TV and a tablet device, and prompts a user to select which content to download. When the user selects content, in order to download a title key of the content, the terminal device 500 designates the content and requests the key distribution device 400 to distribute the title key (S404).

When the mutual authentication unit 430 performs mutual authentication with the terminal device 500 or the storage medium device 600 to determine whether the terminal device 500 or the storage medium device 600 is an authorized device and the terminal device 500 or the storage medium device 600 is determined to be the authorized device, each device generates a common key. In the subsequent processing, data to be transmitted is encrypted with the common key, and encrypted data is decrypted with the common key when received, between the storage medium device 600 and the key distribution device 400. This protects the data that is to be transmitted and received (S405).

The title key calculation unit 440 receives the title key and the UR that are stored in the title key/content private number/UR generation/storage unit 422. When content is non-domain content, the title key calculation unit 440 stores "0" (indicating non-domain content) in the domain identification information area 1412, and processes the UR by zero-padding the content private number area 1413. In contrast, when content is domain content, the title key calculation unit 440 stores "1" (indicating domain content) in the domain identification information area 1412, and processes the UR by overwriting the content private number area 1413 with the content private number of the content stored in the title key/content private number/UR generation/storage unit 422. Next, the title key calculation unit 440 performs a hash calculation on the processed UR, and generates a calculated title key by performing a conversion that is reversible such as an XOR on the hash value and the title key. Next, the title key calculation unit 440 transmits the calculated title key to the storage medium device 600 via the encryption and decryption unit 441 (S406).

The storage medium device ID reception unit 450 receives the storage medium device ID from the storage medium device 600 via the encryption and decryption unit 441. The MAC calculation unit 451 performs a MAC calculation with the use of the storage medium device ID received by the storage medium device ID reception unit 450 and the title key stored in the title key/content private number/UR generation/storage unit 422, and transmits the MAC value obtained through the calculation to the terminal device 500. The title key/content private number/UR generation/storage unit 422 transmits the UR that is stored therein to the terminal device 500. Note that if it is determined whether content is domain content or non-domain content at the time of distribution, the domain identification information area 1412 of the UR 1410 has been overwritten with one of the values "0" (indicating non-domain content) or "1" (indicating domain content)(S407).

The viewing permission registration request unit 471 reads the second account corresponding to the first account from the account management unit 461 when the key distribution device 400 finishes key distribution to the storage medium device 600. Next, the viewing permission registration request unit 471 reads the content number of the downloaded content from the title key/content private number/UR generation/storage unit 422. Next, the viewing permission registration request unit 471 transmits the account name and the password of the second account and the content number to the permission management device 700, provides the designated user account with notification that the viewing permission on the designated content has been obtained, and requests the permission management device 700 to update the management information. For example, in the case of the viewing permission on rental content, the permission management device 700 may manage the viewing permission in various aspects by notifying the user account of various kinds of permission information such as the expiration date of the permission (e.g., date information such as May 24, 2012), the available period of the content (e.g., for three months), and the maximum allowed number of downloads (e.g., SD image quality content can be downloaded at no charge up to five times, HD image quality content can be downloaded at no charge up to twice)(S408).

3.11 Detailed Configuration of Terminal Device 500

FIGS. 23 and 24 show the detailed configuration of the terminal device 500.

FIG. 23 shows components of the terminal device 500 related to receiving of content and data necessary for protecting and playing back the content such as keys by cooperating with the content distribution device 300 and the key distribution device 400, and writing of the content and data in the storage medium device 600.

FIG. 24 shows components of the terminal device 500 related to reading of the content and data necessary for protecting and playing back the content such as keys from the storage medium device 600, and playback of the content, after writing the content and the data necessary for protecting and playing back the content such as keys.

The same names and the same reference signs are assigned to the duplicated structures among the receiving and writing processes and the playback process.

As shown in FIGS. 23 and 24, the terminal device 500 includes an account issue request unit 505, an account display unit 506, a content list provision/content selection input unit 507, a terminal device private key/certificate storage unit 510, a root public key storage unit 511, a first account input unit 515, a first account control unit 516, a second account input unit 517, a second account control unit 518, a second account information storage unit 519, a content reception unit 520, a content identification information acquisition unit 521, a content write unit 522, a mutual authentication unit 530, a storage medium device ID acquisition unit 531, an encryption and decryption unit 532, a storage medium device ID/content identification information transmission unit 540, a storage medium device ID/MAC/UR reception unit 545, a storage medium device ID/MAC/UR write unit 546, a transmission unit 547, a calculated title key reception unit 550, a UR read unit 555, a title key recalculation unit 556, a storage medium device ID/MAC read unit 557, a playback determination unit 558, a content read unit 560, a content decryption unit 561 and a content playback unit 562.

(Account Issue Request Unit 505)

The account issue request unit 505 issues a new account upon receipt of an instruction from a user.

First, the account issue request unit 505 transmits a first account issue request to the key distribution device 400 according to the user instruction. The account issue request unit 505 receives, from the key distribution device 400, the pair of the account name and the password of the first account, and the pair of the account name and the password of the second account.

Regarding the account issue request, the terminal device 500 may designate an account name. Alternatively, a user may input an account name that he/she wishes, the terminal device 500 may judge whether the account name of the first account and any of the account names that have been issued before are duplicate, and if they are not duplicate, the name that the user wishes may be used. Similarly, regarding the second account, the account name of the first account or the account name that the user inputs may be transmitted to the permission management device 700, and the permission management device 700 may judge whether the account name of the second account and any of the account names that have been issued before are duplicate, and if they are not duplicate, the account name received from the key distribution device 400 may be used.

(Account Display Unit 506)

The account display unit 506 may display information on the received first account and second account on a display device such as a tablet device and a smartphone. Alternatively, the account display unit 506 may transmit the information on the first account and second account to the user by e-mail. The user memorizes the first account and second account that have been displayed or received by e-mail, and uses them during playback.

Note that the terminal device 500 may store the first account and the second account, and save time and effort of the user in inputting them during playback.

Figure 27:
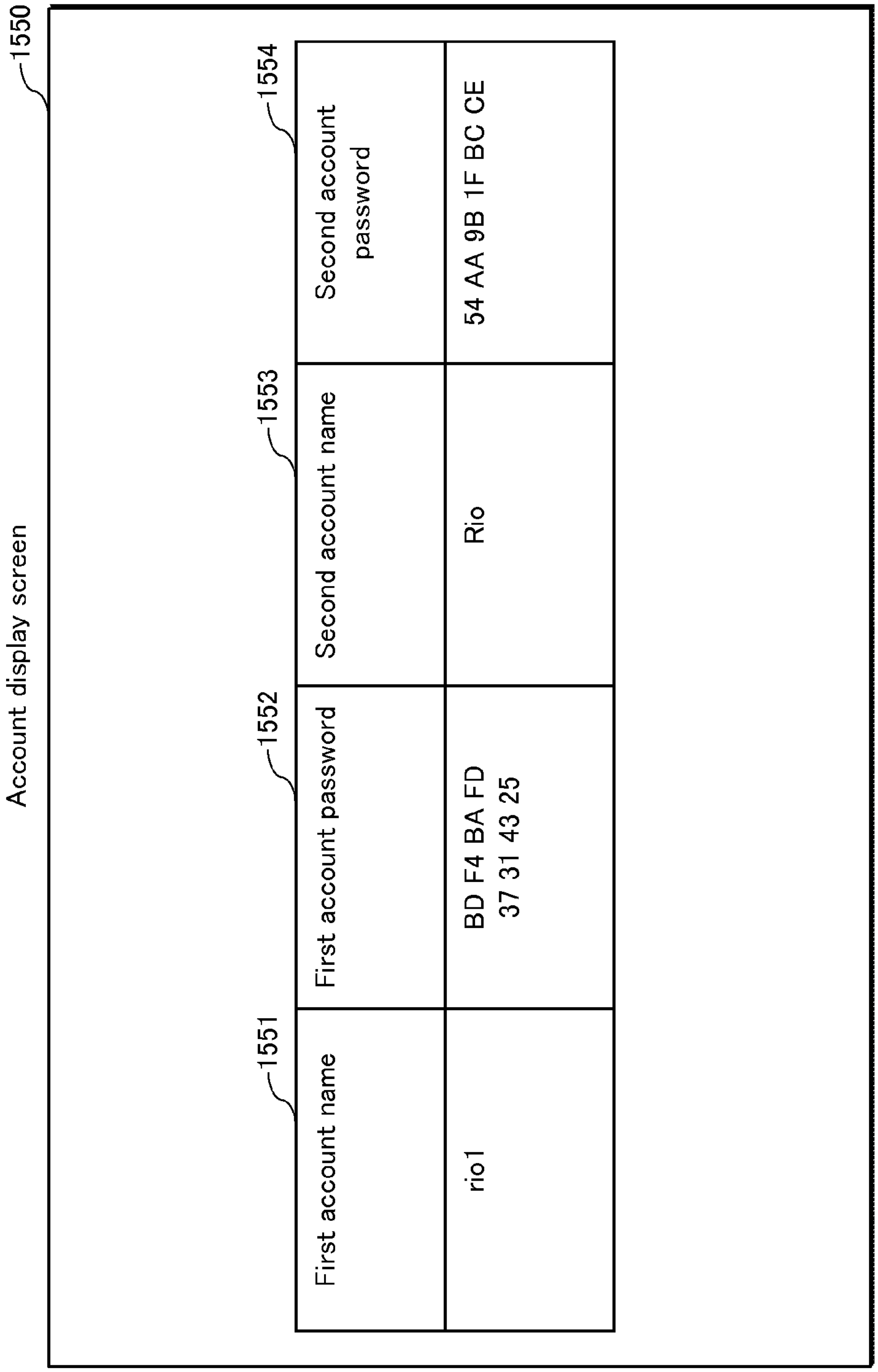
FIG. 27 shows an account display screen 1550.

FIG. 27 shows an account display screen 1550 as an example of a screen that displays accounts. The account display screen 1550 includes a first account name 1551, a first account password 1552, a second account name 1553, and a second account password 1554. The first account name 1551 includes a title of displayed information, i.e., "First account name", and an actual account name. The first account password 1552 includes a title of displayed information, i.e., "First account password", and an actual password. The second account name 1553 includes a title of displayed information, i.e., "Second account name", and an actual account name. The second account password 1554 includes a title of displayed information, i.e., "Second account password", and an actual password.

(Content List Provision/content Selection Input Unit 507)

The content list provision/content selection input unit 507 receives a list of names of distributable content from the key distribution device 400, etc., while downloading content, and displays the list on the display device to prompt the user to select from the list. Further, while playing back content, the content list provision/content selection input unit 507 receives a list of content names, etc. stored in the storage medium device 600 connected thereto, and displays the received list on the display device to prompt the user to select from the list.

A mechanism for acquiring a list of names of distributable content, and a mechanism for acquiring a list of content names stored in the storage medium device 600 have been known, and descriptions thereof are omitted.

(Terminal Device Private Key/certificate Storage Unit 510)

The terminal device private key/certificate storage unit 510 stores therein the pair of the terminal device private key and the terminal device certificate that has been received from the key issuing device 200. To be specific, a terminal manufacturing apparatus that has manufactured the terminal device 500 writes the pair of the terminal device private key and the terminal device certificate.

(Root Public Key Storage Unit 511)

The root public key storage unit 511 stores therein the root public key received by the key issuing device 200. To be specific, the terminal manufacturing device that manufactures the terminal device writes the root public key.

(First Account Input Unit 515)

The first account input unit 515 displays an input form for entry on a display device, etc., and receives the account name and password of the first account input by the user.

(First Account Control Unit 516)

The first account control unit 516 transmits, to the key distribution device 400, the pair of the account name and password of the first account that has been input from the first account input unit 515. Next, when receiving information indicating that the account is authorized from the key distribution device 400, the first account control unit 516 determines that the user with the first account has usage permission of every content that is obtainable while the first account is logged in.

(Second Account Input Unit 517)

The second account input unit 517 displays an input form for entry on a display device, etc., and receives the account name and password of the second account input by the user.

(Second Account Control Unit 518)

The second account control unit 518 transmits, to the permission management device 700, the pair of the account name and the password of the second account that has been input from the second account input unit 517. Next, the second account control unit 518 receives information indicating that the account is authorized from the permission management device 700. At this point, the second account control unit 518 may check whether the first account has the usage permission on content obtainable while the second account is logged in, so as to judge whether the content can be played back.

Further, upon receipt of a request from the title key recalculation unit 556, the second account control unit 518 transmits the account name of the second account (e.g., Rio), the corresponding password (e.g., 54 AA 9B 1F BC CE) and the content number (e.g., C01) to the permission management device 700, and transmits viewing permission confirmation request data indicating a request for confirmation whether the second account has the viewing permission on the content number. Next, the second account control unit 518 receives the viewing permission confirmation response data from the permission management device 700. When the received viewing permission confirmation response data indicates that the second account has the viewing permission, the second account control unit 518 notifies the title key recalculation unit 556 that the second content has the viewing permission, and also notifies the title key recalculation unit 556 of the content private number of the designated content.

FIG. 37 shows viewing permission confirmation request data 17301. The viewing permission confirmation request data 17301 includes a permission management device number area 1731, a terminal device certificate area 1732, an account name area 1733, a password area 1734, a content number area 1735 and a login state area 1736.

The permission management device number area 1731 includes a permission management device number assigned to the permission management device 700, e.g., "R01". The terminal device certificate area 1732 includes a terminal device certificate assigned to the terminal device 500. The account name area 1733 includes an account name of the second account. The password area 1734 includes a password of the second account. The content number area 1735 includes a content number managed by the permission management device 700. The login state area 1736 includes a condition under which the terminal device 500 maintains the state in which the second account has the viewing permission when it is determined that the second account has the viewing permission. For example, when the login state area 1736 includes "No automatic logout", the terminal device 500 maintains the login state of the designated second account except for when the second account logs out in response to a user instruction and except for when the second account logs out in accordance with firm update of the terminal device 500. Further, the login state area 1736 may include "Automatic logout in two weeks". In this case, the terminal device 500 cancels the login state of the second account in two weeks, and the user needs to log in the terminal device 500 again.

FIG. 38 shows viewing permission confirmation response data 17401 that is response data corresponding to the viewing permission confirmation request data. The viewing permission confirmation response data 17401 includes an account name area 1741, a content number area 1742, a permission area 1743, a content private number area 1744 and a reason area 1745.

The account name area 1741 includes an account name of the second account. The content number area 1742 includes a content number. The permission area 1743 indicates whether the second account has the viewing permission or not. The content private number area 1544 includes a content private number necessary for recalculating a title key. When the second account does not have the viewing permission, the reason area 1745 includes the reason why the second content does not have the viewing permission. For example, the following cases are considered: a case in which the user account does not match any of the accounts that have been issued in the past, and is regarded as unauthorized; a case in which even though the user account is judged to be authorized, the user does not have the viewing permission on the designated content; a case in which the user had the viewing permission in the past, but the current date has passed the expiration date; a case in which an available period is over, and a case in which content cannot be viewed due to the maximum allowed number of views.

(Second Account Information Storage Unit 519)

The second account information storage unit 519 binds the second account that is controlled by the second account control unit 518 with the content number whose viewing permission the second account has, the content private number of the content and the condition of the viewing permission, etc., and stores them.

FIG. 25 shows an example of the second account information stored in the second account information storage unit 519. The second account information 1510 shown in FIG. 25 includes an account name 1511, a password 1512 and content permission information 1513. The content permission information 1513 includes a permission management device number 1514 and one or more pieces of content permission related information. Each piece of the content permission related information includes a content number 1515, a permission 1516, a content private number 1517 and a condition 1518. The content permission information may include other elements. The content permission related information may include other elements.

Here, the account name 1511 is the account name of the second account. The password 1512 is a password corresponding to the second account. The content permission information 1513 includes information relating to permission for content. The permission management device number 1514 is identification information identifying one permission management device. Content is classified into a plurality of groups, and each group corresponds to one permission management device. Content belonging to one group is managed by a permission management device corresponding to the one group. The content number 1515 is a content number identifying content whose permission the user has. Note that the content number 1515 may include a content number of content whose permission a user does not have. The permission 1516 indicates whether the second account has viewing permission on the designated content number. The content private number 1517 has a content private number necessary for recalculating the title key of the content. The condition 1518 is information showing a condition under which the content can be viewed. For example, the condition shows a limitation on content playback according to a time period, a limitation on content playback according to a due date, and a limitation on content acquisition according to the allowed number of downloads.

Since the second account information storage unit 519 stores therein the second account, it is unnecessary to send the viewing permission confirmation request to the permission management device 700 again. Also, the user does not need to input the second account again. Therefore, it is possible to save time and effort of the user.

(Content Reception Unit 520)

The content reception unit 520 receives content from the content distribution device 300.

(Content Identification Information Acquisition Unit 521)

The content identification information acquisition unit 521 acquires the hash table that is distributed along with the content received by the content reception unit 520. Next, if the hash table includes the content identification information that can uniquely identify content, the content identification information acquisition unit 521 extracts the content identification information from the hash table.

(Content Write Unit 522)

The content write unit 522 writes the content received by the content reception unit 520 to the storage medium device 600.

(Mutual Authentication Unit 530)

The mutual authentication unit 530 performs mutual authentication with the key distribution device 400 or the storage medium device 600, and shares common keys with the key distribution device 400 or the storage medium device 600. Details of the mutual authentication are as described above.

(Storage Medium Device ID Acquisition Unit 531)

The storage medium device ID acquisition unit 531 acquires the storage medium device ID from the storage medium device certificate of the storage medium device 600, which is received during the mutual authentication process performed by the mutual authentication unit 530.

(Encryption and Decryption Unit 532)

The encryption and decryption unit 532 protects data that is transmitted and received between the terminal device 500 and the key distribution device 400 or between the terminal device 500 and the storage medium device 600. To be specific, the encryption and decryption unit 532 encrypts data with the common key shared by the mutual authentication unit 530 when transmitting data. The encryption and decryption unit 532 also decrypts the encrypted transmission data with the common key shared by the mutual authentication unit 530 when receiving data. It is thus possible to protect the data on the transmission channel.

(Storage Medium Device ID/content Identification Information Transmission Unit 540)

The storage medium device ID/content identification information transmission unit 540 determines the storage medium device ID acquired by the storage medium device ID acquisition unit 531 as a storage medium device ID identifying a storage medium device to which data is to be written, puts the content identification information acquired by the content identification information acquisition unit 521 and the storage medium device ID into a pair, and transmits the pair to the key distribution device 400 via the encryption and decryption unit 532.

(Storage Medium Device ID/MAC/UR Reception Unit 545)

The storage medium device ID/MAC/UR reception unit 545 receives a MAC value from the key distribution device 400 via the encryption and decryption unit 532. Here, the MAC value is a value generated by performing a MAC calculation on the storage medium device ID with a title key. The title key is an encryption key for protecting content identified by the content identification information transmitted by the storage medium device ID/content identification information transmission unit 540. Further, the storage medium device ID has been transmitted from the storage medium device ID/content identification information transmission unit 540.

The storage medium device ID/MAC/UR reception unit 545 also receives, from the key distribution device 400, a UR relating to the content identified by the content identification information that has been transmitted from the storage medium device ID/content identification information transmission unit 540 without passing through the encryption and decryption unit 532.

(Storage Medium Device ID/MAC/UR Write Unit 546)

The storage medium device ID/MAC/UR write unit 546 writes, to the storage medium device 600, the MAC value and UR that have been received by the storage medium device ID/MAC/UR reception unit 545.

(Calculated Title Key Reception Unit 550)

The calculated title key reception unit 550 receives the calculated title key from the storage medium device 600 via the encryption and decryption unit 5320.

(Transmission Unit 547)

The transmission unit 547 receives communication data from the storage medium device 600, and transmits the received communication data to the key distribution device 400. The transmission unit 547 also receives communication data from the key distribution device 400, and transmits the received communication data to the storage medium device 600.

The transmission unit 547 communicates with the key distribution device 400 and the storage medium device 600 without knowing the content of the communication data except for data relating to control such as information notifying the end of communication. In the communication between the key distribution device 400 and the storage medium device 600, the calculated title key is encrypted, and is protected during transmission for example.

(UR Read Unit 555)

The UR read unit 555 reads a UR relating to certain content from the storage medium device 600 that stores content therein.

(Title Key Recalculation Unit 556)

The title key recalculation unit 556 checks the UR read by the UR read unit 555, as described below.

When the domain identification information area 1412 of the UR 1410 shown in FIG. 20 includes "1" (which indicates domain content), the title key recalculation unit 556 requests the second account control unit 518 to check whether the second account is logged in the terminal device 500. If the second account is not logged in the terminal device 500, the title key recalculation unit 556 instructs the second account input unit 517 to input the second account, causes the second account control unit 518 to check whether the second account is authorized by the permission management device 700 and whether the second account has the viewing permission on the designated content. When the account is not an authorized account, or when the account is authorized but does not have the viewing permission, the title key recalculation unit 556 displays, on the display device, information indicating that the content cannot be viewed. When the account is an authorized account and has the viewing permission, the title key recalculation unit 556 overwrites the content private number area 1413 of the UR 1410 with the content private number received from the permission management device 700, and calculates a hash value of the overwritten UR. Next, the title key recalculation unit 556 calculates the original title key by performing an exclusive OR operation XOR on the calculated title key received by the calculated title key reception unit 550 and the hash value.

original title key=calculated title key XOR Hash(UR) (expression 7)

When the domain identification information area 1412 of the UR 1410 includes "0" (which indicates non-domain content), the title key recalculation unit 556 calculates a hash value of the UR without change, and calculates the original title key by performing an exclusive OR operation XOR on the calculated title key received by the calculated title key reception unit 550 and the hash value.

original title key=calculated title key XOR Hash(UR) (expression 8)

Note that the hash calculation used in the expressions 7 and 8 needs to be the same as the hash calculation used in the expression 4, which is described above.

(Storage Medium Device ID/MAC Read Unit 557)

The storage medium device ID/MAC read unit 557 reads, from the storage medium device 600, a MAC value of a storage medium device relating to content that is to be played back.

(Playback Determination Unit 558)

The playback determination unit 558 calculates a MAC value of the storage medium device ID that has been acquired by the storage medium device ID acquisition unit 531 with the use of the title key calculated by the title key recalculation unit 556 as follows.

MAC value=Hash(title key||storage medium device ID) (expression 9)

Note that the hash calculation used in the expression 9 needs to be the same as the hash calculation used in the expression 5, which is described above.

Next, the playback determination unit 558 determines whether the calculated MAC value and the MAC value read by the storage medium device ID/MAC read unit 557 match.

When it is determined that the calculated MAC value and the read MAC value match, the playback determination unit 558 permits playback. When it is determined that the calculated MAC value and the read MAC value do not match, the playback determination unit 558 prevents playback by stopping playback, or by displaying, on a display screen, information indicating that playback is impossible, for example.

(Content Read Unit 560)

The content read unit 560 reads content from the storage medium device 600 when the playback determination unit 558 permits playback. When the playback determination unit 558 does not permit playback, the content read unit 560 prevents reading content from the storage medium device 600.

(Content Decryption Unit 561)

The content decryption unit 561 decrypts the content read by the content read unit 560 with the title key calculated by the title key recalculation unit 556. This generates decrypted content.

(Content Playback Unit 562)

The content playback unit 562 plays back the decrypted content decrypted by the content decryption unit 561 and outputs the decrypted content on the television or a similar display device.

Note that although the content read unit 560 reads content from the storage medium device 600 when the playback determination unit 558 permits playback in the above description, the content decryption unit 561 may decrypt or prohibit decrypting according to the determination made by the playback determination unit 558. Alternatively, the content playback unit 562 may perform playback or prevent playback according to the determination made by the playback determination unit 558. Alternatively, the content playback unit 562 may output the content or prevent outputting the content according to the determination within a time period from the most recent decoding of the content until the output of the content to the television or a similar display device.

3.12 Operation of Terminal Device 500

The following describes writing and playback operations performed by the terminal device 500.

(1) Writing Operation by Terminal Device 500

The following describes a writing operation performed by the terminal device 500 with reference to the flowchart shown in FIG. 29.

When manufactured, the terminal device 500 stores therein the terminal device private key, the terminal device certificate and the root public key (S501).

In order to issue a user account, the terminal device 500 transmits the account issue request to the key distribution device 400. Next, the terminal device 500 receives an account name and a password of the first account. The terminal device 500 also receives an account name and a password of the second account. The terminal device 500 displays the account name and the password of the first account and the account name and the password of the second account on the display device. The user memorizes them. Note that the terminal device 500 may receive the issued first account and second account by e-mail (S511).

When storing content, a UR, etc., to the storage medium device 600, the terminal device 500 receives, from a user, the account name and the password of the first account that has already been issued, with the use of the login screen. Further, the terminal device 500 displays a list of obtainable content, and identifies content the user wants (S521).

The terminal device 500 receives content that the user wants from the content distribution device 300. Next, the terminal device 500 analyses the received content to acquire the content identification information, and determines whether the acquired content identification information matches the preliminarily identified content identification information. When it is determined that the acquired information matches the preliminarily identified information, the terminal device 500 writes the content to the storage medium device 600 (S522).

When the terminal device 500 accesses the key distribution device 400 (or the storage medium device 600), the mutual authentication unit 530 performs mutual authentication with the key distribution device 400 (or the storage medium device 600). The terminal device 500 thus judges whether the key distribution device 400 (or the storage medium device 600) is an authorized device. When it is judged that the key distribution device 400 (or the storage medium device 600) is an authorized device, the terminal device 500 and the key distribution device 400 (or the storage medium device 600) each generate an identical common key. In the following communication, communication data is encrypted and decrypted with the common key to be protected. Further, in the mutual authentication process, the mutual authentication unit 530 judges whether the key distribution device ID of the key distribution device 400 (or storage medium device ID of the storage medium device 600) matches revocation information listed in a revoke file distributed separately. If the device ID matches the revocation information, the mutual authentication unit 530 may regard the key distribution device 400 (or the storage medium device 600) as unauthorized, and may stop communication and the following process (S523).

The terminal device 500 puts the storage medium device ID identified in the mutual authentication process and the content identification information that identifies the content into a pair, and transmits the pair to the key distribution device 400 (S524).

The terminal device 500 receives the MAC value and the UR of the storage medium device from the key distribution device 400, and writes the UR to the storage medium device 600. Further, the terminal device 500 relays transmission of communication data between the key distribution device 400 and the storage medium device 600. The terminal device 500 cannot get involved with the communication data between the key distribution device 400 and the storage medium device 600. The calculated title key is encrypted to be protected, and safely transmitted (S525).

The writing operation by the terminal device 500 ends here.

(2) Playback Operation by Terminal Device 500

Figure 30:
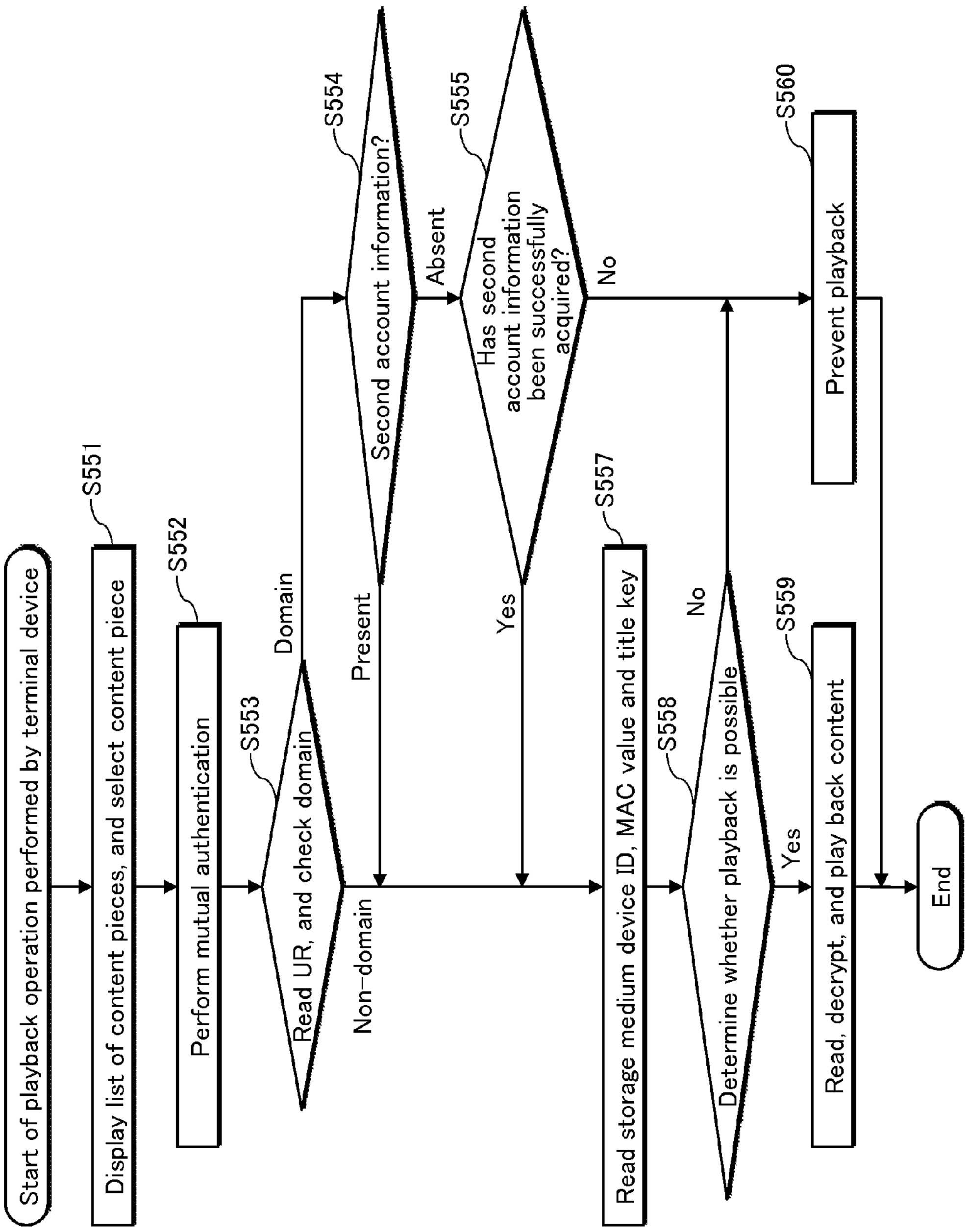
FIG. 30 is a flowchart showing an operation of the terminal device 500 during playback.

The following describes a playback operation performed by the terminal device 500 with reference to the flowchart shown in FIG. 30. The terminal device 500 reads content and relevant data necessary for playing back the content from the storage medium device 600 that stores therein the content and the relevant data, and plays back the content.

The terminal device 500 displays a list of content pieces recorded in the storage medium device 600 on the display device (S551).

Figure 26:
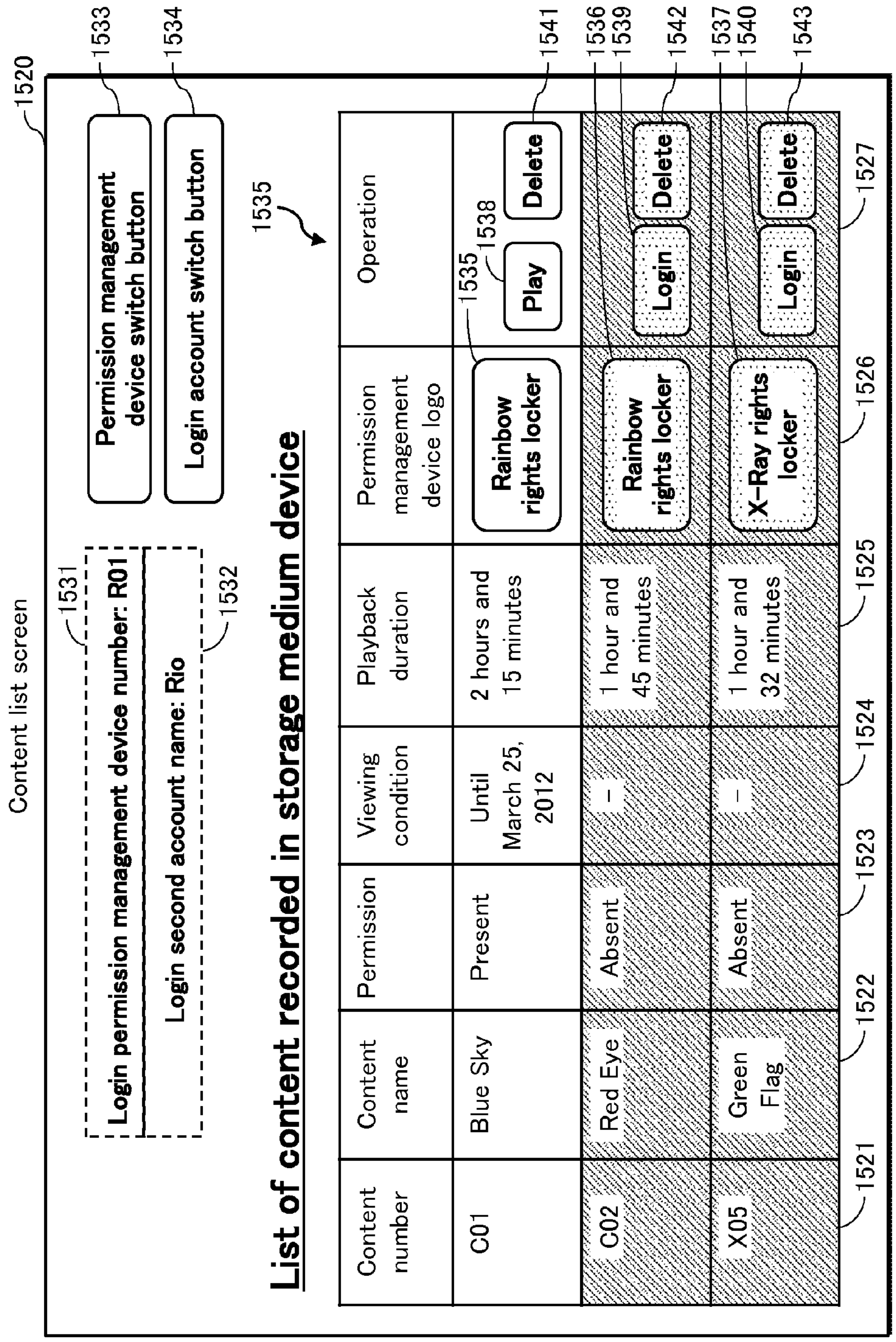
FIG. 26 shows a content list screen 1520.

FIG. 26 shows an example of a screen showing a list of content pieces recorded in the storage medium device 600. The content list screen 1520 shown in FIG. 26 includes a login permission management device number 1531, a login second account name 1532, a permission management device switch button 1533, a login account switch button 1534 and a content list 1535 recorded in the storage medium device.

The login permission management device number 1531 indicates a permission management device number identifying the permission management device 700 that a user is logged in. The login second account name 1532 indicates an account name of the second account that is logged in. The permission management device switch button 1533 is a button for switching the permission management device 700 to another permission management device, so that a user logs in the other device. In the example shown in FIG. 26, this button is used when a user wants to switch the permission management device 700 identified by the permission management device number "R01" that the user is logged in to another permission management device identified by a different permission management device number (e.g., "R02"), and to log in the other device. The login account switch button 1534 is for transitioning to a screen for switching the second account that is logged in to another second account. The content list 1535 includes a plurality of pieces of content related information. The plurality of pieces of the content related information correspond to different content pieces. Each piece of the content related information includes fields each display a content number, a content name, a permission, a viewing condition, a playback duration, a permission management device logo, and an operation.

The content number indicates a number identifying a content piece. The content name indicates a name identifying the content piece. The permission indicates whether the content piece is non-domain content. Further, when the content piece is domain content, the permission indicates whether the account has the viewing permission. The viewing condition indicates a condition relating to the viewing permission such as an available period, an expiration time, and the maximum allowed number of downloads. The playback duration indicates a time duration required to play back the content piece. The permission management device logo shows a logo mark of a permission management device 700 to which the content piece belongs. This helps the user to know which permission management device 700 the content piece is bound with. The operation indicates an operation that the user can perform on the content piece or an operation the user cannot perform on the content piece. The content list 1535 shows Play (1538), Delete (1541) and Login (1539) as examples. Here, Play (1538) indicates a playback operation of a content piece. Delete (1541) indicates a delete operation of a content piece. Login (1539) indicates a login operation. As an example not shown in the content list 1535, "Purchase" indicates an operation for purchasing a content piece. "Update" indicates an operation for accessing the permission management device 700 and bringing the viewing permission up to date. "Login switch" indicates an operation for relogging in with another second account.

Figure 28:
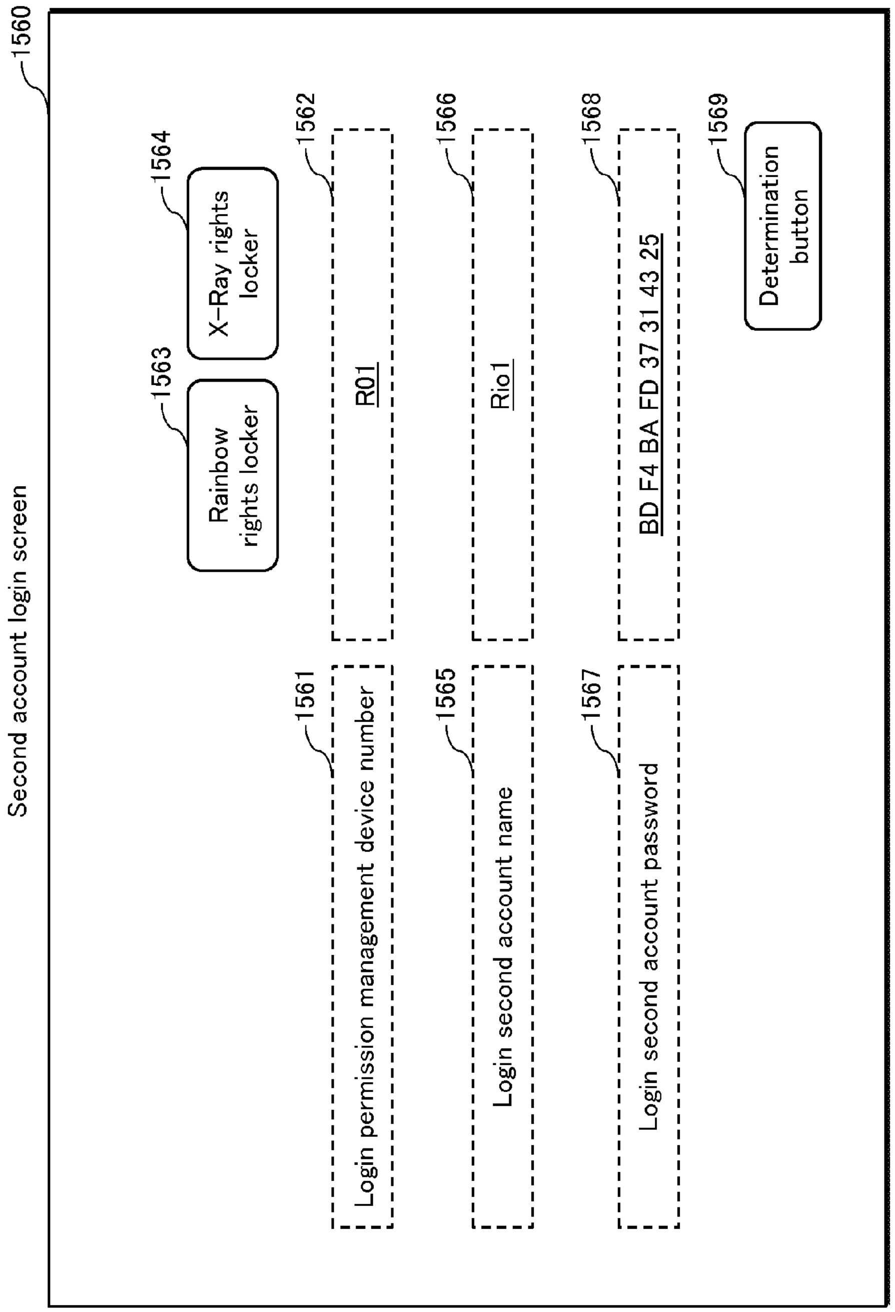
FIG. 28 shows a second account login screen 1560.

FIG. 28 shows a second account login screen 1560 that is used when permission management devices are switched or when the second account logs in a permission management device.

The second account login screen 1560 includes a label 1561 that reads "login permission management device number", a display area 1562 that displays the login permission management device number, logos 1563 and 1564 of the permission management devices 700, a label 1565 that reads "login second account name", a display area 1566 that displays the login second account name, a label 1567 that reads "login second account password", a display area 1568 that displays the login second account password, and a determination button 1569.

The display area 1562 displays the permission management device number of the permission management device that a user is logged in. This helps the user to know which permission management device 700 the second account login screen 1560 displays the viewing permission of. In the example shown in FIG. 28, the logos 1563 and 1564 display logo marks "Rainbow rights locker" and "X-Ray rights locker". The logo marks may function as buttons, and may be used to switch the permission management device 700 that the user is logged in to another device by selecting either button.

The display area 1566 displays the second account that is logged in. Further, the display area 1566 may display another second account, and the other second account may be used for switching accounts.

The display area 1568 displays a password of the second account. Further, the display area 1568 may display a password of another second account, and the password may be used for switching accounts.

The determination button 1569 is used for switching the second account to another second account. After rewriting the account name and the password of the second account that are being displayed on the second account login screen 1560 with the account name and the password of the other second account, the determination button 1569 is operated.

Returning to FIG. 30, the description of the playback operation performed by the terminal device 500 continues.

The terminal device 500 performs mutual authentication with the key distribution device 400. If the mutual authentication fails, the terminal device 500 ends the playback operation at that point. If the mutual authentication is successful, the terminal device 500 shares common keys with the key distribution device 400. The terminal device 500 also performs mutual authentication with the storage medium device 600. If the mutual authentication fails, the terminal device 500 ends the playback operation at that point. If the mutual authentication is successful, the terminal device 500 shares common keys with the storage medium device 600 (S552).

Next, the terminal device 500 reads the UR from the storage medium device 600. The terminal device 500 uses a flag recorded in the domain identification information area of the read UR to check whether the content is non-domain content or domain content (S553). In the case of non-domain content ("non-domain" in S553), processing proceeds to S557. In the case of domain content ("domain" in S553), processing proceeds to S554.

In the case of domain content ("domain" in S553), the terminal device 500 checks whether the terminal device 500 stores therein the second account issued by the permission management device 700 to which the content belongs (S554). That is, when the account name and the password of the second account are authorized and the second account is logged in, and when the terminal device 500 has stored therein information indicating that the second account has the viewing permission on content that is to be played back ("Present" in S554), processing proceeds to S557. If any information is lacking ("Absent" in S554), processing proceeds to S555.

If any information is lacking ("No" in S554) and the second account is not logged in, the terminal device 500 causes the user to input the account name and the password of the second account to access the permission management device 700, and judges whether the second account can log in the permission management device 700 (S555). If the second account cannot log in the permission management device 700 ("No" in S555), processing proceeds to S560. If the second account can log in the permission management device 700, the terminal device 500 further designates content and checks whether the second account has the viewing permission on the content (S555). If the second account does not have the viewing permission ("No" in S555), processing proceeds to S560. If the second account has the viewing permission ("Yes" in S555), processing proceeds to S557.

The terminal device 500 reads the storage medium device ID, the MAC value and the calculated title key from the storage medium device 600. Next, the terminal device 500 calculates the original title key by calculating a hash value of the read UR and performing an XOR operation on the calculated title key and the hash value.

original title key=calculated title key XOR Hash(UR) (S557)

The terminal device 500 calculates a MAC value of the storage medium device based on the storage medium device ID and the title key.

MAC value=Hash(title key||storage medium device ID)

Next, by checking whether the MAC value read from the storage medium device 600 and the MAC value obtained by the calculation match, the terminal device 500 determines whether playback is possible (step S558).

When it is determined that playback is possible ("Yes" in S558), the terminal device 500 reads the content from the storage medium device 600, decrypts the content with the title key, plays back (decodes) the content, and outputs the content on the display device such as a monitor (S559).

When it is determined that playback is impossible ("No" in S558), the terminal device 500 prevents playback (S560).

This concludes the description of the playback operation performed by the terminal device 500.

3.13 Detailed Configuration of Storage Medium Device 600

FIG. 31 shows the detailed configuration of the storage medium device 600.

As shown in FIG. 31, the storage medium device 600 includes a storage medium device private key/certificate storage unit 610, a root public key storage unit 611, a mutual authentication unit 620, an encryption and decryption unit 630, a calculated title key storage unit 640, a storage medium device ID storage unit 650, a content storage unit 660, a UR storage unit 670, and a MAC value storage unit 680.

(Storage Medium Device Private Key/certificate Storage Unit 610)

The storage medium device private key/certificate storage unit 610 stores therein the pair of the storage medium device private key and the storage medium device certificate that has been received from the key issuing device 200. To be specific, a storage medium manufacturing device that manufactures the storage medium device 600 writes the pair of the storage medium device private key and the storage medium device certificate.

(Root Public Key Storage Unit 611)

The root public key storage unit 611 stores therein the root public key received from the key issuing device 200. To be specific, a storage medium manufacturing device that manufactures the storage medium device writes the root public key.

(Mutual Authentication Unit 620)

The mutual authentication unit 620 performs mutual authentication with the key distribution device 400 (or the terminal device 500). If the mutual authentication is successful, the mutual authentication unit 620 shares common keys with the key distribution device 400 (or the terminal device 500). Note that the mutual authentication is as described above.

(Encryption and Decryption Unit 630)

The encryption and decryption unit 630 encrypts data when transmitting the data from the storage medium device 600 to the key distribution device 400, and decrypts data when receiving the data from the key distribution device 400, with the use of the common key shared by the mutual authentication unit 620. Thus data on the transmission channel is protected.

The encryption and decryption unit 630 also protects data on the transmission channel between the storage medium device 600 and the terminal device 500 as above.

(Calculated Title Key Storage Unit 640)

The calculated title key storage unit 640 receives the calculated title key from the key distribution device 400, and stores therein the received calculated title key. Further, when receiving a request to obtain the title key from the terminal device 500, the title key is output to the terminal device 500.

(Storage Medium Device ID Storage Unit 650)

The storage medium device ID storage unit 650 stores therein a storage medium device ID for identifying a storage medium device.

(Content Storage Unit 660)

The content storage unit 660 receives content from the terminal device 500, and stores therein the received content. Further, when receiving a request to read the content from the terminal device 500, the content is output to the terminal device 500.

(UR Storage Unit 670)

The UR storage unit 670 receives a UR from the terminal device 500, and stores therein the received UR. Further, when receiving a request to read the UR from the terminal device 500, the UR is output to the terminal device 500.

(MAC Value Storage Unit 680)

The MAC value storage unit 680 receives the MAC value from the terminal device 500, and stores therein the received MAC value. Further, when receiving a request to read the MAC value from the terminal device 500, the MAC value is output to the terminal device 500.

3.14 Operation of Storage Medium Device 600

Figure 32:
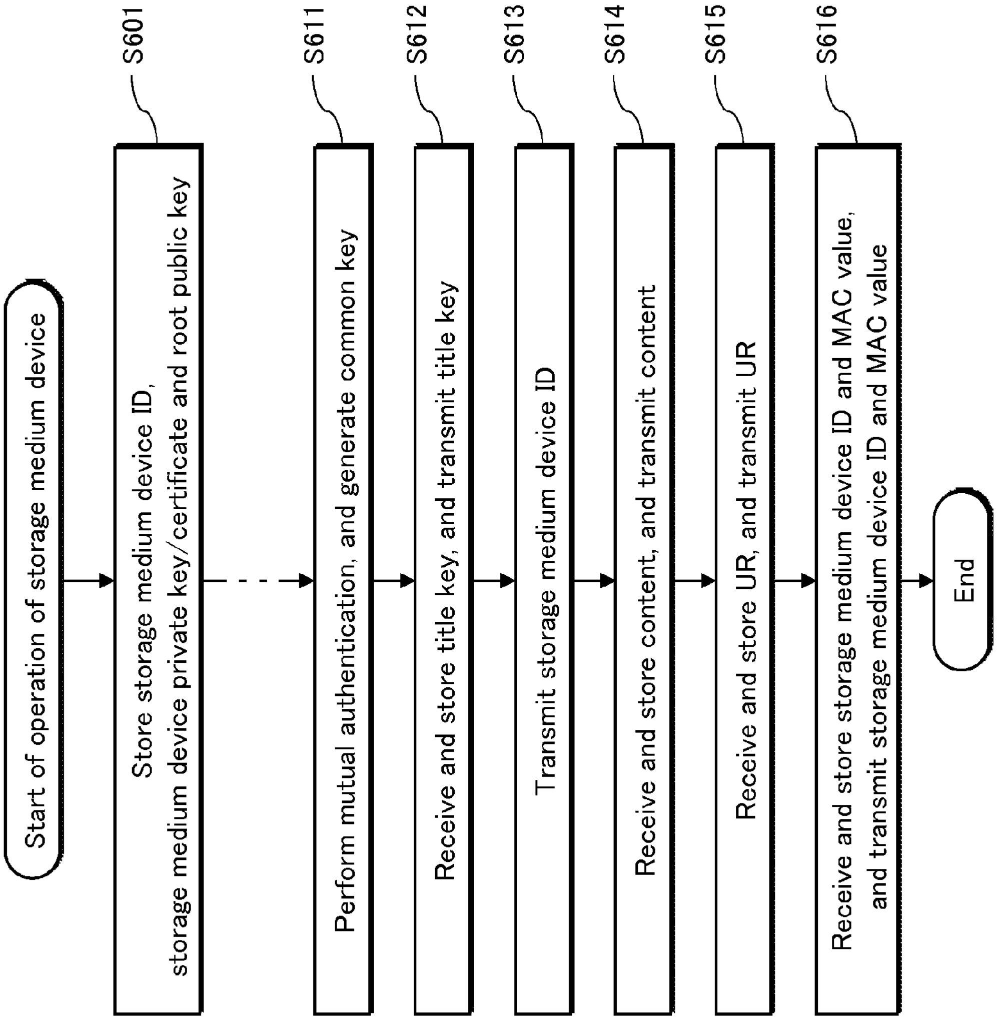
FIG. 32 is a flowchart showing an operation of the storage medium device 600.

The following describes an operation of the storage medium device 600 with reference to the flowchart shown in FIG. 32.

When manufactured, the storage medium device 600 stores therein the storage medium device ID, the storage medium device private key, the storage medium device certificate and the root public key (S601).

When the key distribution device 400 (or the terminal device 500) accesses the storage medium device 600, the mutual authentication unit 620 performs mutual authentication with the key distribution device 400 (or the terminal device 500). By doing this, the mutual authentication unit 620 checks whether the key distribution device 400 (or the terminal device 500) is an authorized device. When the mutual authentication is successful, the storage medium device 600 and the key distribution device 400 (or the terminal device 500) each generate an identical common key. In the following communication, data on the transmission channel is encrypted and decrypted with the common key to be protected. During the mutual authentication process performed by the mutual authentication unit 620, the storage medium device 600 judges whether the device ID of the key distribution device 400 (or the terminal device 500) matches revocation information listed in a revoke file distributed separately. If the device ID matches the revocation information, the storage medium device 600 determines the key distribution device 400 (or the terminal device 500) that is attempting to communicate as unauthorized, and stops communication performed by the mutual authentication unit 620 and the following process (S611).

The storage medium device 600 receives the calculated title key from the key distribution device 400, and stores therein the received calculated title key. The storage medium device 600 also receives a request to obtain the calculated title key from the terminal device 500, and outputs the calculated title key to the terminal device 500 (S612).

The storage medium device 600 receives a request to obtain the storage medium device ID from the terminal device 500, and outputs the storage medium device ID to the terminal device 500 (S613).

The storage medium device 600 receives content from the terminal device 500, and stores therein the received content. The storage medium device 600 also receives a request to obtain the content from the terminal device 500, and outputs the content to the terminal device 500 (S614).

The storage medium device 600 receives the UR from the terminal device 500, and stores therein the received UR. The storage medium device 600 also receives a request to obtain the UR from the terminal device 500, and outputs the UR to the terminal device 500 (S615).

The storage medium device 600 receives the MAC value from the terminal device 500, and stores therein the received MAC value. The storage medium device 600 also receives a request to obtain the MAC value from the terminal device 500, and outputs the MAC value to the terminal device 500 (S616).

3.15 Detailed Configuration of Permission Management Device 700

Figure 33:
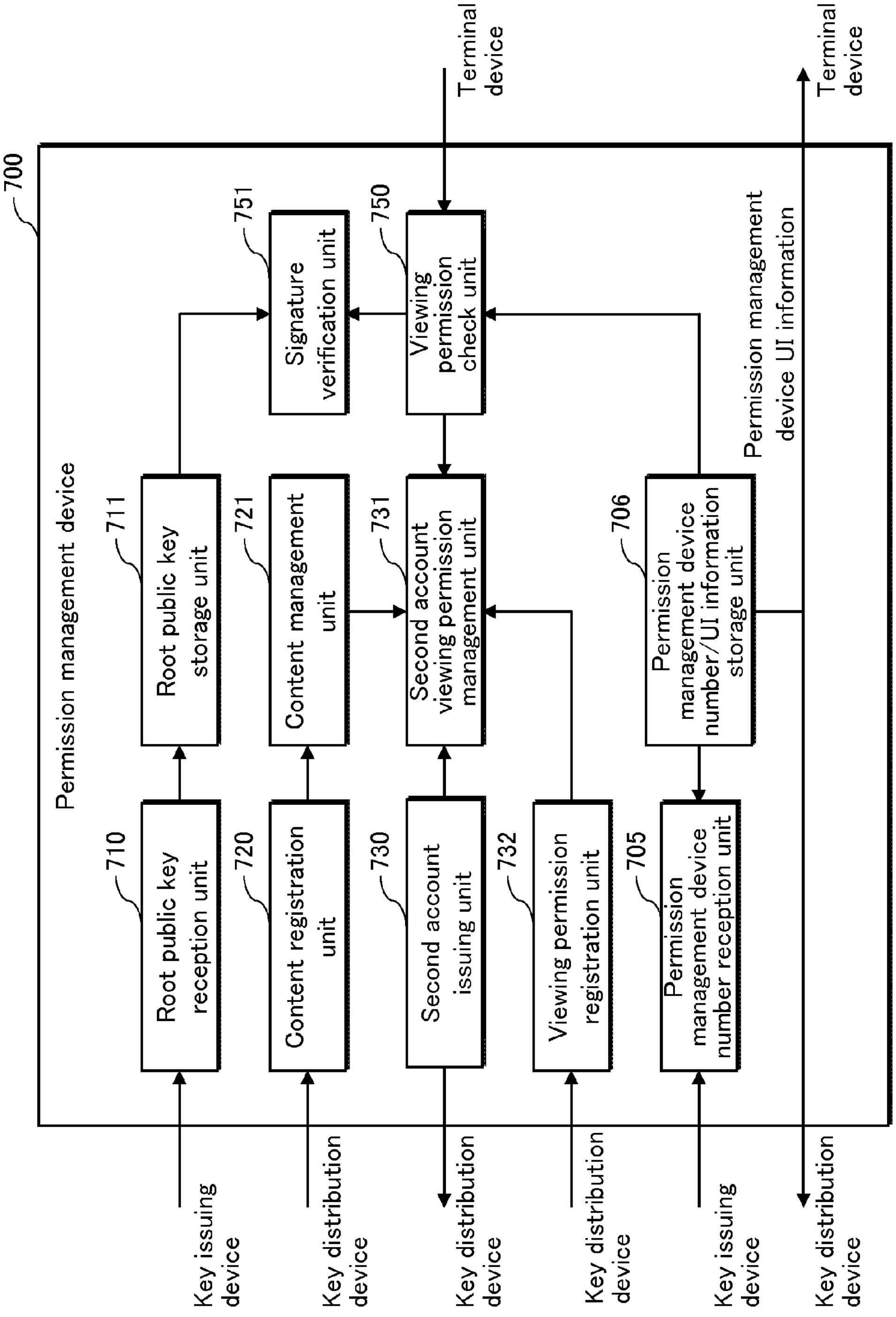
FIG. 33 is a block diagram showing a structure of a permission management device 700.

FIG. 33 shows the detailed configuration of the permission management device 700.

The permission management device 700 includes a permission management device number reception unit 705, a permission management device number/UI information storage unit 706, a root public key reception unit 710, a root public key storage unit 711, a content registration unit 720, a content management unit 721, a second account issuing unit 730, a second account viewing permission management unit 731, a viewing permission registration unit 732, a viewing permission check unit 750, and a signature verification unit 751.

(Permission Management Device Number Reception Unit 705)

The permission management device number reception unit 705 requests the key issuing device 200 to issue a permission management device number in response to an instruction of an operator of the permission management device 700. Further, the permission management device number reception unit 705 receives the permission management device number issued by the key issuing device 200.

(Permission Management Device Number/UI Information Storage Unit 706)

The permission management device number/UI information storage unit 706 stores therein the permission management device number received by the permission management device number reception unit 705. The permission management device number/UI information storage unit 706 also stores therein permission management device UI information representing a logo mark of the permission management device 700. Further, in response to a request from the terminal device 500, the permission management device number/UI information storage unit 706 transmits the permission management device number and the permission management device UI information to the terminal device 500.

(Root Public Key Reception Unit 710)

The root public key reception unit 710 receives the root public key from the key issuing device 200.

(Root Public Key Storage Unit 711)

The root public key storage unit 711 stores therein the root public key received by the root public key reception unit 710.

(Content Registration Unit 720)

The content registration unit 720 receives a request to register content from the key distribution device 400. The request is composed of a content number, a title key and a content private number. In response to the request, the content registration unit 720 registers the content number, the title key and the content private number in the content management unit 721.

(Content Management Unit 721)

The content management unit 721 stores therein a content management information table 1700.

The content management information table 1700 includes a plurality of pieces of content management information, as shown in FIG. 34. Each piece of the content management information is composed of the content number, the title key and the content private number. Note that the content number, the title key and the content private number are as described above. As shown in FIG. 34, one piece of the content management information included in the content management information table 1700 includes a content number 1701 "C01", a title key 1702 "48 7F 48 . . . " and a content private number 1703 "68 1D F3 . . . ".

The content management unit 721 extracts the content number, the title key and the content private number from the request received by the content registration unit 720. Next, the content management unit 721 generates content management information composed of the content number, the title key and the content private number. Next, the content management unit 721 stores the generated content management information in the content management information table 1700.

(Second Account Issuing Unit 730)

The second account issuing unit 730 receives a request to issue the second account from the key distribution device 400. When receiving the request, the second account issuing unit 730 issues a pair of an account name and a password of the second account. Next, the second account issuing unit 730 outputs the pair of the account name and the password of the second account to the second account viewing permission management unit 731. Further, the second account issuing unit 730 transmits the issued second account to the key distribution device 400.

(Second Account Viewing Permission Management Unit 731)

The second account viewing permission management unit 731 stores therein a second account management information table 1710 and a viewing permission management information table 1720.

The second account management information table 1710 includes a plurality of pieces of the second account management information, as shown in FIG. 35. Each piece of the second account management information includes an account number, an account name and a password. The account name and the password are as described above. The account number is a number identifying the corresponding account name and password.

The viewing permission management information table 1720 includes a plurality of pieces of viewing permission management information, as shown in FIG. 36. Each piece of the viewing permission management information includes an account number and one or more pieces of content related information. The account number is a number identifying a second account. The plurality of pieces of the content related information correspond to different content pieces. Each piece of the content related information includes a content number and viewing permission information. The viewing permission information includes a permission, an expiration date, the maximum allowed number of downloads and other conditions. The permission indicates whether an account has the viewing permission on a content piece. If the expiration date has been set when the account has the viewing permission, the expiration date indicates the limitation. If the maximum allowed number of downloads has been set when the account has the viewing permission, the maximum allowed number of downloads indicates the limitation. The other conditions indicate other conditions when the account has the viewing permission.

One piece of the viewing permission management information included in the viewing permission management information table 1720 includes an account number 1721, a content number 1722 and viewing permission information 1723, as shown in FIG. 36. The viewing permission information 1723 includes a permission 1724, an expiration date 1725, a maximum allowed number of downloads 1726 and other conditions 1727.

FIG. 39 shows an example different from the viewing permission management information table 1720. A viewing permission management information table 17202 shown in FIG. 39 includes, in the viewing permission information, the maximum allowed number of logins and the number of logins, instead of the maximum allowed number of downloads and other conditions of the viewing permission management information table 1720. The maximum allowed number of logins indicates the limitation on the number of logins. For example, the maximum allowed number of logins indicates that the maximum allowed number of logins has not been set. The number of logins indicates how many times the account has logged in.

One piece of the viewing permission management information included in the viewing permission management information table 17202 includes an account number 1721, a content number 1722 and viewing permission information 17232, as shown in FIG. 39. The viewing permission information 17232 includes a permission 1724, an expiration date 1725, a maximum allowed number of logins 1728 and a number of logins 1729.

The second account viewing permission management unit 731 receives the pair of the account name and the password of the second account from the second account issuing unit 730. When receiving the pair of the account name and the password of the second account, the second account viewing permission management unit 731 generates a unique account number, and writes the generated account number, the received account name and password in the second account management information table 1710 as the second account management information.

Further, the second account viewing permission management unit 731 receives a request that a specific second account is to be registered to have the viewing permission on specific content, from the viewing permission registration unit 732. The request includes a content number and viewing permission information. The viewing permission information includes a permission, an expiration date, the maximum allowed number of downloads and other conditions. When receiving the request, the second account viewing permission management unit 731 generates viewing permission management information based on the request. The viewing permission management information includes an account number, a content number and viewing permission information. The viewing permission information includes a permission, an expiration date, the maximum allowed number of downloads and other conditions. Here, the second account viewing permission management unit 731 determines the account number as an account number corresponding to the specific second account. Next, the second account viewing permission management unit 731 stores the generated viewing permission management information in the viewing permission management information table 1720.

(Viewing Permission Registration Unit 732)

The viewing permission registration unit 732 receives the request that the second account is to be registered to have the viewing permission on the specific content, from the key distribution device 400. When receiving the request, the viewing permission registration unit 732 controls the second account viewing permission management unit 731 to register the viewing permission on the specific content.

(Viewing Permission Check Unit 750)

The viewing permission check unit 750 receives viewing permission confirmation request data 17301 from the terminal device 500, checks the state of the viewing permission, and returns viewing permission confirmation response data 17401 to the terminal device 500.

FIG. 37 shows an example of the viewing permission confirmation request data 17301. The viewing permission confirmation request data 17301 includes the permission management device number area 1731, the terminal device certificate area 1732, the account name area 1733, the password area 1734, the content number area 1735 and the login state area 1736. The permission management device number area 1731 stores therein the permission management device number. The terminal device certificate area 1732 stores therein the terminal device certificate. The account name area 1733 stores therein the account name of the second account. The password name area 1734 stores therein the password of the second account. The content number area 1735 stores therein the content number. The login state area 1736 stores therein a condition under which the terminal device 500 maintains a state in which the account has the viewing permission when it is determined that the account has the viewing permission.

In the viewing permission confirmation request data 17301 shown in FIG. 37, the permission management device number "R01" has been stored in the permission management device number area 1731. The terminal device certificate has been stored in the terminal device certificate area 1732. The account name "Kakeru" has been stored in the account name area 1733. The password "FE 47 42 . . . " has been stored in the password area 1734. The content number "C01" has been stored in the content number area 1735. "No automatic logout" has been stored in the login state area 1736.

FIG. 40 shows an example different from the viewing permission confirmation request data 17301. The viewing permission confirmation request data 17302 shown in FIG. 40 has the same data structure as the viewing permission confirmation request data 17301. In the viewing permission confirmation request data 17302 shown in FIG. 40, the permission management device number "R01" has been stored in the permission management device number area 1731. The terminal device certificate has been stored in the terminal device certificate area 1732. The account name "Rio" has been stored in the account name area 1733. The password "54 AA 9B . . . " has been stored in the password area 1734. The content number "C02" has been stored in the content number area 1735. "Keep login for two weeks" has been stored in the login state area 1736.

When receiving the viewing permission confirmation request data 17301, the viewing permission check unit 750 checks whether the permission management device number stored in the permission management device number area 1731 of the viewing permission confirmation request data 17301 matches the permission management device number stored in the permission management device number/UI information storage unit 706.

If these permission management device numbers do not match, the viewing permission check unit 750 returns a message indicating an error in response to the viewing permission confirmation request data 17301.

If these permission management device numbers match, the viewing permission check unit 750 outputs the terminal device certificate stored in the terminal device certificate area 1732 to the signature verification unit 751 so as to request the signature verification unit 751 to perform signature verification. When the signature verification fails, the viewing permission check unit 750 returns a message indicating an error in response to the viewing permission confirmation request data 17301. When the signature verification is successful, the viewing permission check unit 750 checks whether the second account stored in the account name area 1733 and the password area 1734 are registered in the second account management information table 1710 stored in the second account viewing permission management unit 731. If the second account is not registered, the viewing permission check unit 750 returns a message indicating an error in response to the viewing permission confirmation request data 17301. If the second account is registered, the viewing permission check unit 750 requests the second account viewing permission management unit 731 to check the state of the viewing permission on the content number stored in the content number area 1735. Next, the viewing permission check unit 750 returns the viewing permission confirmation response data 17401 indicating the state of the viewing permission.

FIG. 38 shows an example of the viewing permission confirmation response data 17401. The viewing permission confirmation response data 17401 shown in FIG. 38 includes the account name area 1741, the content number area 1742, the permission area 1743, the content private number area 1744 and the reason area 1745.

The account name area 1741 stores therein the account name of the second account. The content number area 1742 stores therein the content number. The permission area 1743 stores therein information indicating whether the account has permission. The content private number area 1744 stores therein the content private number. When the account does not have the permission, the reason area 1745 stores therein the reason why the account does not have the permission.

When the designated second account has the viewing permission on the designated content, the permission area stores therein "Present" as shown in the viewing permission confirmation response data 17401, and the content private number area 1744 stores therein the actual content private number.

In contrast, when the designated second account does not have the viewing permission on the designated content, as shown in viewing permission confirmation response data 17402 in FIG. 41, the permission area 1743 stores therein "Absent", and the content private number area 1744 stores therein nothing. The reason area 1745 stores therein information indicating that the account does not have the viewing permission, as a reason for "Absent" stored in the permission area 1743.

(Signature Verification Unit 751)

The signature verification unit 751 receives the request from the viewing permission check unit 750, verifies signature data of the received terminal device certificate with the root public key stored in the root public key storage unit 711, and returns the verification result to the viewing permission check unit 750.

3.16 Operation of Permission Management Device 700

Figure 42:
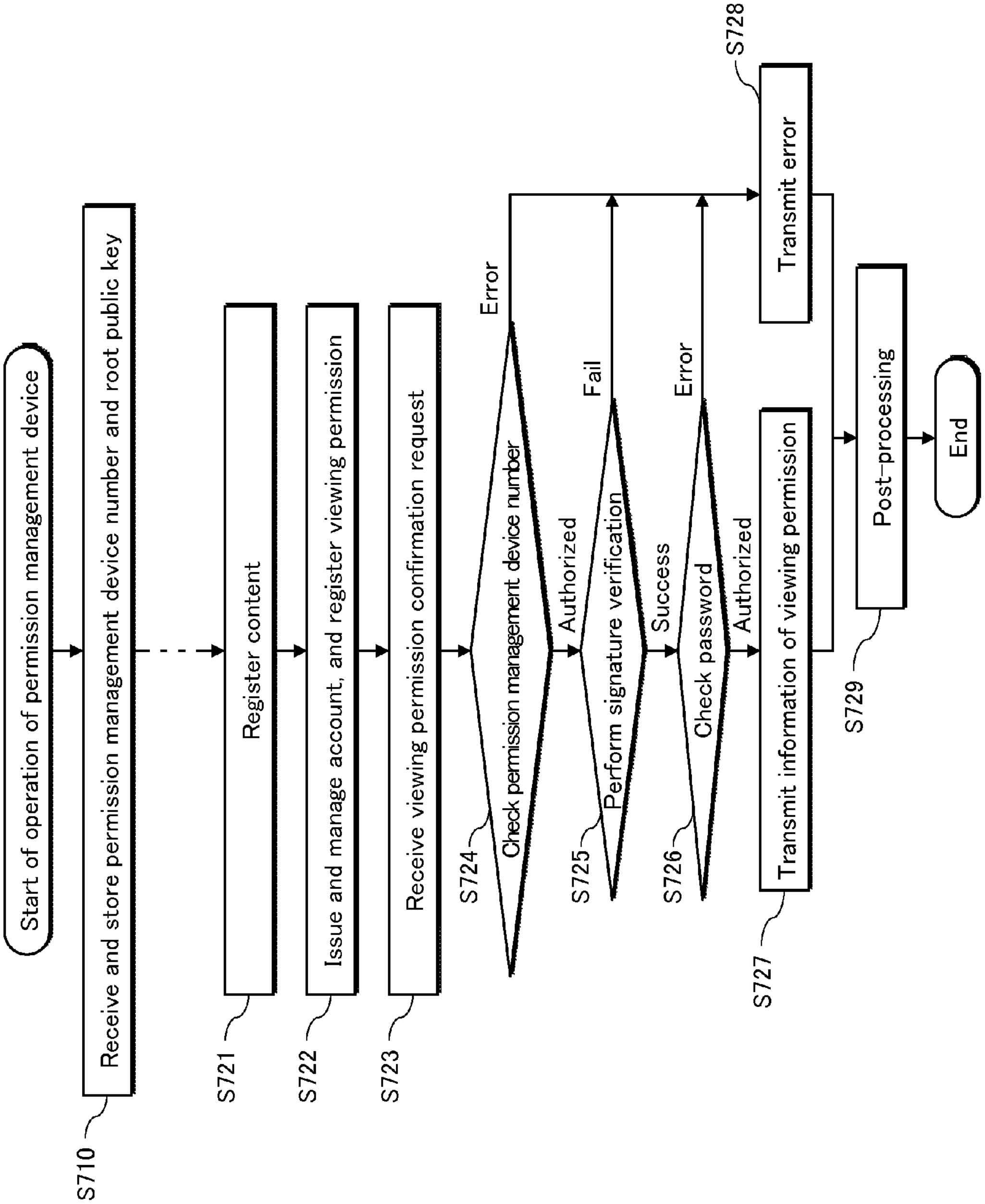
FIG. 42 is a flowchart showing an operation of the permission management device 700.

The following describes an operation of the permission management device 700 with reference to the flowchart shown in FIG. 42.

The permission management device 700 receives the permission management device number, the root public key and the pair consisting of the key distribution device private key and the key distribution device certificate from the key issuing device 200, and stores therein the root public key and the pair consisting of the key distribution device private key and the key distribution device certificate (S710).

When receiving a request to register content from the key distribution device 400, the permission management device 700 generates content management information corresponding to the received request, and stores the generated content management information in the content management information table 1700 (S721).

When receiving a request to issue a second account from the key distribution device 400, the permission management device 700 issues the second account. The permission management device 700 transmits the issued second account to the key distribution device 400. The permission management device 700 also generates second account information including the second account, and stores the generated second account information in the second account management information table 1710. When receiving a request that a designated second account is to be registered to have the viewing permission from the key distribution device 400, the permission management device 700 generates viewing permission management information from the request, and stores the generated viewing permission management information in the viewing permission management information table 1720 (S722).

The permission management device 700 receives the viewing permission confirmation request data from the terminal device 500 (S723).

The permission management device 700 checks whether the permission management device number included in the received viewing permission confirmation request data is authorized (S724). If the number is unauthorized ("Error" in S724), processing proceeds to S728. If the number is authorized ("Authorized" in S724), processing proceeds to S725.

The permission management device 700 performs signature verification of the terminal device certificate of the received viewing permission confirmation request data (S725). When the signature verification fails ("Fail" in S725), processing proceeds to S728. When the signature verification is successful ("Success" in S725), processing proceeds to S726.

The permission management device 700 checks whether the second account name and the password that are included in the received viewing permission confirmation request data are authorized (S726). If the account name and the password are unauthorized ("Error" in S726), processing proceeds to S728. If the account name and password are authorized ("Authorized" in S726), processing proceeds to S727.

The permission management device 700 checks the viewing permission management information table 1720, transmits the state of the viewing permission to the terminal device 500 (S727), and performs post-processing (S729).

Further, the permission management device 700 displays error information indicating playback is impossible with the use of the display device (S728), and performs post-processing (S729).

This concludes the description of the operation of the permission management device 700.

4. Embodiment 4

The following describes a content distribution system 10*d* as Embodiment 4 of the present invention with reference to the drawings.

4.1 Configuration of Content Distribution System 10*d*

Figure 43:
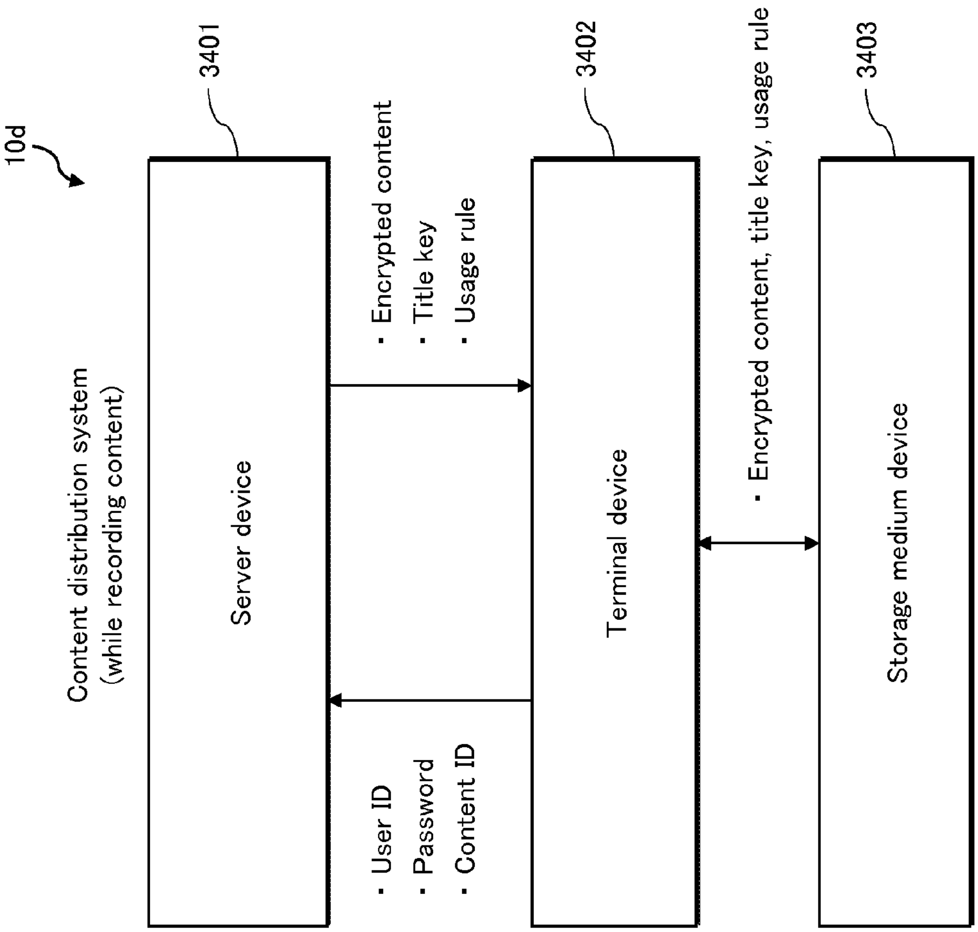
FIG. 43 shows a structure of a content distribution system 10*d* as Embodiment 4 of the present invention.

The content distribution system 10*d* includes a server device 3401, a terminal device 3402 and a storage medium device 3403 as shown in FIG. 43.

Note that the storage medium device 3403 may be a detachable storage medium composed of a control unit (controller) and a storage unit (flash memory, etc.). The storage medium device 3403 may be a memory internal to the terminal device 3402, similarly composed of a control unit (controller) and a storage unit (flash memory, etc.).

The terminal device 3402 transmits, to the server device 3401, a user ID and a password that are input by a user, and a content ID that uniquely identifies content selected by the user.

The server device 3401 transmits encrypted content, a title key and a usage rule corresponding to the received user ID, password and content ID, to the terminal device 3402. The terminal device 3402 receives the encrypted content, the title key and the usage rule. Next, the terminal device 3402 records the received encrypted content, the title key and the usage rule in the storage medium device 3403.

The server device 3401 and the storage medium device 3403 perform a mutual authentication process and a key sharing process therebetween, and establish a secure communication channel. The title key is securely transmitted on the secure communication channel. That is, the title key is transmitted after being encrypted. Further, the usage rule is similarly transmitted after being encrypted so as to be prevented from being tampered with, or bound with the title key and then transmitted. For example, an XOR operation is performed on a hash value of the usage rule and the title key. As a result of this, even if the usage rule is tampered with, the title key cannot be properly decrypted.

The server device 3401, the terminal device 3402 and the storage medium device 3403 are described in detail below.

4.2 Configuration of Server Device 3401

The following describes the server device 3401 in detail.

Figure 44:
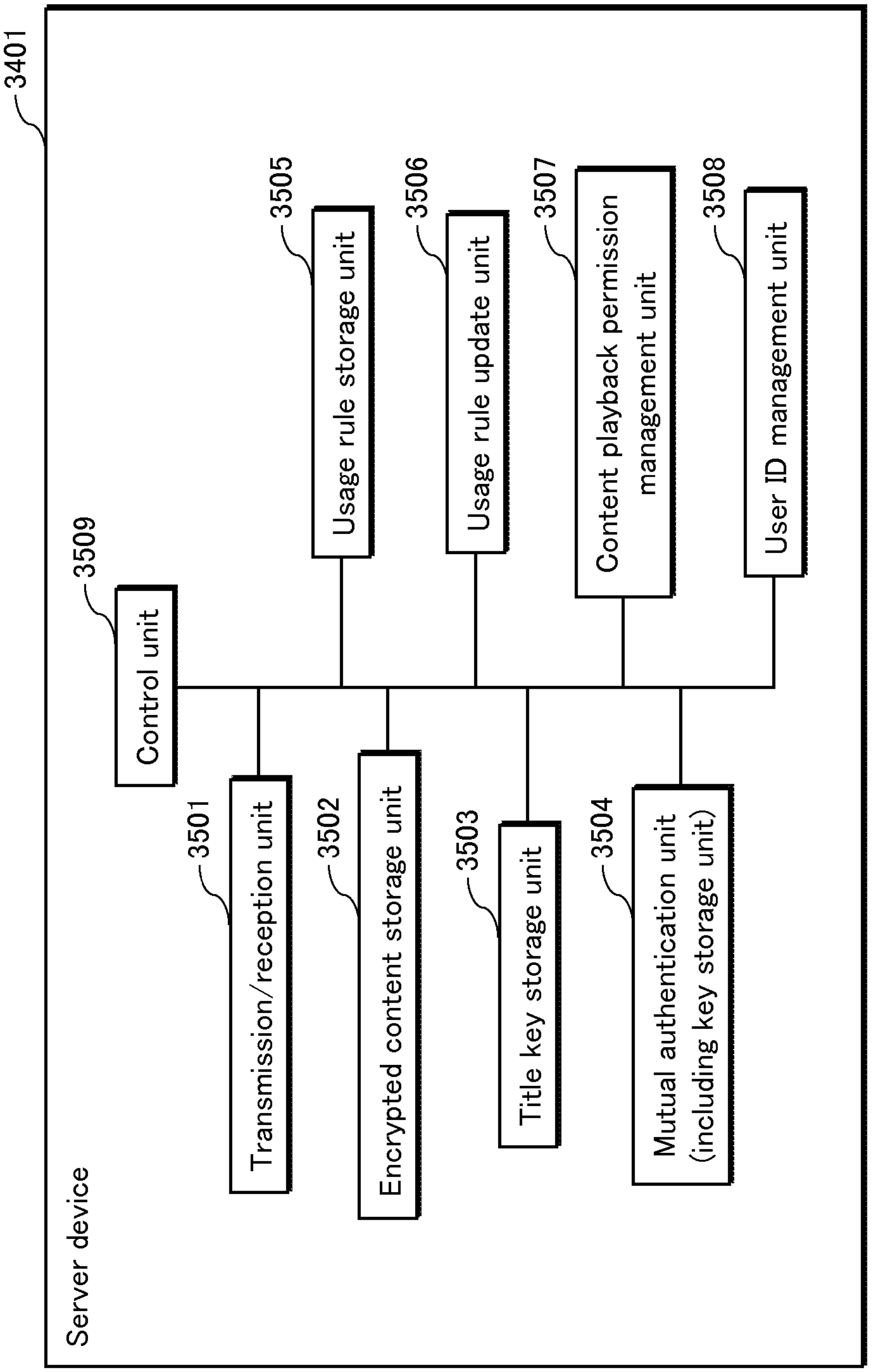
FIG. 44 is a block diagram showing a structure of a server device 3401.

As shown in FIG. 44, the server device 3401 includes a transmission/reception unit 3501, an encrypted content storage unit 3502, a title key storage unit 3503, a mutual authentication unit 3504, a usage rule storage unit 3505, a usage rule update unit 3506, a content playback permission management unit 3507, a user ID management unit 3508 and a control unit 3509.

The server device 3401 is specifically composed of a processor, a RAM, a ROM, a hard disk and the like not shown in the figure. Each of the RAM, the ROM, and the hard disk stores therein a computer program. The server device 3401 achieves its functions by the processor operating in accordance with the computer programs.

Note that functional blocks such as the transmission/reception unit 3501, the encrypted content storage unit 3502, the title key storage unit 3503, the mutual authentication unit 3504, the usage rule storage unit 3505, the usage rule update unit 3506, the content playback permission management unit 3507, the user ID management unit 3508, the control unit 3509 of the server device 3401 are typically implemented as an LSI, which is an integrated circuit. Individual units may respectively be made into discrete chips, or one or more units or part of each unit may be made into one chip.

In addition, the method for assembling integrated circuits is not limited to LSI, and a dedicated circuit or a general-purpose processor may be used. An FPGA (Field Programmable Gate Array), which is programmable after the LSI is manufactured, or a reconfigurable processor, which allows reconfiguration of the connection and setting of circuit cells inside the LSI, may be used.

Furthermore, if technology for forming integrated circuits that replaces LSIs emerges, owing to advances in semiconductor technology or to another derivative technology, the integration of functional blocks may naturally be accomplished using such technology.

Lastly, functional blocks may be implemented by software, but the functional blocks may also be implemented by a combination of an LSI and software. Also, software may be tamper-resistant.

(1) Transmission/reception Unit 3501

The transmission/reception unit 3501 receives the user ID, the password, and the content ID from the terminal device 3402. Also, the transmission/reception unit 3501 transmits the encrypted content, the title key and the usage rule to the terminal device 3402.

(2) Encrypted Content Storage Unit 3502, Title Key Storage Unit 3503 and Usage Rule Storage Unit 3505

The encrypted content storage unit 3502, the title key storage unit 3503 and the usage rule storage unit 3505 store therein the encrypted content, the title key and the usage rule, respectively.

(3) Mutual Authentication Unit 3504

The mutual authentication unit 3504 stores therein key data, performs a mutual authentication process and a key sharing process with the storage medium device 3403 by using the stored key data, and establishes a secure communication channel. In particular, the title key is encrypted with a shared key shared between the server device 3401 and the storage medium device 3403, and securely transmitted from the server device 3401 to the storage medium device 3403.

(4) Usage Rule Update Unit 3506

The usage rule update unit 3506 reads a usage rule managed for each content from the usage rule storage unit 3505, and generates binding information based on the user ID and the password received by the transmission/reception unit 3501 to update a binding information storage area of the usage rule.

Here, the binding information refers to information for binding content with a user.

The usage rule update unit 3506 generates concatenated data by concatenating a user ID and a password corresponding thereto, for example. Next, the usage rule update unit 3506 performs a hash calculation on the generated concatenated data, and determines part of or all of the calculation result as the binding information.

binding information=Hash part of or all of(user ID||password) (expression 10)

Here, the hash calculation used in the expression 10 needs to be the same as a hash calculation denoted as Hash used in expression 11, which is described below.

Figure 47:
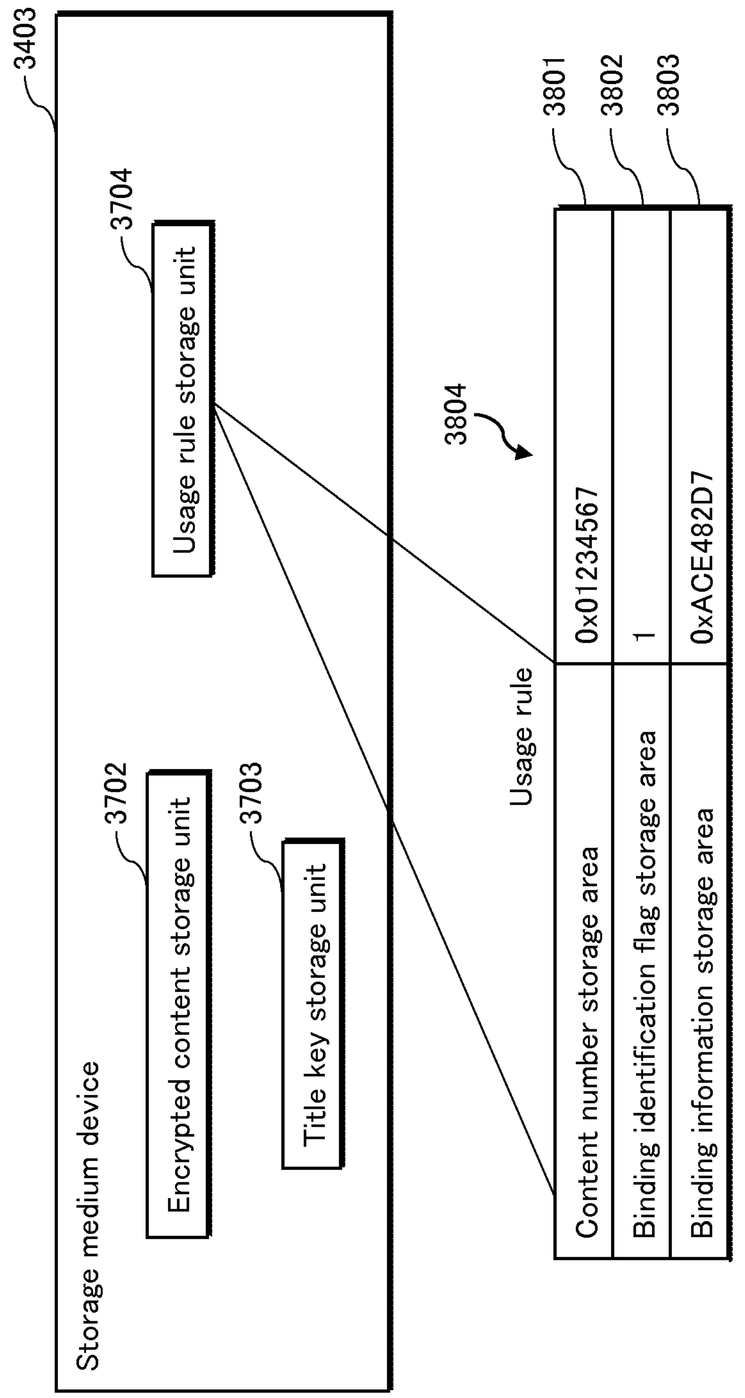
FIG. 47 shows a data structure of a usage rule 3804 stored in the storage medium device 3403.

FIG. 47 shows an example of the usage rule. The usage rule 3804 shown in FIG. 47 includes a content number storage area 3801, a binding identification flag storage area 3802, and a binding information storage area 3803.

The content number storage area 3801 stores therein an identifier (content ID) uniquely identifying content.

The binding identification flag storage area 3802 stores therein a binding identification flag.

In the example shown in FIG. 47, the binding identification flag is "1". The binding identification flag "1" indicates that content identified by the content ID is bound with a user. Being bound with a user means that only the user has the playback permission on the content and can play back the content.

The binding identification flag "0" indicates that content identified by the content ID is not bound with a user, and is only bound with a medium. Such content can be played back by a terminal device owned by any user.

The binding information storage area 3803 stores therein binding information (0xACE482D7) generated based on the user ID and the password.

(5) Content Playback Permission Management Unit 3507

The content playback permission management unit 3507 manages the playback permission owned by the user as database. The database associates a user ID with one or more content IDs, and stores therein the user ID and the content IDs. The user identified by the user ID has the playback permission of one or more content pieces identified by the one or more content IDs associated with the user ID. For example, in the database, the user "A" owns the playback permission of a content piece "1" and a content piece "5", and the user "B" owns the playback permission of the content piece "5" and a content piece "7".

(6) User ID Management Unit 3508

The user ID management unit 3508 associates the user ID with the password, and stores therein the user ID and the password. For example, the user ID and the password are for using services provided by the server device 3401. Such services are permitted to be used only when the terminal device 3402 is used and a pair of the user ID and the password that have been input by the user and a pair of the user ID and the password that are stored in the user ID management unit 3508 match.

(7) Control Unit 3509

The control unit 3509 manages and controls the transmission/reception unit 3501, the encrypted content storage unit 3502, the title key storage unit 3503, the mutual authentication unit 3504, the usage rule storage unit 3505, the usage rule update unit 3506, the content playback permission management unit 3507, and the user ID management unit 3508, so as to communicate with the terminal device 3402, and store, update and manage various data, for example.

4.3 Configuration of Terminal Device 3402

The following describes the configuration of the terminal device 3402 in detail.

Figure 45:
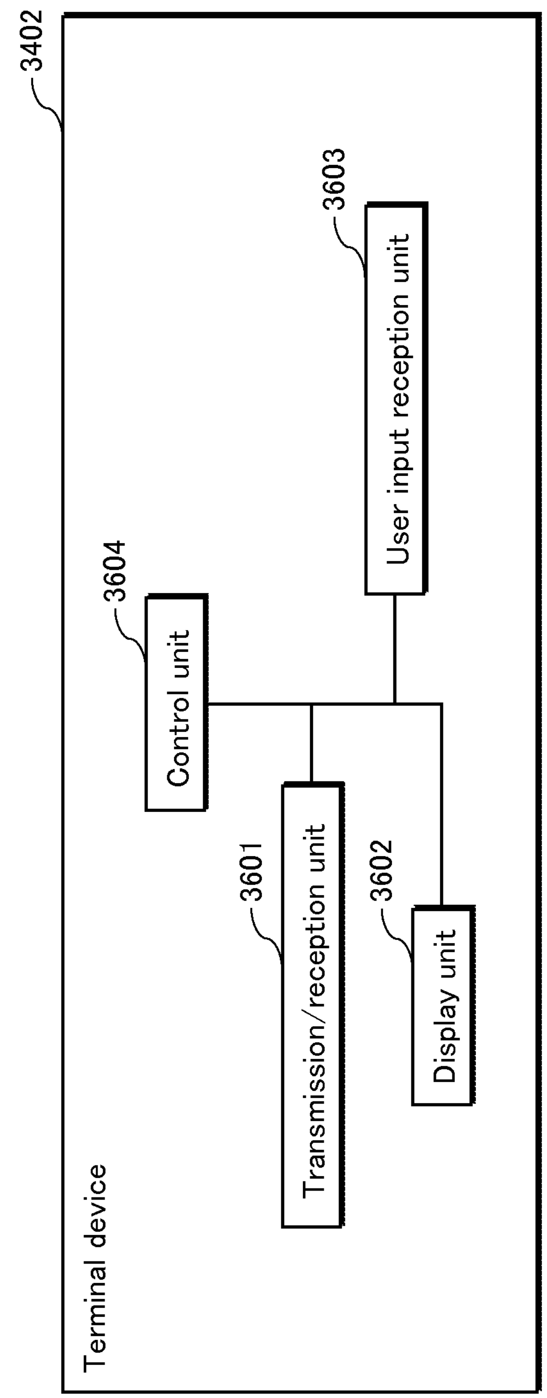
FIG. 45 is a block diagram showing a structure of a terminal device 3402.

The terminal device 3402 includes a transmission/reception unit 3601, a display unit 3602, a user input reception unit 3603 and a control unit 3604, as shown in FIG. 45.

The terminal device 3402 is specifically composed of a processor, a RAM, a ROM, a hard disk and the like not shown in the figure. Each of the RAM, the ROM, and the hard disk stores therein a computer program. The terminal device 3402 achieves its functions by the processor operating in accordance with the computer programs.

Note that functional blocks such as the transmission/reception unit 3601 and the control unit 3604 of the terminal device 3402 are typically implemented as an LSI, which is an integrated circuit. Individual units may respectively be made into discrete chips, or one or more units or part of each unit may be made into one chip.

In addition, the method for assembling integrated circuits is not limited to LSI, and a dedicated circuit or a general-purpose processor may be used. An FPGA, which is programmable after the LSI is manufactured, or a reconfigurable processor, which allows reconfiguration of the connection and setting of circuit cells inside the LSI, may be used.

Furthermore, if technology for forming integrated circuits that replaces LSIs emerges, owing to advances in semiconductor technology or to another derivative technology, the integration of functional blocks may naturally be accomplished using such technology.

Lastly, functional blocks may be implemented by software, but the functional blocks may also be implemented by a combination of an LSI and software. Also, software may be tamper-resistant.

(1) Transmission/reception Unit 3601

The transmission/reception unit 3601 transmits the user ID, the password, and the content ID to the server device 3401. Also, the transmission/reception unit 3601 receives the encrypted content, the title key and the usage rule from the server device 3401. Further, the transmission/reception unit 3601 outputs and writes the encrypted content, the title key and the usage rule to the storage medium device 3403.

(2) Display Unit 3602 and User Input Reception Unit 3603

The display unit 3602 displays a screen that prompts a user to input a user ID and a password on a display screen. The user input reception unit 3603 receives the user ID and the password input by the user. Alternatively, the display unit 3602 displays a content list, a table, etc., and the user input reception unit 3603 receives content selected by the user.

(3) Control Unit 3604

The control unit 3604 manages and controls the transmission/reception unit 3601, the display unit 3602, and the user input reception unit 3603 so as to communicate with the server device 3401 and the storage medium device 3403, display a screen for a user, and receive a user input.

4.4 Configuration of Storage Medium Device 3403

The following describes the configuration of the storage medium device 3403 in detail.

Figure 46:
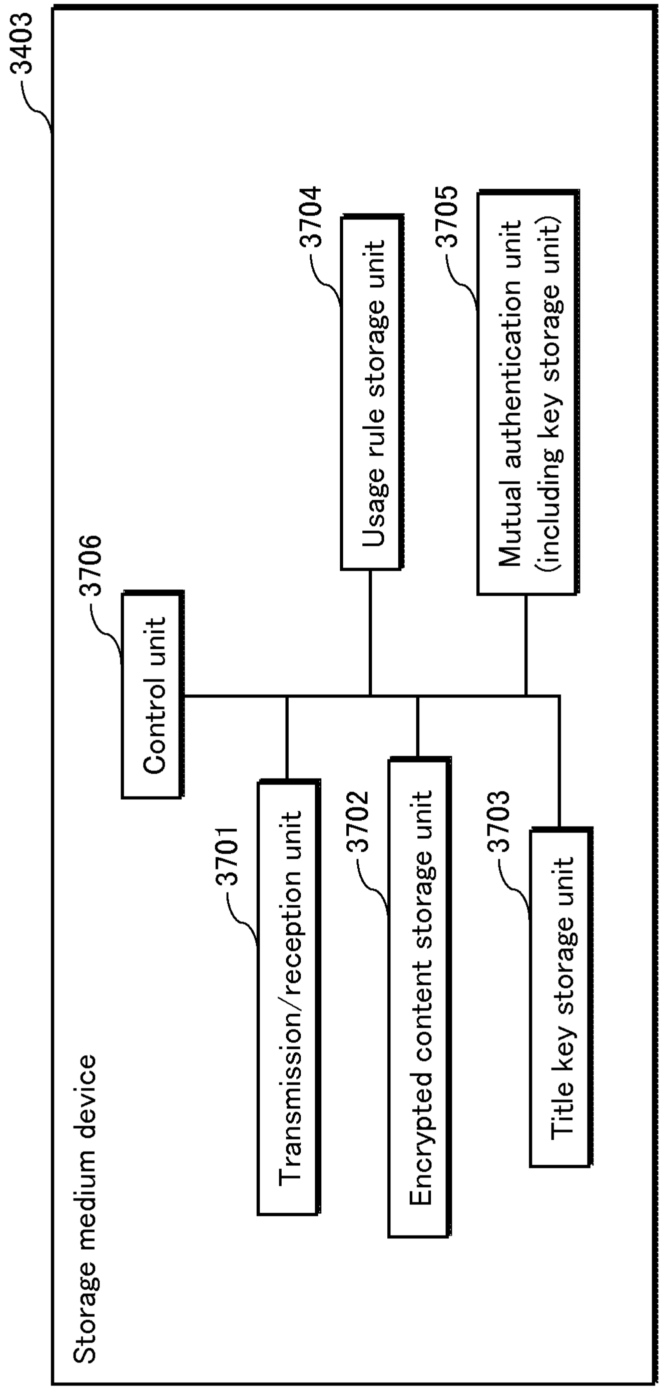
FIG. 46 is a block diagram showing a structure of a storage medium device 3403.

The storage medium device 3403 includes a transmission/reception unit 3701, an encrypted content storage unit 3702, a title key storage unit 3703, a usage rule storage unit 3704, a mutual authentication unit 3705, and a control unit 3706, as shown in FIG. 46.

The storage medium device 3403 is specifically composed of a processor, a RAM, a ROM, and the like not shown in the figure. Each of the RAM and the ROM stores therein a computer program. The storage medium device 3403 achieves its functions by the processor operating in accordance with the computer programs.

Note that functional blocks such as the transmission/reception unit 3701, the encrypted content storage unit 3702, the title key storage unit 3703, the usage rule storage unit 3704, the mutual authentication unit 3705, and the control unit 3706 of the storage medium device 3403 are typically implemented as an LSI, which is an integrated circuit. Individual units may respectively be made into discrete chips, or one or more units or part of each unit may be made into one chip.

In addition, the method for assembling integrated circuits is not limited to LSI, and a dedicated circuit or a general-purpose processor may be used. An FPGA, which is programmable after the LSI is manufactured, or a reconfigurable processor, which allows reconfiguration of the connection and setting of circuit cells inside the LSI, may be used.

Furthermore, if technology for forming integrated circuits that replaces LSIs emerges, owing to advances in semiconductor technology or to another derivative technology, the integration of functional blocks may naturally be accomplished using such technology.

Lastly, functional blocks may be implemented by software, but the functional blocks may also be implemented by a combination of an LSI and software. Also, software may be tamper-resistant.

(1) Transmission/reception Unit 3701

The transmission/reception unit 3701 receives the encrypted content, the title key and the usage rule from the terminal device 3402. Next, transmission/reception unit 3701 writes the received encrypted content, title key and usage rule in the encrypted content storage unit 3702, the title key storage unit 3703 and the usage rule storage unit 3704, respectively.

(2) Encrypted Content Storage Unit 3702, Title Key Storage Unit 3703 and Usage Rule Storage Unit 3704

The encrypted content storage unit 3702, the title key storage unit 3703 and the usage rule storage unit 3704 stores therein the encrypted content, the title key and the usage rule, respectively.

(3) Mutual Authentication Unit 3705

The mutual authentication unit 3705 stores therein key data, performs a mutual authentication process and a key sharing process with the server device 3401 by using the stored key data, and establishes a secure communication channel. In particular, the title key is encrypted with the shared key, and securely transmitted from the server device 3401 to the storage medium device 3403.

(4) Control Unit 3706

The control unit 3706 manages and controls the transmission/reception unit 3701, the encrypted content storage unit 3702, the title key storage unit 3703, the usage rule storage unit 3704 and the mutual authentication unit 3705 so as to communicate with the terminal device 3402, and store, update and manage various data.

4.5 Operation while Recording Content

Figure 49:
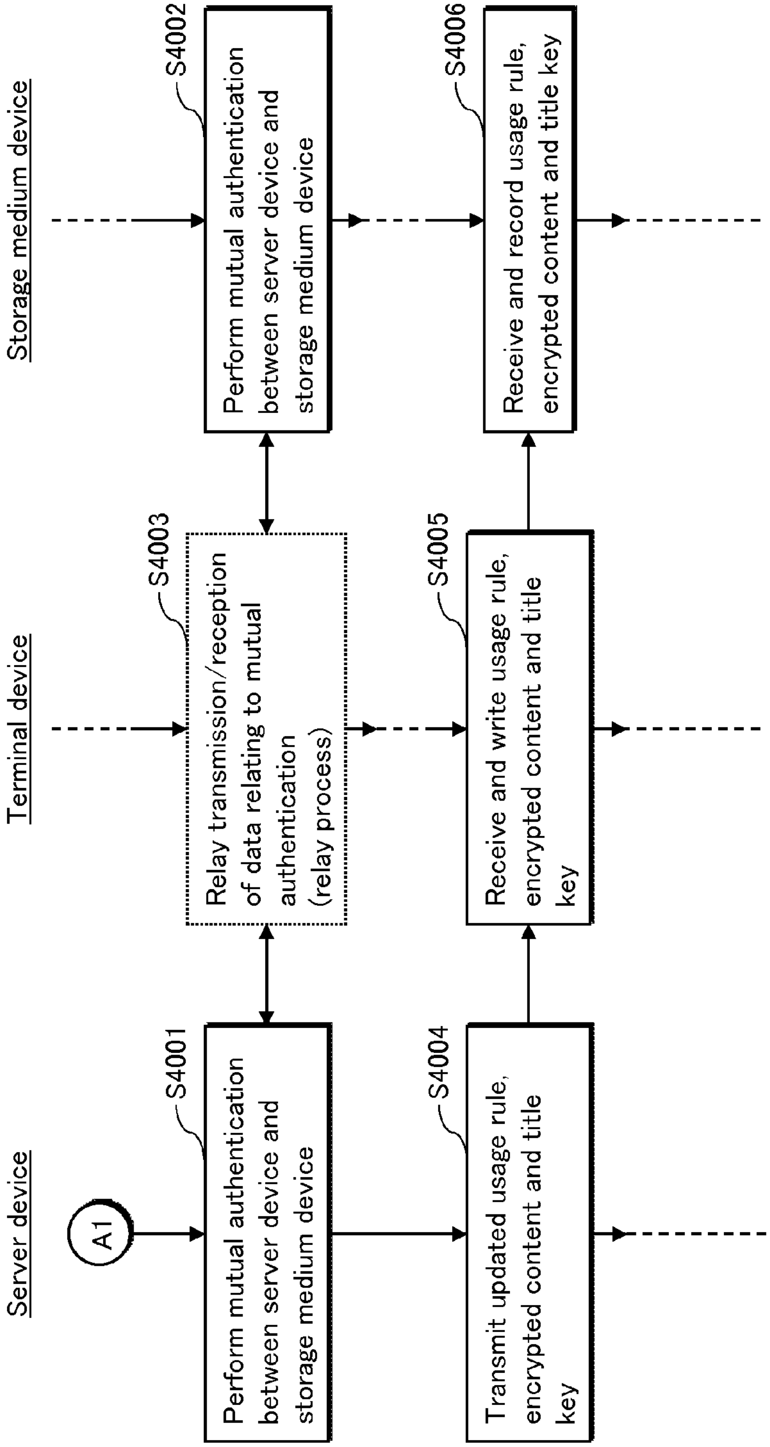
FIG. 49 is a sequence diagram showing operations during content recording.

The following describes operations of the server device 3401, the terminal device 3402 and the storage medium device 3403 while recording content, with reference to sequence diagrams shown in FIGS. 48 and 49.

The user input reception unit 3603 of the terminal device 3402 receives the user ID and the password that are input by the user, and transmits the received user ID and password to the server device 3401 via the transmission/reception unit 3601 (step S3901).

The transmission/reception unit 3501 of the server device 3401 receives the user ID and the password, and the user ID management unit 3508 of the server device 3401 confirms user information and performs a login process (step S3902). Here, when the login process fails, the terminal device 3402 is notified of it.

The server device 3401 transmits a content list to the terminal device 3402 via the transmission/reception unit 3501 (step S3903). The display unit 3602 of the terminal device 3402 that has received the content list displays the content list. The user input reception unit 3603 receives content selected by the user, and transmits an identifier (content ID) for uniquely identifying the selected content to the server device 3401 (step S3904).

The usage rule update unit 3506 of the server device 3401 reads the usage rule from the usage rule storage unit 3505. Next, based on the received user ID and password, the usage rule update unit 3506 generates binding information for binding content identified by the content ID with the user. Next, the usage rule update unit 3506 writes the generated binding information in the binding information storage area of the usage rule (step S3905).

In the server device 3401 and the storage medium device 3403, the mutual authentication units 3504 and 3705 perform a mutual authentication process and a key sharing process so as to securely transmit and receive various data (step S4001, step S4002). At this point, the transmission/reception unit 3601 of the terminal device 3402 relays transmission/reception of various data relating to the mutual authentication process and the key sharing process (step S4003).

After establishing a secure communication channel, the server device 3401 transmits the updated usage rule, the encrypted content and the title key to the terminal device 3402 via the transmission/reception unit 3501 (step S4004). The terminal device 3402 receives the usage rule, the encrypted content and the title key, and further transmits the usage rule, the encrypted content and the title key to the storage medium device 3403 (step S4005). The storage medium device 3403 receives and stores therein the usage rule, the encrypted content and the title key (step S4006).

5. Embodiment 5

The following describes a content distribution system 10*e* as Embodiment 5 of the present invention with reference to the drawings.

5.1 Configuration of Content Distribution System 10*e*

Figure 50:
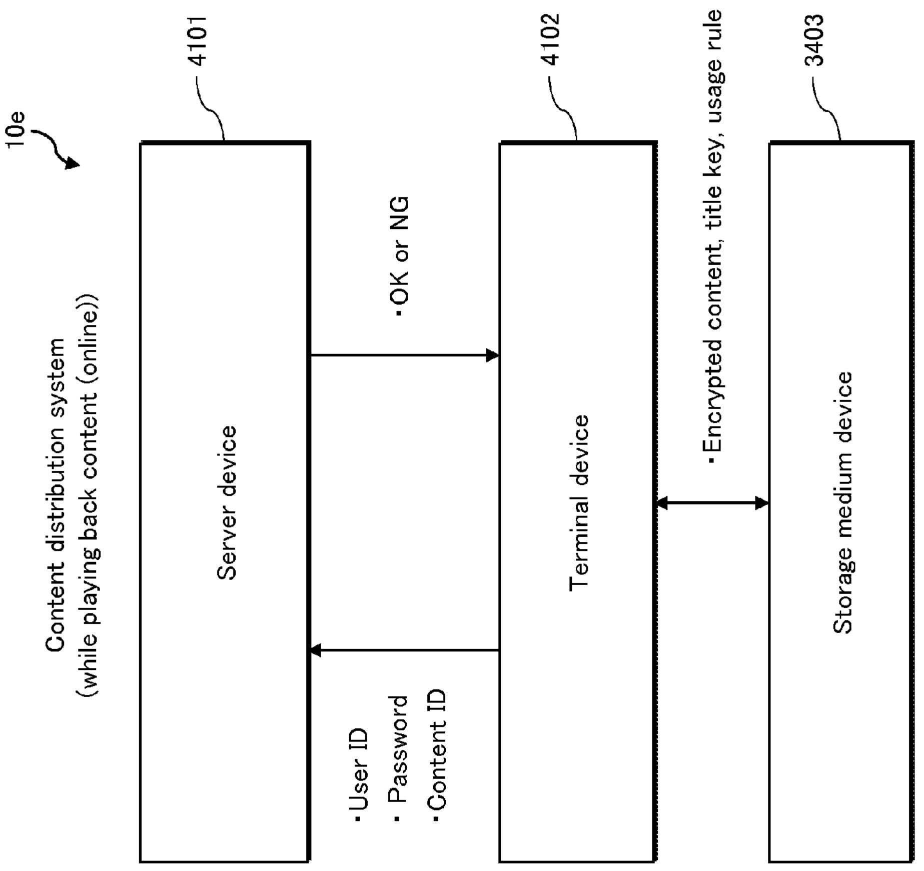
FIG. 50 shows a structure of a content distribution system 10*e* as Embodiment 5 of the present invention.

The content distribution system 10*e* includes a server device 4101, a terminal device 4102 and a storage medium device 3403 as shown in FIG. 50.

Note that the storage medium device 3403 may be a detachable storage medium composed of a control unit (controller) and a storage unit (flash memory, etc.). The storage medium device 3403 may be a memory internal to the terminal device 4102, similarly composed of a control unit (controller) and a storage unit (flash memory, etc.).

The terminal device 4102 transmits, to the server device 4101, a user ID and a password that are input by the user, and a content ID that uniquely identifies content selected by the user.

The server device 4101 judges whether the user has the playback permission of content that the user selects, based on the received user ID, password and content ID. Next, the server device 4101 transmits the result (indicating that playback is possible or impossible) to the terminal device 4102. The terminal device 4102 that has received the result indicating that playback is possible reads encrypted content, a title key and a usage rule from the storage medium device 3403, and plays back the content. When receiving the result indicating that playback is impossible, the terminal device 4102 notifies the user of it.

The terminal device 4102 and the storage medium device 3403 perform a mutual authentication process and a key sharing process therebetween, and establish a secure communication channel. The title key is securely transmitted on a communication channel. That is, the title key is transmitted after being encrypted.

Similarly, the usage rule may be transmitted after being encrypted so as to be prevented from being tampered with. The usage rule may be bound with the title key and then transmitted. For example, an XOR operation is performed on a hash value of the usage rule and the title key. As a result of this, even if the usage rule is tampered with, the title key cannot be properly decrypted.

The server device 4101 and the terminal device 4102 are described in detail below. The storage medium device 3403 is the same as the storage medium device 3403 of Embodiment 4, and a description thereof is omitted.

5.2 Configuration of Server Device 4101

The following describes the server device 4101 in detail.

Figure 51:
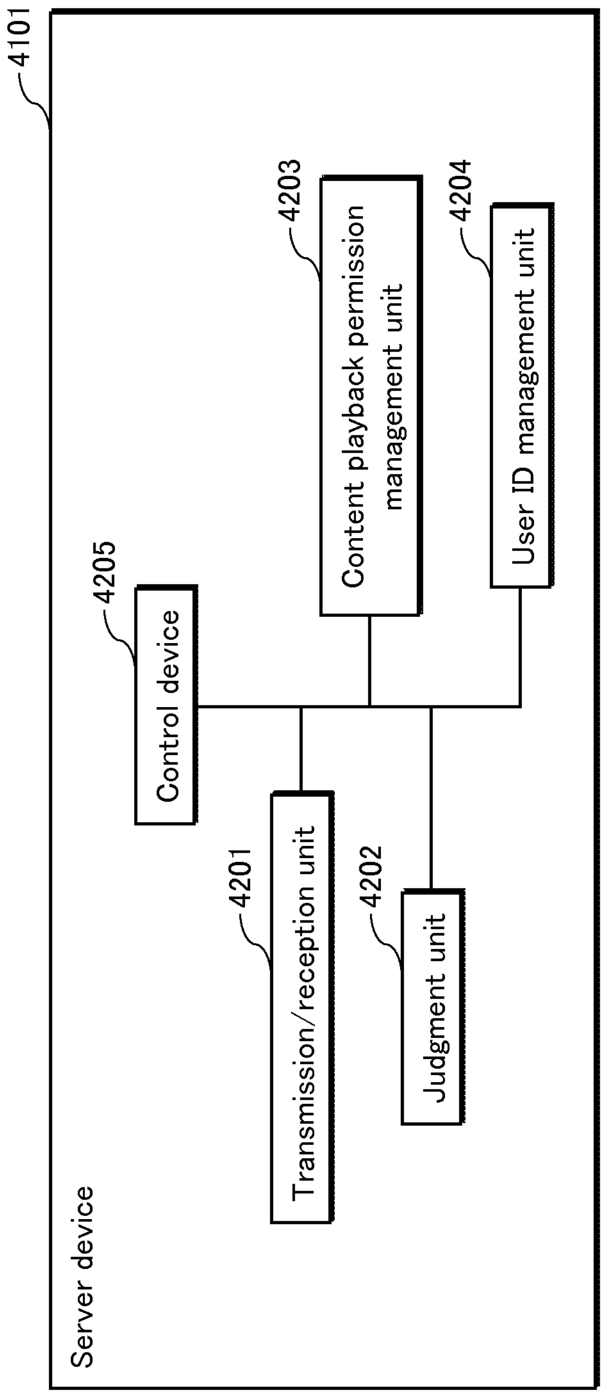
FIG. 51 is a block diagram showing a structure of a server device 4101.

As shown in FIG. 51, the server device 4101 includes a transmission/reception unit 4201, a judgment unit 4202, a content playback permission management unit 4203, a user ID management unit 4204 and a control unit 4205.

The server device 4101 is specifically composed of a processor, a RAM, a ROM, a hard disk and the like not shown in the figure. Each of the RAM, the ROM, and the hard disk stores therein a computer program. The server device 4101 achieves its functions by the processor operating in accordance with the computer programs.

Note that functional blocks such as the transmission/reception unit 4201, the judgment unit 4202, a content playback permission management unit 4203, the user ID management unit 4204, the control unit 4205 of the server device 4101 are typically implemented as an LSI, which is an integrated circuit. Individual units may respectively be made into discrete chips, or one or more units or part of each unit may be made into one chip.

In addition, the method for assembling integrated circuits is not limited to LSI, and a dedicated circuit or a general-purpose processor may be used. An FPGA, which is programmable after the LSI is manufactured, or a reconfigurable processor, which allows reconfiguration of the connection and setting of circuit cells inside the LSI, may be used.

Furthermore, if technology for forming integrated circuits that replaces LSIs emerges, owing to advances in semiconductor technology or to another derivative technology, the integration of functional blocks may naturally be accomplished using such technology.

Lastly, functional blocks may be implemented by software, but the functional blocks may also be implemented by a combination of an LSI and software. Also, software may be tamper-resistant.

(1) Transmission/reception Unit 4201 and Judgment Unit 4202

The transmission/reception unit 4201 receives the user ID, the password, and the content ID from the terminal device 4102.

The judgment unit 4202 judges whether the user ID management unit 4204 stores therein the received pair of the user ID and the password. Also, the judgment unit 4202 judges whether the content playback permission management unit 4203 permits the received user ID to play back content identified by the content ID. The judgment unit 4202 judges whether the user can play back the content, and transmits the judgment result to the terminal device 4102.

(2) Content Playback Permission Management Unit 4203

The content playback permission management unit 4203 manages playback permission owned by the user as database. The database associates a user ID with one or more content IDs, and stores therein the user ID and the content IDs. The user identified by the user ID has the playback permission of the one or more content pieces identified by the one or more content IDs associated with the user ID. In the database, the user "A" owns the playback permission of a content piece "1" and a content piece "5", and the user "B" owns the playback permission of the content piece "5" and a content piece "7".

(3) User ID Management Unit 4204

The user ID management unit 4204 associates the user ID with the password, and stores therein the user ID and the password. For example, the user ID and the password are for using services provided by the server device 4101. Such services are permitted to be used only when the received pair of the user ID and the password and the stored pair of the user ID and the password match.

(4) Control Unit 4205

The control unit 4205 manages and controls the transmission/reception unit 4201, the judgment unit 4202, the content playback permission management unit 4203 and the user ID management unit 4204 so as to communicate with the terminal device 4102, and store, update and manage various data.

5.3 Configuration of Terminal Device 4102

The following describes the configuration of the terminal device 4102 in detail.

Figure 52:
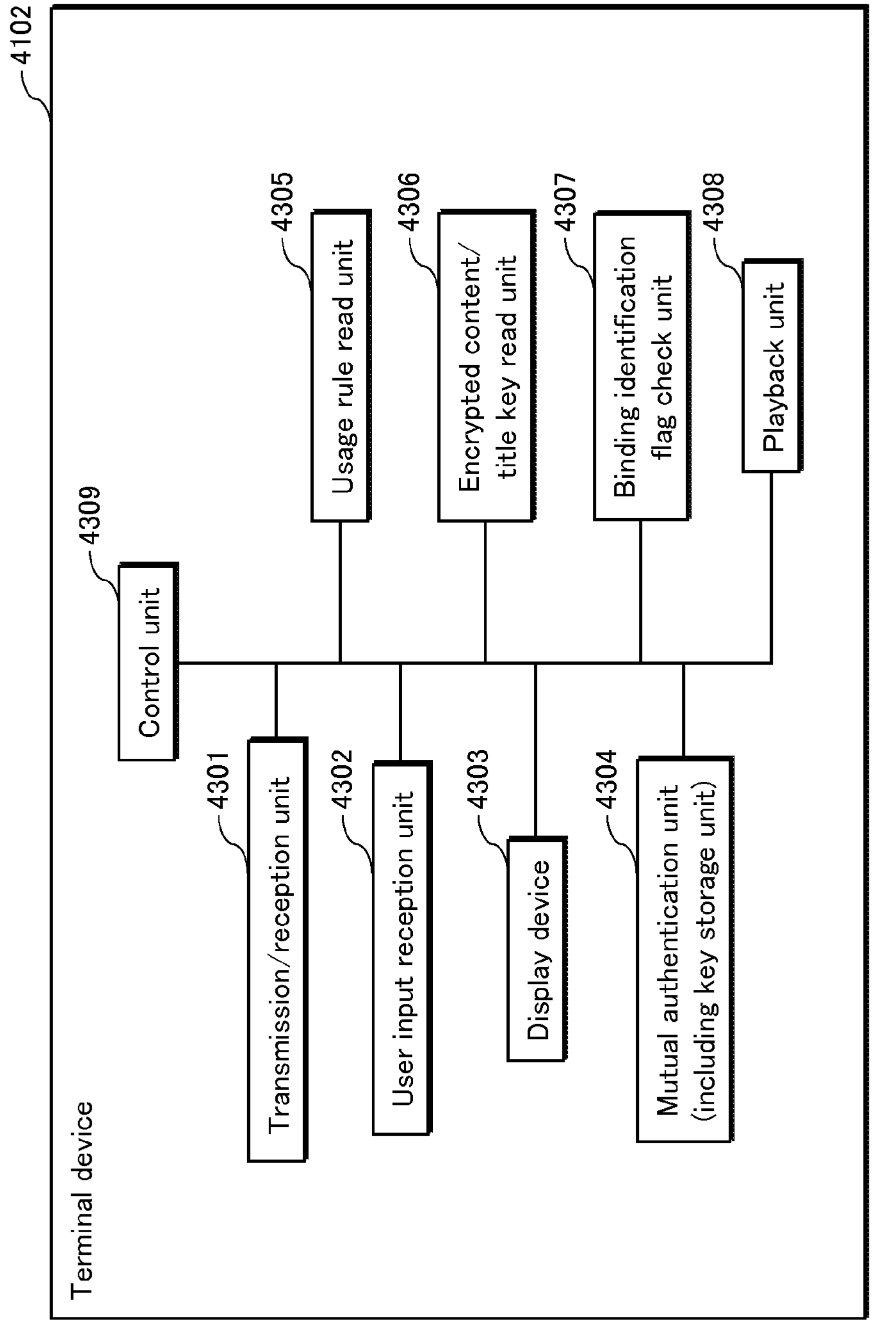
FIG. 52 is a block diagram showing a structure of a terminal device 4102.

The terminal device 4102 includes a transmission/reception unit 4301, a user input reception unit 4302, a display unit 4303, a mutual authentication unit 4304, a usage rule read unit 4305, an encrypted content/title key read unit 4306, a binding identification flag check unit 4307, a playback unit 4308 and control unit 4309, as shown in FIG. 52.

The terminal device 4102 is specifically composed of a processor, a RAM, a ROM, a hard disk and the like not shown in the figure. Each of the RAM, the ROM, and the hard disk stores therein a computer program. The terminal device 4102 achieves its functions by the processor operating in accordance with the computer programs.

Note that functional blocks such as the transmission/reception unit 4301, the user input reception unit 4302, the display unit 4303, the mutual authentication unit 4304, the usage rule read unit 4305, the encrypted content/title key read unit 4306, the binding identification flag check unit 4307, the playback unit 4308, and the control unit of the terminal device 4102 are typically implemented as an LSI, which is an integrated circuit. Individual units may respectively be made into discrete chips, or one or more units or part of each unit may be made into one chip.

In addition, the method for assembling integrated circuits is not limited to LSI, and a dedicated circuit or a general-purpose processor may be used. An FPGA, which is programmable after the LSI is manufactured, or a reconfigurable processor, which allows reconfiguration of the connection and setting of circuit cells inside the LSI, may be used.

Furthermore, if technology for forming integrated circuits that replaces LSIs emerges, owing to advances in semiconductor technology or to another derivative technology, the integration of functional blocks may naturally be accomplished using such technology.

Lastly, functional blocks may be implemented by software, but the functional blocks may also be implemented by a combination of an LSI and software. Also, software may be tamper-resistant.

(1) Transmission/reception Unit 4301

The transmission/reception unit 4301 transmits the user ID, the password, and the content ID to the server device 4101. Also, the transmission/reception unit 4301 receives information whether the content can be played back from the server device 4101. The transmission/reception unit 4301 reads the encrypted content, the title key and the usage rule from the storage medium device 3403.

(2) User Input Reception Unit 4302 and Display Unit 4303

The display unit 4303 displays a screen that prompts a user to input a user ID and a password on a display screen.

The user input reception unit 4302 receives the user ID and the password input by the user. Alternatively, the display unit 4303 displays a content list, a table, etc., and the user input reception unit 4302 receives content selected by the user.

(3) Mutual Authentication Unit 4304

The mutual authentication unit 4304 stores therein key data, performs a mutual authentication process and a key sharing process with the storage medium device 3403 by using the stored key data, and establishes a secure communication channel. In particular, the title key is encrypted with the shared key, and securely transmitted from the terminal device 4102 to the storage medium device 3403.

(4) Usage Rule Read Unit 4305 and Encrypted Content/title Key Read Unit 4306

The usage rule read unit 4305 reads the usage rule from the storage medium device 3403. The encrypted content/title key read unit 4306 reads the encrypted content and the title key from the storage medium device 3403.

(5) Binding Identification Flag Check Unit 4307

The binding identification flag check unit 4307 checks a binding identification flag included in a usage rule corresponding to content selected by the user.

For example, when the binding identification flag indicates that the content is bound with the user, the terminal device 4102 inquires of the server device 4101 whether playback is possible. In contrast, when the binding identification flag identifies that the content is not bound with the user but is bound with a medium, the terminal device 4102 does not inquire of the server device 4101 whether playback is possible and proceeds to a playback process.

(6) Playback Unit 4308

The playback unit 4308 decrypts the encrypted content read from the storage medium device 3403, and decodes and plays back the decrypted content.

(7) Control Unit 4309

The control unit 4309 manages and controls the transmission/reception unit 4301, the user input reception unit 4302, the display unit 4303, the mutual authentication unit 4304, the usage rule read unit 4305, the encrypted content/title key read unit 4306, the binding identification flag check unit 4307 and the playback unit 4308 so as to communicate with the server device 4101 and the storage medium device 3403, display a screen for a user, and receive a user input.

5.4 Operations During Content Playback (when Inquiring of Server)

Figure 53:
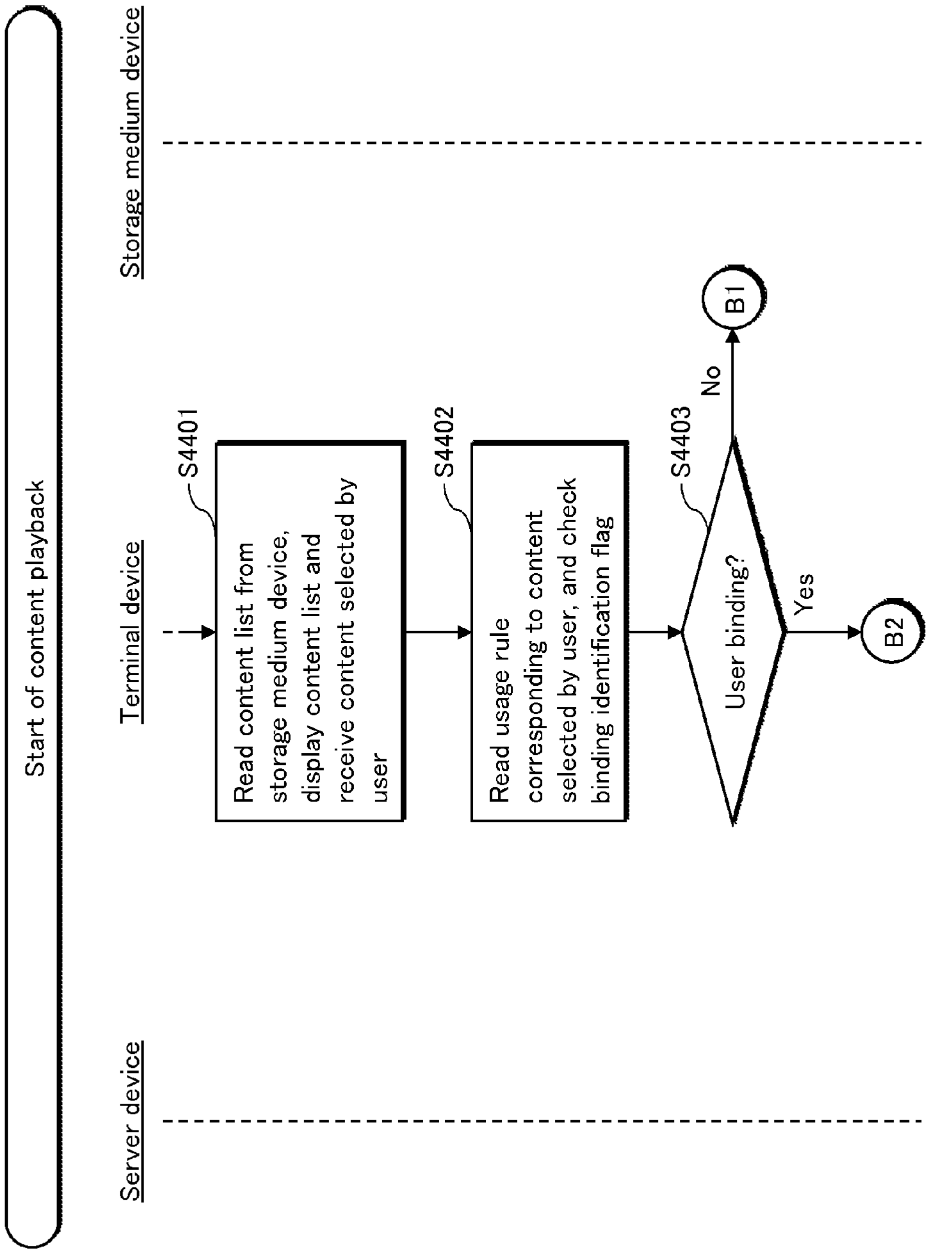
FIG. 53 is a sequence diagram showing operations during content playback, continuing to FIG. 54.
Figure 54:
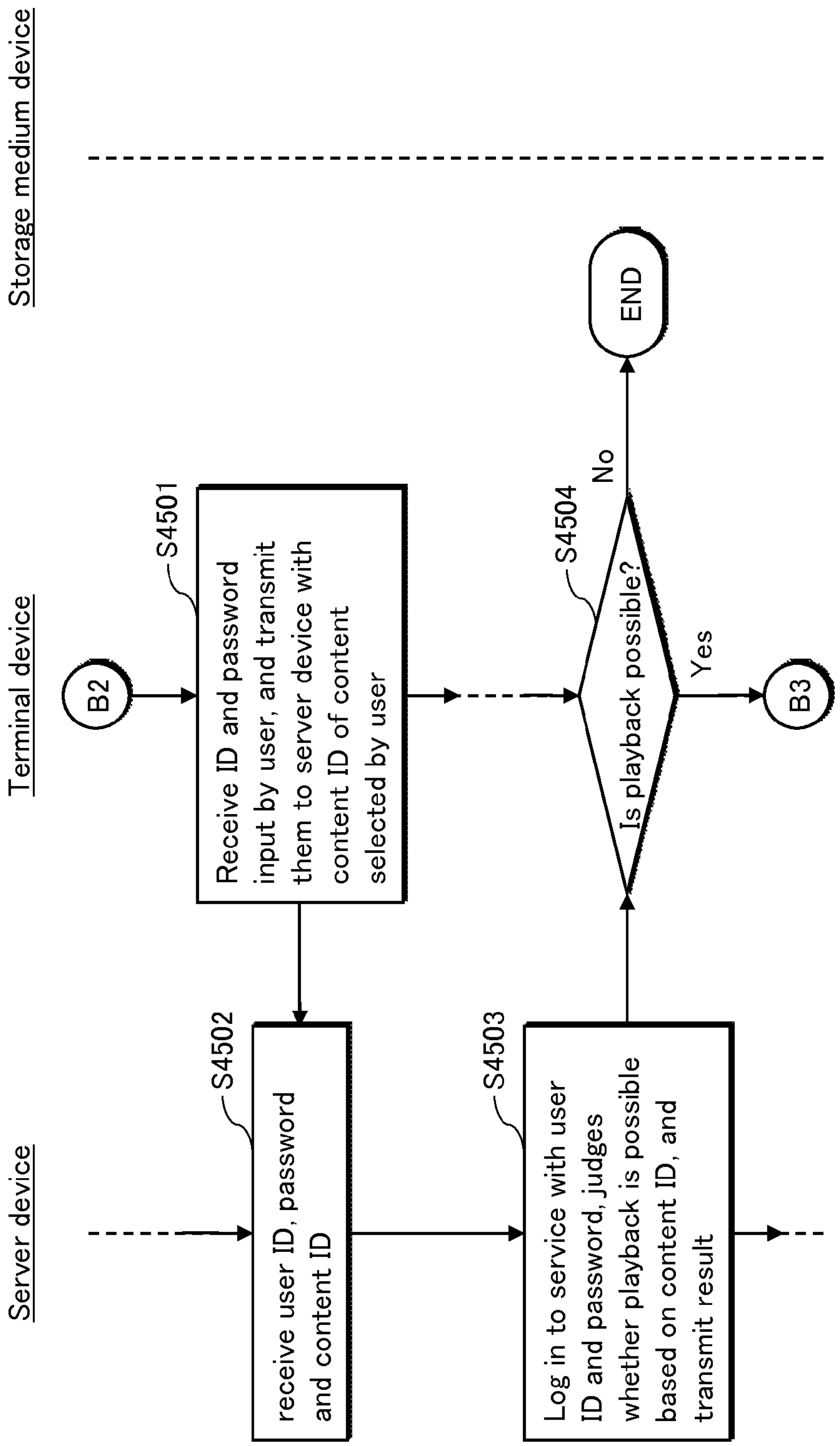
FIG. 54 is a sequence diagram showing operations during content playback, continuing to FIG. 55.
Figure 55:
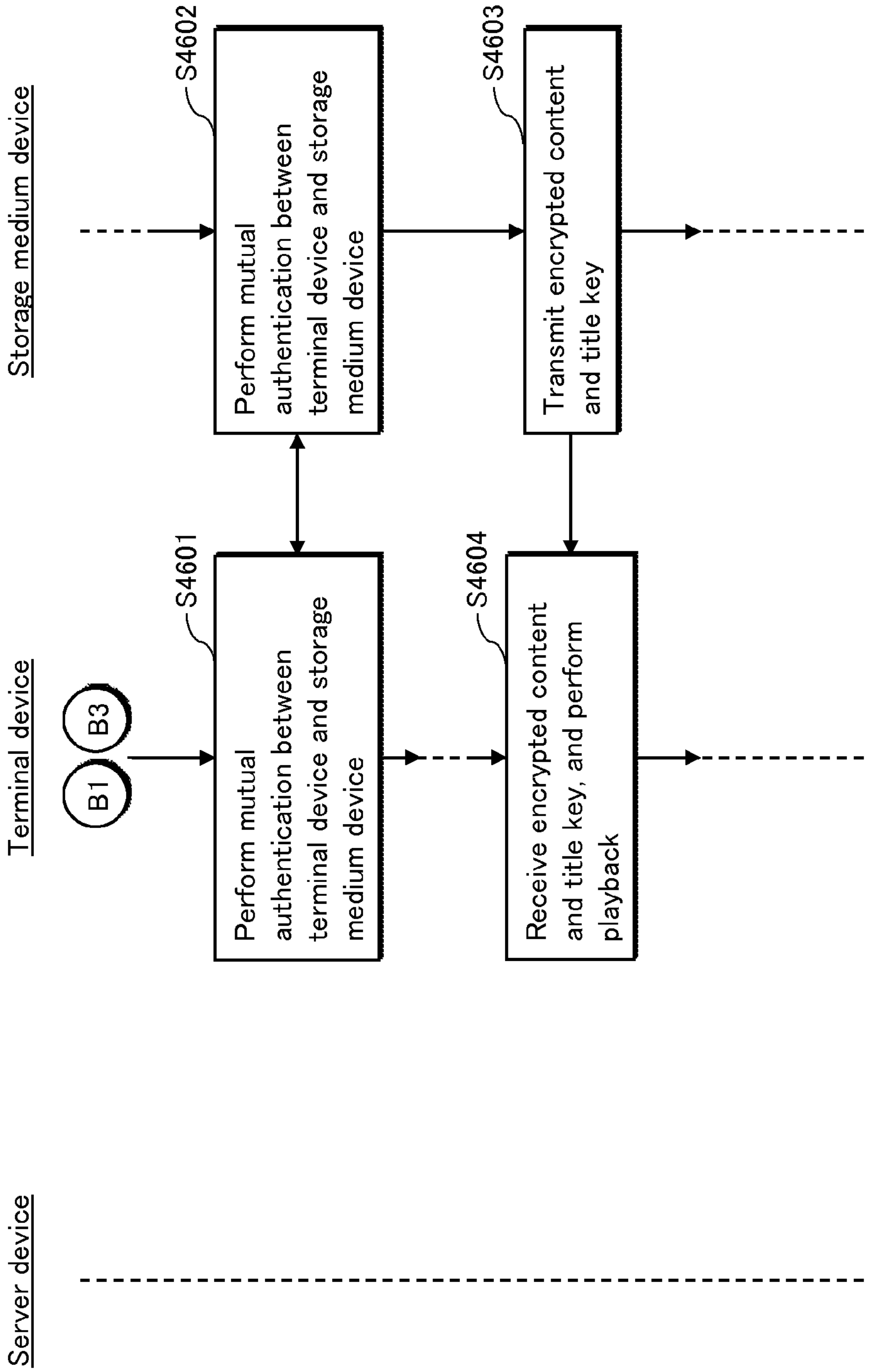
FIG. 55 is a sequence diagram showing operations during content playback.

The following describes operations of the server device 4101, the terminal device 4102 and the storage medium device 3403 while playing back content, with reference to FIGS. 53 through 55.

The display unit 4303 of the terminal device 4102 displays a content list read from the storage medium device 3403. The user input reception unit 4302 receives content selected by the user (step S4401).

The usage rule read unit 4305 reads a usage rule corresponding to the content selected by the user. Next, the binding identification flag check unit 4307 checks whether the binding identification flag included in the read usage rule indicates user binding (step S4402).

When the binding identification flag indicates that the content is not bound with the user (No in step S4403), the terminal device 4102 does not inquire of the server device 4101 and proceeds to a mutual authentication process with the storage medium device 3403 (step S4601).

In contrast, when the binding identification flag indicates that the content is bound with the user (Yes in step S4403), the user input reception unit 4302 of the terminal device 4102 receives the user ID and the password input by the user, and transmits the user ID and the password to the server device 4101 along with a content ID of the content selected by the user via the transmission/reception unit 4301 (step S4501).

The transmission/reception unit 4201 of the server device 4101 receives the user ID, the password, and the content ID (step S4502). Next, the user ID management unit 4204 performs a login process by confirming user information, and the judgment unit 4202 judges whether playback is possible based on the database managed by the content playback permission management unit 4203 and the received content ID, and transmits the result (indicating that playback is possible or playback is impossible)(step S4503).

When the transmission/reception unit 4301 of the terminal device 4102 receives the result indicating that playback is impossible (No in step S4504), the terminal device 4102 stops processing without playing back the content. In contrast, when the transmission/reception unit 4301 of the terminal device 4102 receives the result indicating that playback is possible (Yes in step S4504), the mutual authentication unit 3504 of the terminal device 4102 and the mutual authentication unit 3705 of the storage medium device 3403 perform a mutual authentication process and a key sharing process so as to securely transmit and receive various data (step S4601, step S4602).

After establishing a secure communication channel, the storage medium device 3403 transmits the encrypted content and the title key to the terminal device 4102 (step S4603). The terminal device 4102 receives the encrypted content and the title key, and the playback unit 4308 decrypts the encrypted content with the title key and performs a playback process (decodes, etc.) on the content obtained by the decryption (step S4604).

6. Embodiment 6

6.1 Configuration of Content Distribution System **10*f***

Figure 56:
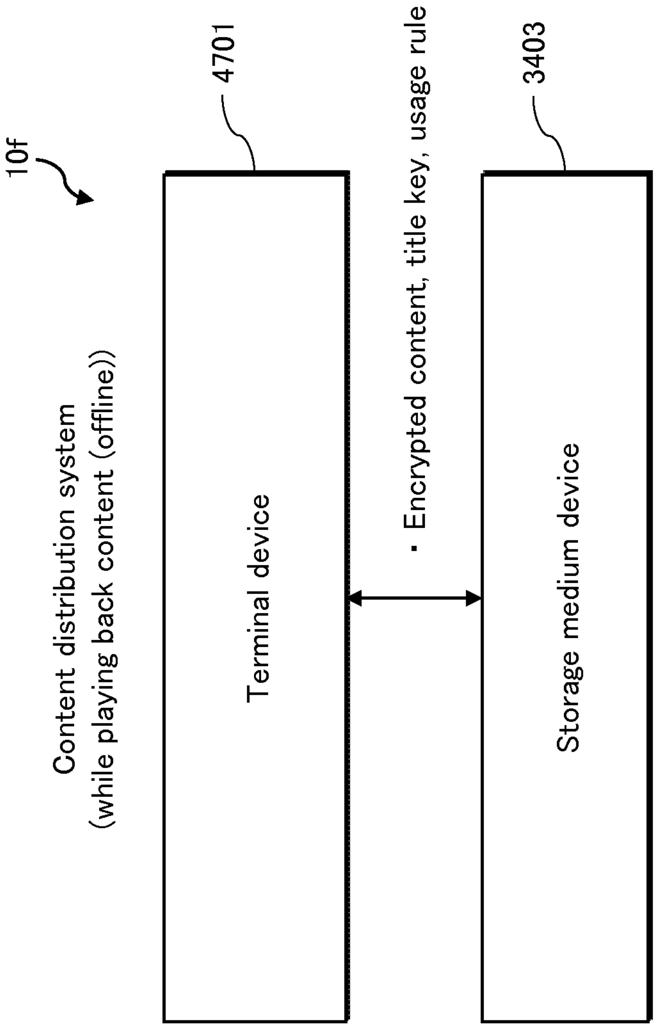
FIG. 56 shows a structure of a content distribution system 10*f* as Embodiment 6 of the present invention.

The content distribution system **10*f* includes a terminal device 4701 and a storage medium device 3403 as shown in FIG. 56**.

Note that the storage medium device 3403 may be a detachable storage medium composed of a control unit (controller) and a storage unit (flash memory, etc.). The storage medium device 3403 may be a memory internal to the terminal device 4701, similarly composed of a control unit (controller) and a storage unit (flash memory, etc.).

The terminal device 4701 receives a user ID and a password that are input by a user, and a content ID that uniquely identifies content selected by the user. Next, the terminal device 4701 judges whether the user has the playback permission to play back the content selected by the user, based on the received user ID, password and content ID and a usage rule read from the storage medium device 3403. When the user has the playback permission, the terminal device 4701 starts playing back the content. When the user does not have the playback permission, the terminal device 4701 notifies the user of it without playing back the content.

The terminal device 4701 and the storage medium device 3403 perform a mutual authentication process and a key sharing process therebetween, and establish a secure communication channel. The title key is securely transmitted on a communication channel. That is, the title key is transmitted after being encrypted. Similarly, the usage rule is transmitted after being encrypted so as to be prevented from being tampered with. The usage rule may be bound with the title key and then transmitted. For example, an XOR operation is performed on a hash value of the usage rule and the title key.

As a result of this, even if the usage rule is tampered with, the title key cannot be properly decrypted.

The terminal device 4701 is described in detail below. The storage medium device 3403 is the same as the storage medium device 3403 of Embodiment 4, and a description thereof is omitted.

6.2 Configuration of Terminal Device 4701

The following describes the configuration of the terminal device 4701 in detail.

Figure 57:
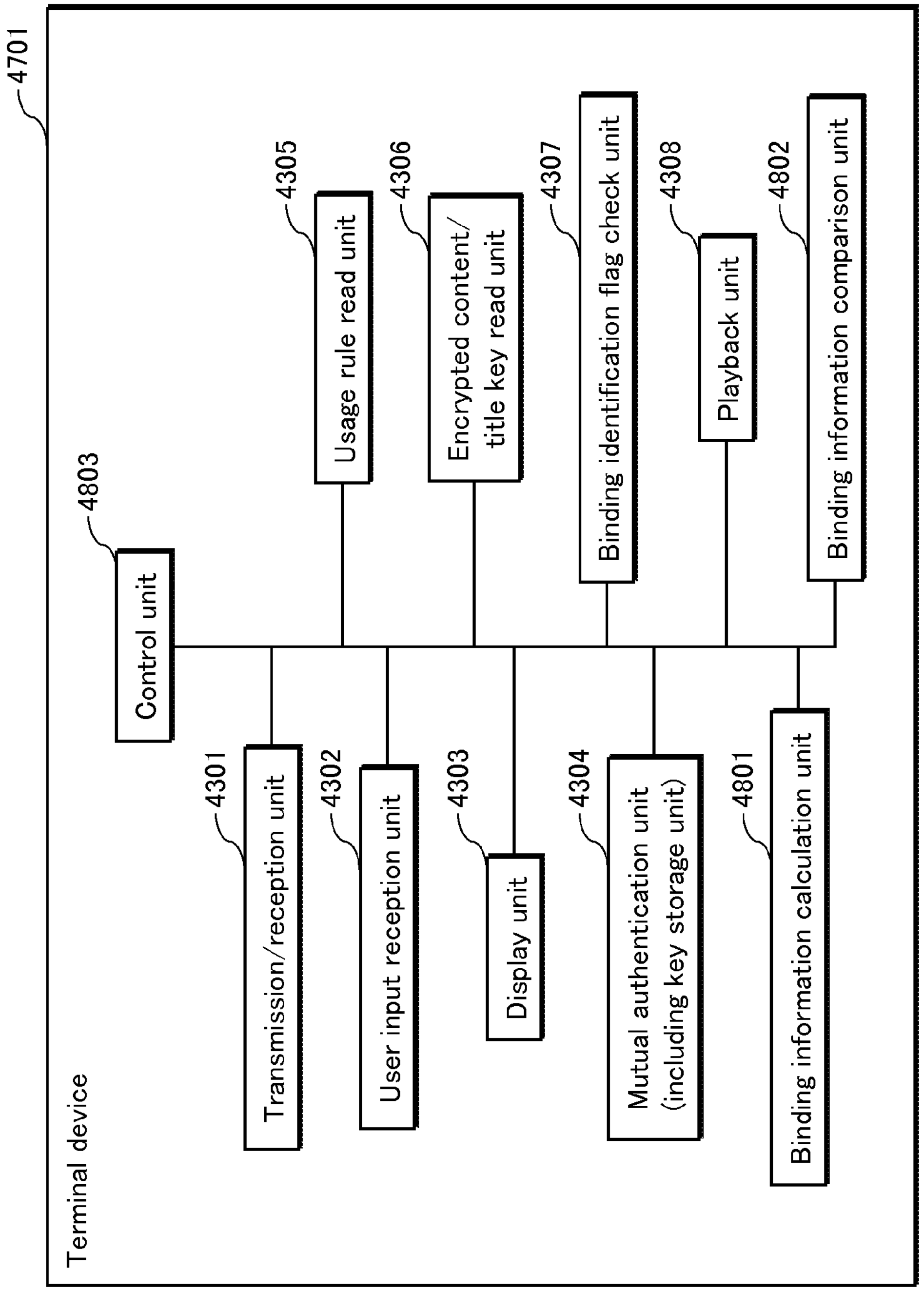
FIG. 57 is a block diagram showing a structure of a terminal device 4701.

The terminal device 4701 includes a transmission/reception unit 4301, a user input reception unit 4302, a display unit 4303, a mutual authentication unit 4304, a usage rule read unit 4305, an encrypted content/title key read unit 4306, a binding identification flag check unit 4307, a playback unit 4308, a binding information calculation unit 4801, a binding information comparison unit 4802 and control unit 4803, as shown in FIG. 57.

The terminal device 4701 is specifically composed of a processor, a RAM, a ROM, a hard disk and the like not shown in the figure. Each of the RAM, the ROM, and the hard disk stores therein a computer program. The terminal device 4701 achieves its functions by the processor operating in accordance with the computer programs.

Note that functional blocks such as the transmission/reception unit 4301, the user input reception unit 4302, the display unit 4303, the mutual authentication unit 4304, the usage rule read unit 4305, the encrypted content/title key read unit 4306, the binding identification flag check unit 4307, the playback unit 4308, the binding information calculation unit 4801, the binding information comparison unit 4802, and the control unit 4803 of the terminal device 4701 are typically implemented as an LSI, which is an integrated circuit. Individual units may respectively be made into discrete chips, or one or more units or part of each unit may be made into one chip.

In addition, the method for assembling integrated circuits is not limited to LSI, and a dedicated circuit or a general-purpose processor may be used. An FPGA, which is programmable after the LSI is manufactured, or a reconfigurable processor, which allows reconfiguration of the connection and setting of circuit cells inside the LSI, may be used.

Furthermore, if technology for forming integrated circuits that replaces LSIs emerges, owing to advances in semiconductor technology or to another derivative technology, the integration of functional blocks may naturally be accomplished using such technology.

Lastly, functional blocks may be implemented by software, but the functional blocks may also be implemented by a combination of an LSI and software. Also, software may be tamper-resistant.

The following describes each unit. However, the transmission/reception unit 4301 through the playback unit 4308 are the same as the transmission/reception unit 4301 through the playback unit 4308 of the terminal device 4102 included in the content distribution system 10*e*, and descriptions thereof are omitted.

(1) Binding Information Calculation Unit 4801

The binding information calculation unit 4801 calculates binding information based on the user ID and the password. Here, the binding information refers to information for binding content with a user. The binding information calculation unit 4801 generates concatenated data by concatenating a user ID and a password corresponding thereto, performs a hash calculation on the concatenated data, and determines part of or all of the calculation result as the binding information, for example.

binding information=Hash part of or all of(user ID||password) (expression 11)

Here, the hash calculation denoted as Hash used in the expression 11 needs to be the same as the hash calculation denoted as Hash used in expression 10, which is described above.

(2) Binding Information Comparison Unit 4802

The binding information comparison unit 4802 compares the binding information calculated by the binding information calculation unit 4801 with the binding information included in the usage rule that is read by the usage rule read unit 4305 and stored in the binding information storage area 3803, so as to judge whether playback is possible. When the two pieces of binding information match, the binding information comparison unit 4802 judges that playback is permitted. When the two pieces of binding information do not match, the binding information comparison unit 4802 judges that playback is not permitted.

(3) Control Unit 4803

The control unit 4803 manages and controls the transmission/reception unit 4301, the user input reception unit 4302, the display unit 4303, the mutual authentication unit 4304, the usage rule read unit 4305, the encrypted content/title key read unit 4306, the binding identification flag check unit 4307, the playback unit 4308, the binding information calculation unit 4801, and the binding information comparison unit 4802 so as to communicate with the storage medium device 3403, display a screen for a user, and receives a user input.

6.3 Operations During Content Playback (when not Inquiring of Server)

Figure 58:
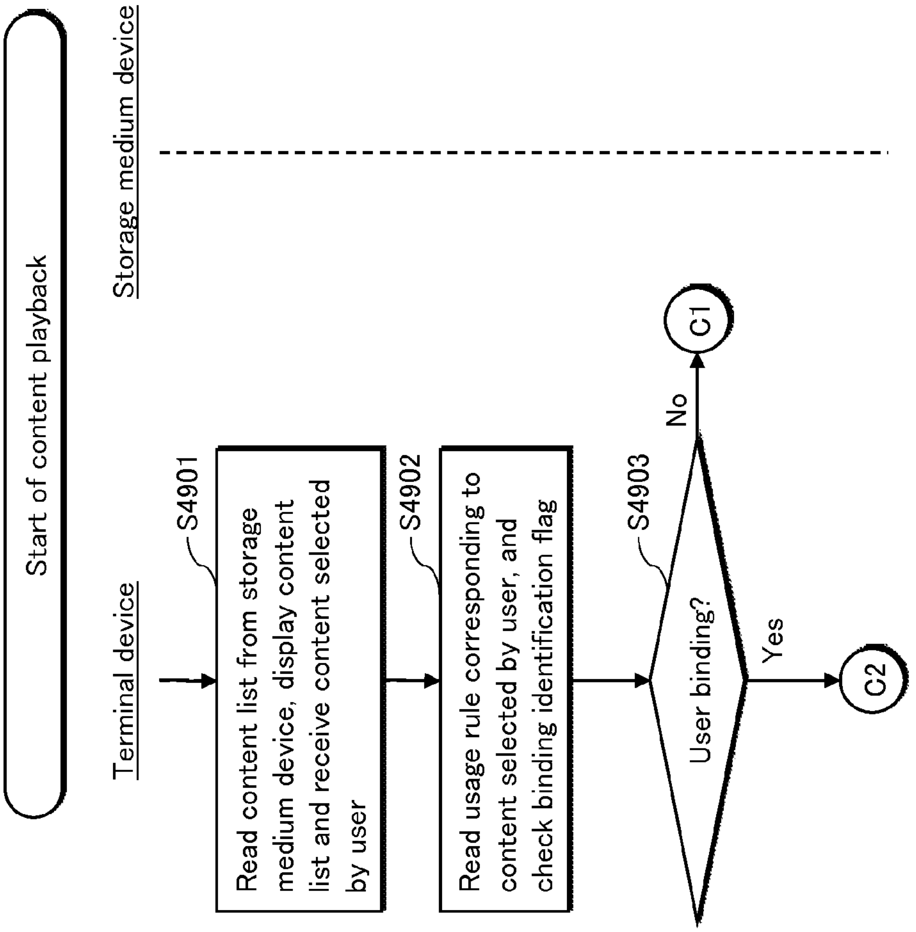
FIG. 58 is a sequence diagram showing operations during content playback, continuing to FIG. 59.
Figure 59:
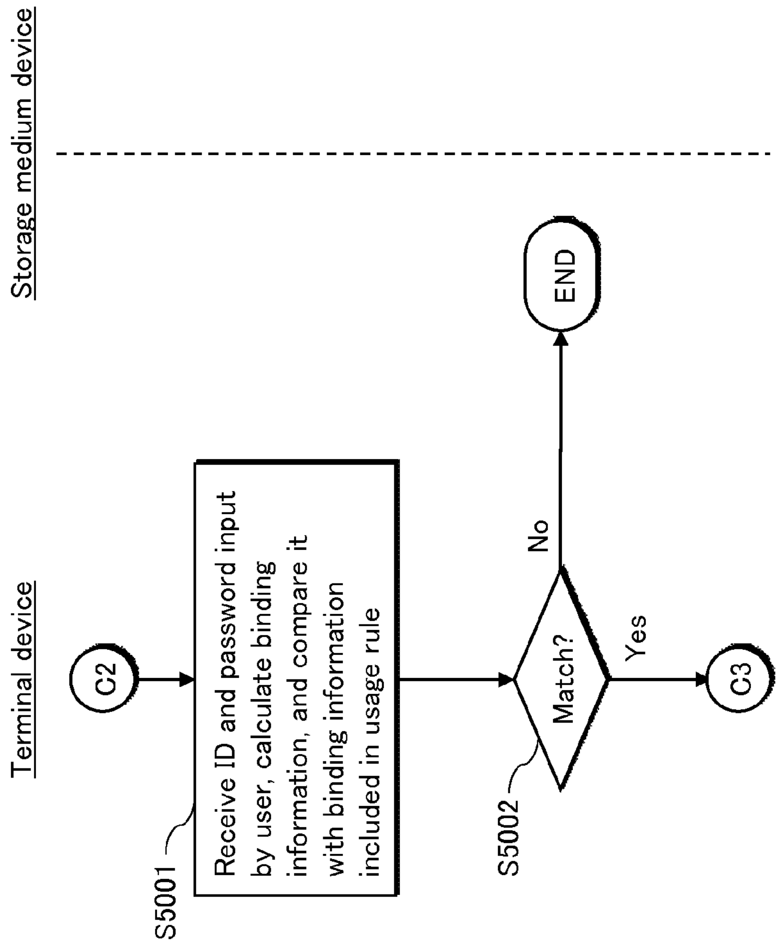
FIG. 59 is a sequence diagram showing operations during content playback, continuing to FIG. 60.
Figure 60:
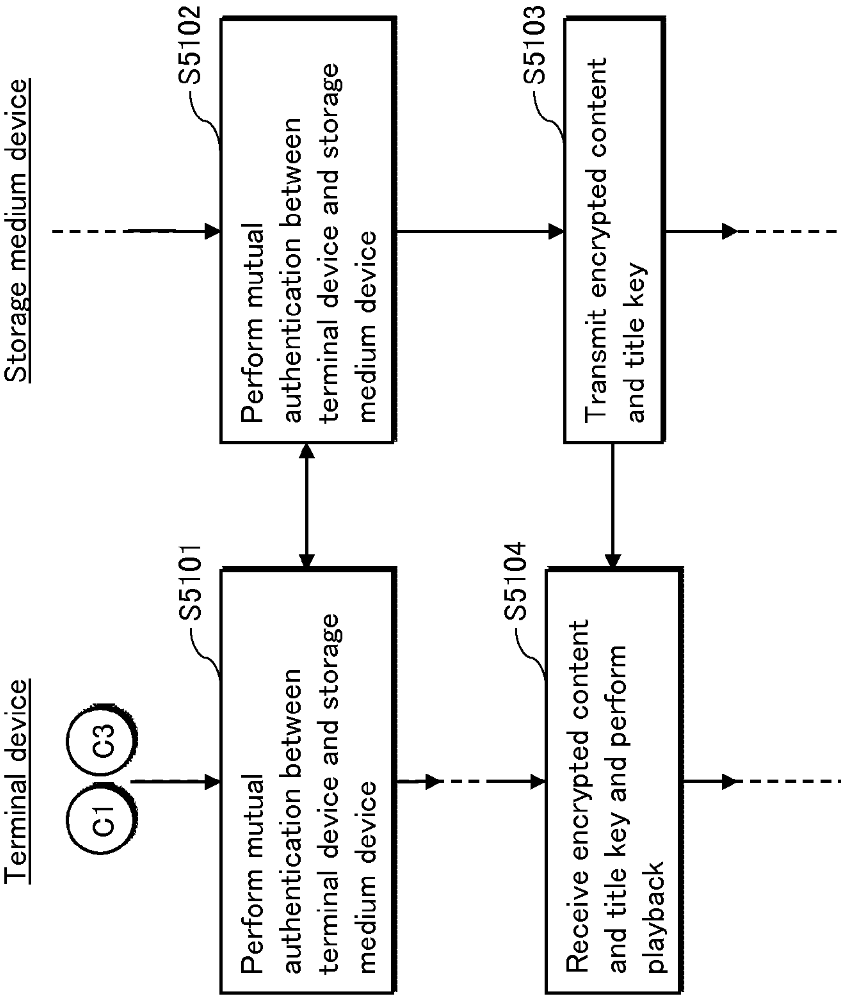
FIG. 60 is a sequence diagram showing operations during content playback.

The following describes operations of the terminal device 4701 and the storage medium device 3403 while playing back content, with reference to FIGS. 58 through 60.

The display unit 4303 of the terminal device 4701 displays a content list read from the storage medium device 3403. The user input reception unit 4302 receives content selected by the user (step S4901). The usage rule read unit 4305 reads a usage rule corresponding to the content selected by the user, and the binding identification flag check unit 4307 checks whether the binding identification flag included in the read usage rule indicates user binding (step S4902).

When the binding identification flag indicates that the content is not bound with the user (No in step S4903), the terminal device 4701 does not calculate the binding information and proceeds to a mutual authentication process with the storage medium device 3403 (step S5101).

In contrast, when the binding identification flag indicates that the content is bound with the user (Yes in step S4903), the user input reception unit 4302 of the terminal device 4701 receives the user ID and the password input by the user. Next, the binding information calculation unit 4801 calculates binding information based on the received user ID and password. Next, the binding information comparison unit 4802 compares the binding information stored in the binding information storage area 3803 of the read usage rule with the calculated binding information (step S5001).

When the binding information stored in the usage rule and the calculated binding information do not match (No in step S5002), the terminal device 4701 does not play back the content and stops processing.

In contrast, when the binding information stored in the usage rule and the calculated binding information match (Yes in step S5002), the mutual authentication unit 4304 of the terminal device 4701 and the mutual authentication unit 3705 of the storage medium device 3403 perform a mutual authentication process and a key sharing process so as to securely transmit and receive various data (step S5101, step S5102).

After establishing a secure communication channel, the storage medium device 3403 outputs the encrypted content and the title key to the terminal device 4701 (step S5103). The terminal device 4701 receives the encrypted content and the title key, and the playback unit 4308 decrypts the encrypted content with the title key and performs a playback process (decodes, etc.) on the content obtained by the decryption (step S5104).

7. Embodiment 7

7.1 Display of Content List by Terminal Device

The following describes a method for displaying a content list, etc., by the terminal devices 500, 3402, 4102 and 4701 of the content distribution systems 10*c*, 10*d*, 10*e* and 10*f*, with reference to FIGS. 61 through 67.

In content lists shown in these figures, one or more content names are arranged and displayed.

Figure 61:
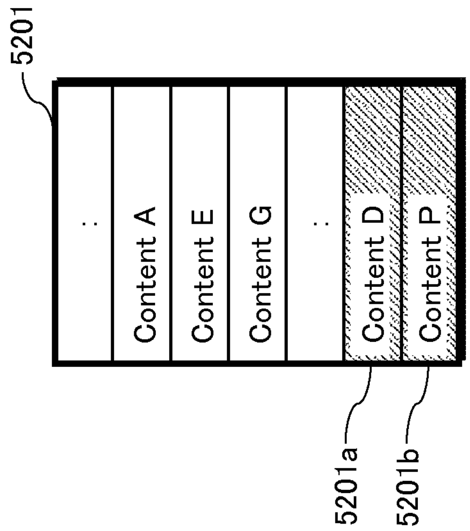
FIG. 61 shows a content list screen 5201 in Embodiment 7 of the present invention.
Figure 62:
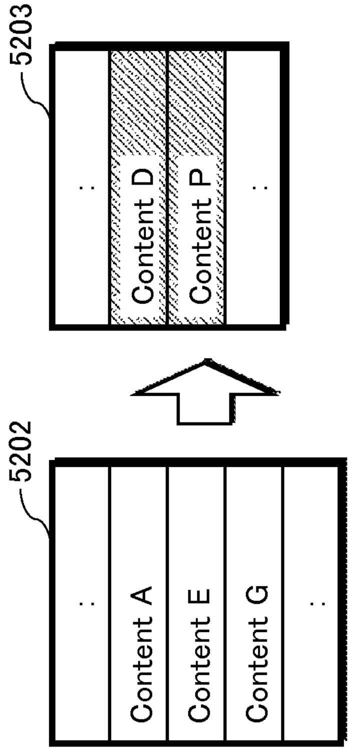
FIG. 62 shows a content list screen 5202 and a content list screen 5203.
Figure 63:
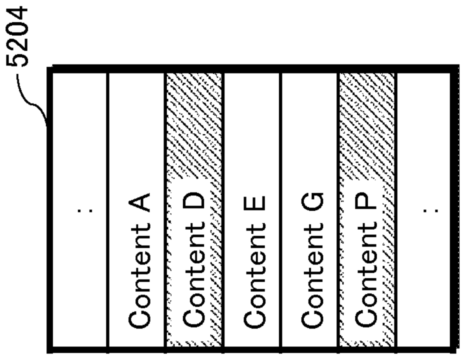
FIG. 63 shows a content list screen 5204.

(1) FIGS. 61 through 63 each show the following example: when one storage medium stores therein content bound only with a storage medium, content bound with a user A, content bound with a user B who is different from the user A, etc., each terminal device distinguishably displays a name of content on which a user using a terminal device has the playback permission and that is permitted to be played back, and a name of content on which the user does not have the playback permission and that is not permitted to be played back.

The content list screen 5201 shown in FIG. 61 displays names of content pieces on which the user does not have the playback permission and that are not permitted to be played back (name 5201*a* "Content D" and name 5201*b* "Content P") at its end. The content list screen 5201 grays out and displays the names of content pieces on which the user does not have the playback permission and that are not permitted to be played back so as to distinguish them from other content names. On the content list screen 5201 shown in FIG. 61, these content names are marked by hatching so as to indicate that they are greyed out. In the content list, the user cannot select content names that are greyed out.

The content list screen 5202 shown in FIG. 62 displays only content pieces on which the user has the playback permission and that are permitted to be played back. Further, another content list screen 5203 displays only content pieces on which the user does not have the playback permission and that are not permitted to be played back. Thus, in the case shown in FIG. 62, the names of content pieces that are not permitted to be played back are collected and displayed on the other screen. In this case as well, the content list screen 5202 grays out and displays the names of content pieces on which the user does not have the playback permission and that are not permitted to be played back so as to distinguish them from other content names.

The content list screen 5204 shown in FIG. 63 concurrently displays names of content pieces on which the user has the playback permission and that are permitted to be played back and names of content pieces on which the user does not have the playback permission and that are not permitted to be played back. In this case, the content list screen 5204 displays the names of content pieces in alphabetical order. The content list screen 5204 may display the names of content pieces in order of purchase or in order of reception. In this case as well, the content list screen 5204 grays out and displays the names of content pieces on which the user does not have the playback permission and that are not permitted to be played back so as to distinguish them from other content names.

Figure 64:
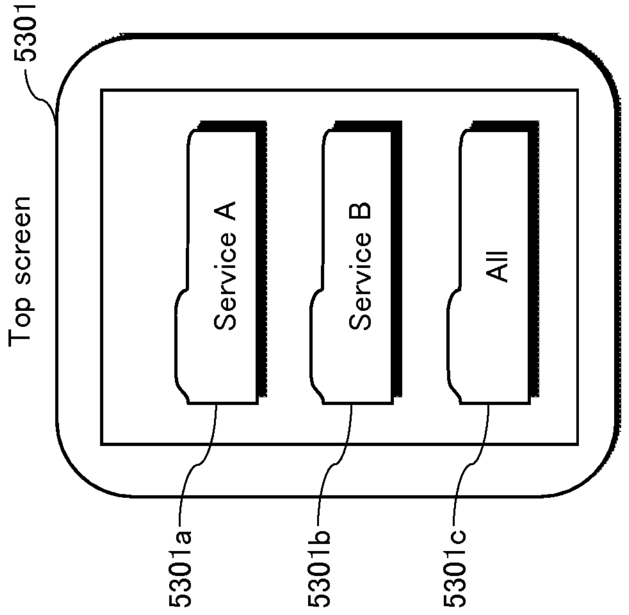
FIG. 64 shows a top screen 5301.

(2) FIG. 64 shows an example of a top screen displayed by a playback application (playback software) that plays back content. Here, the top screen is a screen for a content list that is displayed first after the playback application is activated. The playback software displays a top screen 5301 shown in FIG. 64.

In this example, the storage medium stores content obtained from a service A and content obtained from a service B in folders. A folder of the service A includes the content obtained from the service A. A folder of the service B includes the content obtained from the service B. Further, a folder labeled "All" includes all content regardless of the services.

The top screen 5301 shown in FIG. 64 includes an object 5301*a* representing the folder of the service A, an object 5301*b* representing the folder of the service B, and an object 5301*c* representing the folder of "All".

The user selects a folder by selecting one of the objects representing the folders displayed on the top screen 5301.

Figure 65:
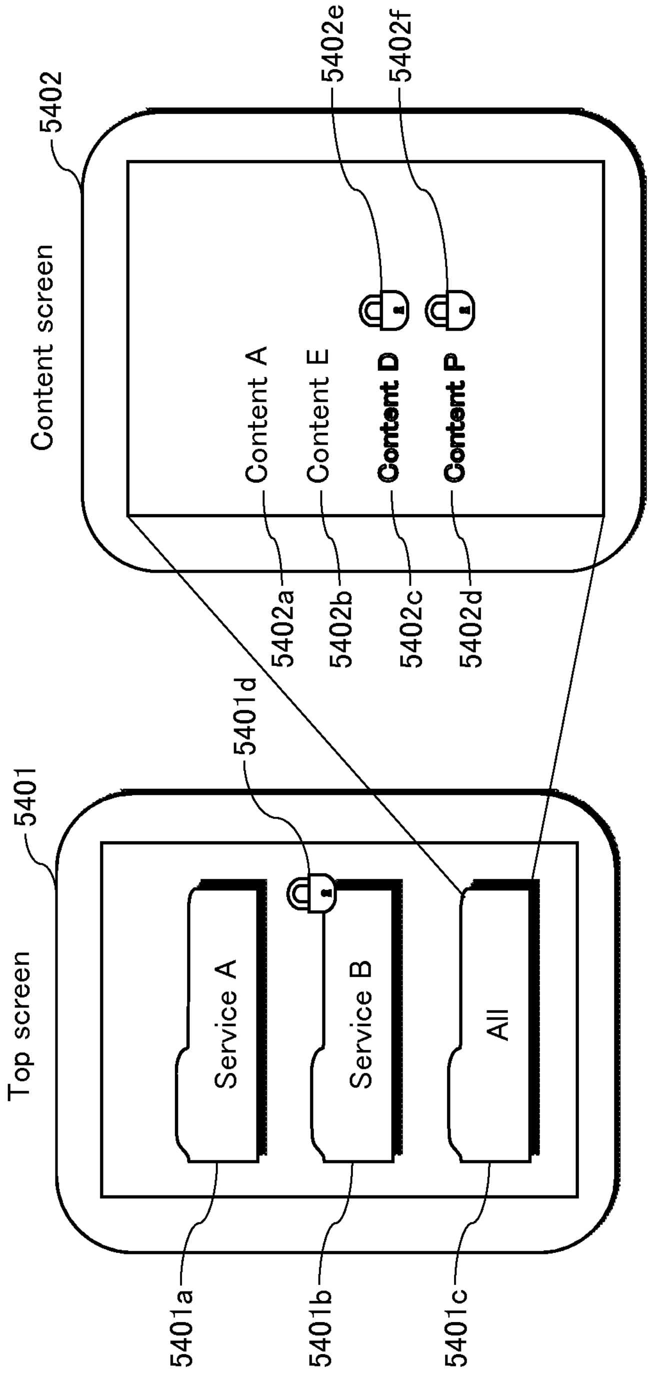
FIG. 65 shows a top screen 5401 and a content screen 5402.

(3) FIG. 65 shows another example of a screen displayed by a playback application (playback software) that plays back content. The playback software displays a top screen 5401 and a content screen 5402 shown in FIG. 65.

In this example, in a similar manner to FIG. 64, the storage medium stores the content obtained from the service A and the content obtained from the service B in folders. A folder of the service A includes the content obtained from the service A. A folder of the service B includes the content obtained from the service B. Further, a folder named "All" includes all content regardless of the services.

Furthermore, in the example shown in FIG. 65, the user is logged in a system of the service A with a user ID and a password of the user. The user can play back content that is provided by the service A and bound with the user. However, the user cannot play back content provided by the service B.

The top screen 5401 shown in FIG. 65 includes an object 5401*a* representing the folder of the service A, an object 5401*b* representing the folder of the service B, and an object 5401*c* representing the folder of "All". Further, a key mark 5401*d* is attached to the object 5401*b*. The key mark 5401*d* indicates that the user is not permitted to open this folder.

Since a key mark is not attached to the object 5401*c*, the user can select the object 5401*c*. When the user selects the object 5401*c*, the folder labeled "All" is opened. At this point, the playback software displays a content screen 5402 shown in FIG. 65.

The content screen 5402 includes content names 5402*a*, 5402*b*, 5402*c* and 5402*d*. To the names 5402*c* and 5402*d*, key marks 5402*e* and 5402*f* are respectively attached. Note that instead of attaching a key mark, it may be possible to gray out a content name.

The user can select the content names 5402*a* and 5402*b* to which a key mark is not attached. Therefore, the user is permitted to play back these content pieces. In contrast, to the names 5402*c* and 5402*d*, key marks 5402*e* and 5402*f* are respectively attached. Therefore, the user is not permitted to play back these content pieces.

Figure 66:
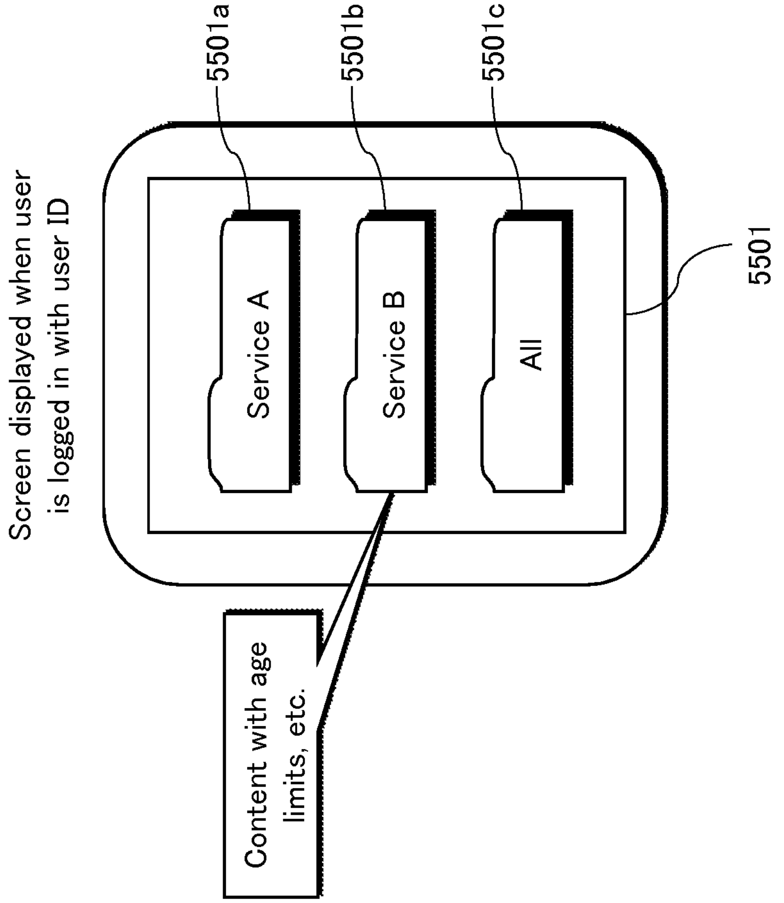
FIG. 66 shows a display screen 5501 displayed while a user is logged in with a user ID.
Figure 67:
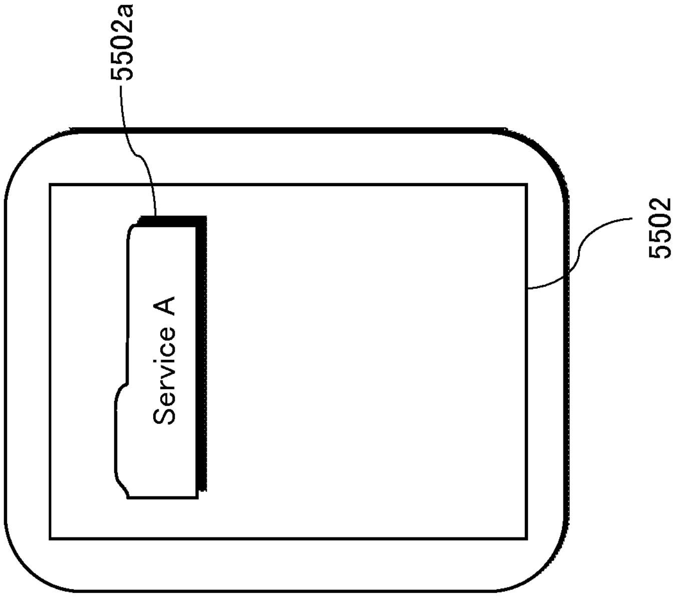
FIG. 67 shows a display screen 5502 displayed while a user is not logged in with a user ID.

(4) FIG. 66 shows a screen 5501 that is displayed when the user is logged in the terminal device or the playback application (playback software) with a user ID and a password of the user. FIG. 67 shows a screen 5502 that is displayed when the user is not logged in.

In this example, it is presumed that content belonging to the service B is bound with a specific user. Further, it is presumed that content belonging to the service A is bound with a storage medium.

The top screen 5501 includes an object 5501*a* representing the folder of the service A, an object 5501*b* representing the folder of the service B, and an object 5551*c* representing the folder of "All".

The screen 5502 includes an object 5502*a* representing the folder of the service A.

While the user is logged in, the screen 5501 is displayed. The user can select the object 5501*a*, the object 5501*b* and the object 5551*c*.

In contrast, while the user is not logged in, the screen 5502 is displayed. The user can select only the object 5502*a*.

For example, when age limits to view the content belonging to the service B are applied to a user, it is effective to hide the folder of the service B according to a login state of the user.

8. Other Modifications

While the present invention has been described based on the above embodiments, the present invention is of course not limited to these embodiments. The present invention also includes cases such as the following.

(1) In the above embodiments, the storage medium device is assumed to be a memory card such as an SD card. However, the recording medium device is not necessarily a memory card such as an SD card. The storage medium device has only to include a storage medium for storing therein data and a control unit for controlling input/output of the data stored in the storage medium.

For example, a device that has a structure in which a control LSI is incorporated into a storage device such as an HDD may be used. Here, the storage device stores data, and the control LSI controls input/output of the data stored in the storage device. Instead of a removable memory card, a device that has a structure in which the control LSI is incorporated into a memory device housed in a mobile phone, an e-Book, and a NetBook may be used.

(2) The content distribution system 10*c* in Embodiment 3 protects data between the terminal device 500 and the key distribution device 400, between the terminal device 500 and the storage medium device 600, or between the key distribution device 400 and the storage medium device 600 with the use of the common key shared in mutual authentication. However, the present invention is not limited to this. In the data transmission, the security of data should be secured. For example, a technology such as HTTPS may be used.

(3) In the content distribution system 10*c* in Embodiment 3, the key distribution device 400 transmits communication data such as the processed title key, etc., to the storage medium device 600 via the terminal device 500 as a dumb pipe. However, the method for transmitting data from the key distribution device 400 to the storage medium device 600 is not limited to this. The security of data communicated from the key distribution device 400 to the storage medium device 600 should be secured.

For example, the key distribution device 400 may transmit communication data to the storage medium device 600 via another terminal device different from the terminal device 500 as a dumb pipe. Here, the other terminal device different from the terminal device 500 relays transmission/reception of the communication data. The terminal device 500 plays back content stored in the storage medium device 600.

At this point, the key distribution device 400 and the other terminal device perform a mutual authentication process and a key sharing process therebetween, and share a common key. The key distribution device 400 encrypts communication data with the common key, and transmits the encrypted data. The other terminal device decrypts the communication data that has been encrypted with the common key, and obtains the original communication data.

(4) In the content distribution system 10*c* in Embodiment 3, a calculated title key is generated by performing a hash calculation on the UR and performing a conversion that is reversible such as an XOR on the obtained hash value and the title key.

calculated title key=title key XOR Hash(UR)(expression 12)

The expression 12 is the same as the expression 4.

However, the method for generating the calculated title key is not limited to this. It suffices if the original title key can be obtained.

(a) For example, it may be possible to generate a calculated title key by performing a conversion that is reversible such as an XOR on a title key, a hash value of a UR, and a storage medium device ID for identifying the storage medium device 600.

calculated title key=title key XOR Hash(UR)XOR storage medium device ID (expression 13)

In this case, the terminal device 500 restores the title key by performing a conversion that is reversible such as an XOR on the calculated title key, the hash value of the UR, and the storage medium device ID.

title key=calculated title key XOR Hash(UR)XOR storage medium device ID (expression 14)

Here, the hash calculation denoted as Hash used in the expression 13 needs to be the same as the hash calculation denoted as Hash used in the expression 14.

(b) For example, it may be possible to generate a calculated title key by performing a conversion that is reversible such as an XOR on a title key, a hash value of a UR, and a hash value of a storage medium device ID.

calculated title key=title key XOR Hash(UR)XOR Hash (storage medium device ID)(expression 15)

In this case, the terminal device 500 restores the title key by performing a conversion that is reversible such as an XOR on the calculated title key, the hash value of the UR, and the hash value of the storage medium device ID.

title key=calculated title key XOR Hash(UR)XOR Hash (storage medium device ID)(expression 16)

Here, the hash calculation denoted as Hash used in the expression 15 needs to be the same as the hash calculation denoted as Hash used in the expression 16.

(c) For example, a calculated title key is generated by performing a hash calculation on a UR and performing a conversion that is reversible such as an XOR on the obtained hash value and a title key.

calculated title key=title key XOR Hash(UR)(expression 17)

The expression 17 is the same as the expression 4.

The above structure is the same as that of the content distribution system 10*c*.

The key issuing device 200 generates signature data by providing the digital signature to the storage medium device ID with the key issuing device private key. The terminal device 500 verifies the signature data with a key issuing device public key. A title key may be restored from the calculated title key when verification is successful.

Further, the key distribution device 400 may generate signature data by providing the digital signature to the storage medium device ID like the key issuing device 200.

(5) In the content distribution system 10*c* in Embodiment 3, as shown in FIGS. 37 and 40, the terminal device 500 designates, in the login state area 1736 included in the viewing permission confirmation request data 17301 and 17302, the terminal device 500 designates a period for which and conditions under which a user has the viewing permission such as "No automatic logout" and "Logged in for two weeks". However, the terminal device 500 is not limited to designate a period for which and conditions under which a user has the viewing permission. The terminal device 500 has only to limit a period for which and conditions under which a user has the viewing permission.

For example, instead of the terminal device 500, the permission management device 700 may designate a period and conditions. In this case, the login state area 1736 of the viewing permission confirmation request data 17301 is unnecessary. A login state area 1746 may be added to the viewing permission confirmation response data 17401 shown in FIG. 38. The login state area 1746 stores therein a period for which and conditions under which a user has the viewing permission, like the login state area 1736. The terminal device 500 meets the period and conditions stored in the login state area 1746 included in the viewing permission confirmation response data 17401.

(6) In the content distribution system 10*e* in Embodiment 5, the terminal device 4102 inquires of the server device 4101 whether playback is possible. The server device 4101 judges whether playback is possible based on the binding information, and transmits the judgment result (indicating whether playback is possible or impossible) to the terminal device 4102. However, a method for judging whether playback is possible is not limited to this. It suffices if whether playback is possible is correctly judged.

For example, the server device 4101 calculates the binding information based on the user ID and the password received from the user, and transmits the calculated binding information to the terminal device 4102. The terminal device 4102 compares the received binding information with the binding information stored in the usage rule. The terminal device 4102 may judge that playback is possible when these two pieces of information match, and may judge that playback is impossible when these two pieces of information do not match.

(7) In the embodiments, the binding information is generated from the user ID and the password. However, the generation of the binding information is not limited to this. The binding information only has to be unique to the user.

For example, the generation unit of the server device that generates the binding information may generate the binding information based on a user ID that is unique information unique to a user. To be specific, the generation unit may generate the binding information including the user ID. Further, the generation unit may generate the binding information by using the user ID. To be specific, the generation unit may perform a hash calculation denoted as Hash, which is a one-way operation, on the user ID to generate a hash value, and determine the generated hash value as the binding information. The server device associates the user ID with the binding information, and stores therein the user ID and the binding information. The playback device acquires the binding information associated with the user ID from the server device.

For example, the generation unit of the server device that generate the binding information may generate the binding information based on data generated by the server device (e.g., random number data, serial number for management, and a combination thereof) as well as based on the user ID and the password, and may add the generated binding information to the usage rule.

The generation unit may generate the binding information including the user ID.

The generation unit may perform a hash calculation, which is a one-way operation, on the user ID to generate a hash value, and generate the binding information including the generated hash value.

In addition to the user ID and the password, the server device acquires a content ID, a manufacturer ID for identifying a manufacturer that manufactures a terminal device, a distributor ID for identifying a distributor that operates the server device, a content provider ID for identifying a content provider, and a storage medium ID for uniquely identifying a storage medium. The generation unit of the server device may generate the binding information with the use of the user ID and the password, and one of, all of, or a combination of these IDs.

The generation unit of the server device may generate the binding information with the use of biometric information for uniquely identifying a user, instead of the user ID and the password. The generation unit may generate the binding information with the use of biometric information for uniquely identifying a user, along with the user ID and the password.

When there are a plurality of server devices and services whose playback permission is managed, such as a service A that provides music content and a service B that provides movie content, the generation unit of the server device may cause service identifiers that uniquely identifies the services and the server devices to be involved with generation of the binding information.

(Method for Generating Binding Information)

The following describes a specific method for generating the binding information, which is employed by the generation unit of the server device.

(a) The generation unit generates the binding information by generating concatenated data by concatenating the user ID, the password and the random number data in this order, and by performing a hash calculation denoted as Hash on the generated concatenated data.

binding information=Hash(user ID||password||random number data) (expression 18)

The hash calculation denoted as Hash used in the expression 18 may be the same as or different from the hash calculation denoted as Hash used in each embodiment and modification.

Instead of the random number data, the generation unit may use one of the serial number, the content ID, the manufacturer ID, the distributor ID, the content provider ID, the storage medium ID, and the service identifier.

(b) The generation unit generates the binding information by generating concatenated data by concatenating the user ID and the password in this order, performing a hash calculation denoted as Hash on the generated concatenated data to calculate a hash value, and concatenating the hash value and the random number data.

binding information=Hash(user ID||password)||random number data (expression 19)

The hash calculation denoted as Hash used in the expression 19 may be the same as or different from the hash calculation denoted as Hash used in each embodiment and modification.

Instead of the random number data, the generation unit may use one of the serial number, the content ID, the manufacturer ID, the distributor ID, the content provider ID, the storage medium ID, and the service identifier.

(c) The generation unit generates the binding information by generating concatenated data by concatenating the user ID, the password, the random number data and the serial number in this order, and by performing a hash calculation denoted as Hash on the generated concatenated data.

binding information=Hash(user ID||password||random number data||serial number)(expression 20)

The hash calculation denoted as Hash used in the expression 20 may be the same as or different from the hash calculation denoted as Hash used in each embodiment and modification.

Instead of the random number data and the serial number, the generation unit may use two of, or three or more of the content ID, the manufacturer ID, the distributor ID, the content provider ID, the storage medium ID and the service identifier.

(d) In the above items (a) through (c), the generation unit may change the concatenating order of the user ID, the password, the random number data, the serial number, the content ID, the manufacturer ID, the distributor ID, the content provider ID, the storage medium ID, the service identifier, and the like.

(Method for Judging Whether Playback is Possible)

When the terminal device inquires of the server device whether playback is possible while playing back content, the server device calculates the binding information based on the user ID, the password and data generated by the server device or data acquired by the server device, as described above. The judgment unit 4202 may judge whether playback is possible by comparing the database managed by the content playback permission management unit 4203 with the calculated binding information, and transmit the judgment result.

Further, the server device may transmit data used when generating the binding information (i.e., the data generated by the server device or the data acquired by the server device) to the terminal device. The terminal device calculates the binding information and compares the generated binding information with the binding information stored in the usage rule, so as to judge whether playback is possible. The terminal device may also receive the binding information per se from the server device, and compares the received binding information with the binding information stored in the usage rule, so as to judge whether playback is possible.

When the terminal device may not inquire of the server device whether playback is possible while playing back content, the terminal device may store therein the data generated by the server device or the data acquired by the server device, or may store the data in the storage medium, and reads the stored data to calculate the binding information while playing back content. The terminal device may store therein the binding information per se. The terminal device judges whether playback is possible with the use of the calculated binding information or the stored binding information.

(8) In the embodiments, the binding information is generated from the user ID and the password. However, a method for generating the binding information is not limited to this. It suffices if the binding information corresponding to the user ID and the password, or bound with the user ID can be acquired.

The server device randomly generates the binding information, independently of the user ID and the password that are acquired from the user, for example. Next, the server device stores the generated binding information in the usage rule. The server device associates the generated binding information with the user ID and the content ID, and stores therein the binding information, the user ID and the content ID.

While playing back content, the terminal device transmits the user ID and the password to the server device to request the binding information. The server device reads the binding information corresponding to the user ID and the password received from the terminal device (or corresponding to the user ID), and transmits the read binding information to the terminal device.

(9) Embodiment 7 provides an example of graying out the names of content pieces that cannot be played back and displaying them to the user. However, a method for displaying content pieces to the user is not limited to this. It suffices if the user can recognize content pieces that cannot be played back.

For example, when the user attempts to play back a content piece that cannot be played back, the terminal device may display a message such as “this content piece cannot be played back”, “please log in with another user ID” and “please connect online (connect to server)” and does not accept an instruction to play back the content piece from the user.

When the user attempts to delete a content piece that cannot be played back, the terminal device may display a similar message and may not accept an instruction to delete the content piece from the user.

It is presumed that the storage medium internal to the terminal device stores therein a content piece bound with a certain user A and a service B. When the user A withdraws from the service B, the user A loses the playback permission on the content piece. In this case, before the user A withdraws from the service B, the terminal device may display information that the user A will not be able to play back the content piece.

When the terminal device is to delete a content piece on which the user does not have the playback permission anymore, the terminal device may not delete the content piece per se, and may make the content piece invisible from the user on the screen. The terminal device may store therein only a content list, and when the user A rejoins the service B, the stored content piece may be restored. Alternatively, the terminal device may automatically acquire the corresponding content piece from the stored content list.

(10) The terminal device may convert a content piece bound with the user to a content piece bound with the storage medium (content piece that any user can play back) by the user accessing the server device with the use of the terminal device.

To be specific, the server device acquires unique information that is unique to the storage medium from the storage medium via the terminal device. Next, the server device encrypts the title key with the use of the acquired unique information to generate the encrypted title key, and outputs the encrypted title key to the storage medium via the terminal device. The storage medium stores therein the encrypted title key instead of the calculated title key.

The terminal device reads the unique information and the encrypted title key from the storage medium. Next, the terminal device decrypts the encrypted title key with the use of the unique information to generate the title key. Next, the terminal device decrypts the content piece with the use of the generated title key.

Further, when the terminal device is to delete the content piece bound with the user, the terminal device may access the server device, securely delete the content piece under control of the server device, and return the playback permission. For example, the server device may delete the calculated title key stored in the storage medium and may overwrite the calculated title key stored in the storage medium with another information via the terminal device, so as to make the calculated title key unusable.

Further, the server device may rewrite the usage rule stored in the storage medium via the terminal device so as to make the content piece unusable.

(11) In the embodiments, the server device or the terminal device refers to the usage rule, the binding information, the domain information, etc., to judge whether content can be played back. However, the method for judging whether content can be played back is not limited to this. The storage medium device may judge whether content can be played back.

The server device or the terminal device transmits the binding information to the storage medium device. The storage medium device checks whether the received binding information matches the binding information stored in the usage rule of content that the terminal device has designated to read. When the two pieces of the binding information do not match, the storage medium device does not allow the terminal device to read the title key, etc. When the two pieces of the binding information match, the storage medium device outputs the title key, etc. to the terminal device.

The server device or the terminal device may transmit the user ID and the password to the storage medium device. The storage medium device receives the user ID and the password, and generates the binding information with the use of the received user ID and password. Next, the storage medium device checks whether the two pieces of the binding information match.

(12) Instead of using the binding information generated from the user ID and the password, a predetermined fixed value may be used as the binding information. As a result of this, all of the users are allowed to have the playback permission on the content.

(13) One aspect of the present invention is a key distribution device in a distribution system, the distribution system comprising: the key distribution device that calculates a calculated title key from at least a title key used for decrypting a content piece and playback related information including at least a rule to output the content piece during playback, and stores the calculated title key and the playback related information to the storage medium device via a terminal device; the terminal device that receives the content piece that is encrypted, the calculated title key and the playback related information, and stores the content piece, the calculated title key and the playback related information to the storage medium device; and a permission management device that manages viewing permission on the content piece for each user account. A user related flag stored in the playback related information indicates whether the content piece can be played back when the content piece is bound with the user account. When a content piece is required to be bound with the user account, the key distribution device sets the user related flag of the related information ON, or when a content piece is not required to be bound with the user account, the key distribution device sets the user related flag OFF, and the key distribution device calculates the calculated title key from the title key and the playback related information, and causes the storage medium device to store therein the calculated title key and the playback related information via the terminal device.

The key distribution device may add a permission management device number to the playback related information to designate a specific permission management device when the permission management device is provided in a plurality, calculate the calculated title key from the title key and the playback related information, and store the calculated title key and the playback related information in the storage medium device via the terminal device.

The key distribution device may add a content number assigned to each content piece to the playback related information so as to designate the content piece, calculate the calculated title key from the title key and the playback related information, and store the calculated title key and the playback related information to the storage medium device via the terminal device.

The key distribution device may add a content private number assigned to each content piece to the playback related information, calculate the calculated title key from the title key and the playback related information, and store the calculated title key and the playback related information to the storage medium device via the terminal device.

Another aspect of the present invention is a terminal device in a distribution system, the distribution system comprising: a key distribution device that calculates a calculated title key from at least a title key used for decrypting a content piece and playback related information including at least a rule to output the content piece during playback, and stores the calculated title key and the playback related information in a storage medium device via the terminal device; the terminal device that receives the content piece that is encrypted, the calculated title key and the playback related information, and stores the content piece, the calculated title key and the playback related information to the storage medium device; and a permission management device that manages viewing permission on the content piece for each user account. A user related flag stored in the playback related information indicates whether the content piece can be played back when the content piece is bound with the user account. When the user related flag stored in the playback related information relating to a content piece stored in the storage medium device is ON, the terminal device may inquire of the permission management device whether a user account has the viewing permission on the content piece that is to be played back, and the terminal device may play back the content piece when the user account has the viewing permission, and may not play back the content piece when the user account does not have the viewing permission.

The terminal device may play back a content piece stored in the storage medium device when the user related flag stored in the playback related information relating to the content piece is OFF.

The terminal device may check whether the user account has the viewing permission on the content piece that is to be played back, and when the user account has the viewing permission, the terminal device may play back the content piece by overwriting an area of the content private number of the playback related information relating to the content piece with the content private number received from the permission management device, calculating the original title key with the calculated title key, and decrypting the content piece with the calculated title key.

Yet another aspect of the present invention is a content distribution system comprising a server device that distributes a content piece, a terminal device that uses the content piece, and a storage medium. The server device includes: a storage unit that stores therein an encrypted content piece, a title key for decrypting the encrypted content piece, and a usage rule of the encrypted content piece; a reception unit that receives user information of a user that uses the terminal device from the terminal device, and a content identifier of a content piece that the user wants; an update unit that updates a usage rule identified by the received content identifier based on the received user information; and a transmission unit that transmits an encrypted content piece corresponding to the content identifier and the updated usage rule. The terminal device includes: a transmission unit that transmits the user information and the content identifier of the content piece that the user wants to the server device; a reception unit that receives the encrypted content piece, the title key, and the usage rule from the server device; and a storage unit that stores the received encrypted content piece, title key and usage rule to the storage medium.

The server device may include a mutual authentication unit that performs an authentication process with the storage medium to generate a common key, and the storage medium may include a mutual authentication unit that performs an authentication process with the server device to generate a common key.

The storage medium may include: a holding unit that holds a medium identifier uniquely identifying the storage medium; and a transmission unit that transmits the medium identifier, the server device may include a bind unit that binds the user information and the medium identifier with the title key, and the reception unit of the server device may further receive the medium identifier from the storage medium.

The storage medium may be a portable medium.

The storage medium may be an internal memory internal to the terminal device.

Yet another aspect of the present invention is a server device that distributes a content piece. The server device includes: a storage unit that stores therein an encrypted content piece, a title key for decrypting the encrypted content piece, and a usage rule of the encrypted content piece; a reception unit that receives user information of a user that uses a terminal device from the terminal device, and a content identifier of a content piece that the user wants; an update unit that updates a usage rule identified by the received content identifier based on the received user information; and a transmission unit that transmits an encrypted content piece corresponding to the content identifier and the updated usage rule.

The reception unit of the server device may include a bind unit that receives the medium identifier from the storage medium, and bind the user information and the medium identifier with the title key.

Yet another aspect of the present invention is a content distribution method comprising: a distribution method for distributing a content piece, a usage method for using the content piece, and a storage medium. The content distribution method includes: a storing step of storing an encrypted content piece, a title key for decrypting the encrypted content piece, and a usage rule of the encrypted content piece; a receiving step of receiving user information of a user using a terminal device, and a content identifier of a content piece that the user wants; an updating step of updating a usage rule identified by the received content identifier based on the received user information; and a transmitting step of transmitting an encrypted content piece corresponding to the content identifier and the updated usage rule. The usage method includes: a transmitting step of transmitting the user information and the content identifier of the content piece that the user wants; a receiving step of receiving the encrypted content piece, the title key and the usage rule; and a storing step of storing the received encrypted content piece, title key and usage rule to the storage medium.

Yet another aspect of the present invention is a content distribution method. The distribution method includes: a storing step of storing an encrypted content piece, a title key for decrypting the encrypted content piece, and a usage rule of the encrypted content piece; a receiving step of receiving user information of a user using a terminal device, and a content identifier of a content piece that the user wants; an updating step of updating a usage rule identified by the received content identifier based on the received user information; and a transmitting step of transmitting an encrypted content piece corresponding to the content identifier and the updated usage rule.

Yet another aspect of the present invention is a content distribution program. The distribution program causes a computer to execute: a storing step of storing an encrypted content piece, a title key for decrypting the encrypted content piece, and a usage rule of the encrypted content piece; a receiving step of receiving user information of a user using a terminal device, and a content identifier of a content piece that the user wants; an updating step of updating a usage rule identified by the received content identifier based on the received user information; and a transmitting step of transmitting an encrypted content piece corresponding to the content identifier and the updated usage rule.

Yet another aspect of the present invention is a storage medium that stores therein a content distribution program. The distribution program causes a computer to execute: a storing step of storing an encrypted content piece, a title key for decrypting the encrypted content piece, and a usage rule of the encrypted content piece; a receiving step of receiving user information of a user using a terminal device, and a content identifier of a content piece that the user wants; an updating step of updating a usage rule identified by the received content identifier based on the received user information; and a transmitting step of transmitting an encrypted content piece corresponding to the content identifier and the updated usage rule.

Yet another aspect of the present invention is a content usage system comprising a server device that provides information indicating whether a content piece can be used, a terminal device that uses the content piece, and a storage medium. The server device includes: a management unit that manages user information of a user that uses the terminal device and a content identifier that uniquely identifies a content piece; and a judgment unit that judges whether the content piece can be used based on the user information and the content identifier that have been received from the terminal device. The terminal device includes: an acceptance unit that accepts a content piece selected by the user; a read unit that reads a usage rule corresponding to the accepted content piece from the storage medium; a check unit that checks whether the content piece is bound with the user based on the read usage rule; a transmission unit that, when the check unit determines that the content piece is bound with the user, transmits the user information and the content identifier to the server device; a reception unit that receives information indicating whether the content piece can be used from the server device; and a usage unit that, when the received information indicates that the content piece can be used, uses the content piece.

Yet another aspect of the present invention is a server device that provides information indicating a content piece can be used. The server device includes: a management unit that manages user information of a user that uses a terminal device and a content identifier that uniquely identifies the content piece; and a judgment unit that judges whether the content piece can be used based on the user information and the content identifier that have been received from the terminal device.

Yet another aspect of the present invention is a terminal device that uses a content piece. The terminal device includes: an acceptance unit that accepts a content piece selected by a user; a read unit that reads a usage rule corresponding to the accepted content piece from a storage medium; a check unit that checks whether the content piece is bound with the user based on the read usage rule; a transmission unit that, when the check unit determines that the content piece is bound with the user, transmits the user information and the content identifier to a server device; a reception unit that receives information indicating whether the content piece can be used from the server device; and a usage unit that, when the received information indicates that the content piece can be used, uses the content piece.

The terminal device may include a display unit that displays a content list of content pieces stored in the storage medium, and the display unit may distinguishably display content pieces bound with users and content pieces not bound with users.

The terminal device may include the acceptance unit that accepts a content piece that the user wants from the user, and the display unit may display a message that prompts connection to the server device when the acceptance unit accepts a content piece bound with the user.

Yet another aspect of the present invention is a content usage method comprising: a provision method for providing information indicating whether a content piece can be used, a usage method for using the content piece, and a storage medium. The provision method includes: a managing step of managing user information of a user that uses a terminal device and a content identifier that uniquely identifies the content piece; and a judging step of judging whether the content piece can be used based on the user information and the content identifier that have been received from the terminal device. The usage method includes: an accepting step of accepting a content piece selected by the user; a reading step of reading a usage rule corresponding to the accepted content piece from the storage medium; a checking step of checking whether the content piece is bound with the user based on the read usage rule; a transmitting step of, when the check unit determines that the content piece is bound with the user, transmitting the user information and the content identifier to a server device; a receiving step of receiving information indicating whether the content piece can be used from the server device; and a using step of, when the received information indicates that the content piece can be used, using the content piece.

Yet another aspect of the present invention is a provision method for providing information indicating a content piece can be used. The provision method includes: a managing step of managing user information of a user that uses a terminal device and a content identifier that uniquely identifies the content piece; and a judging step of judging whether the content piece can be used based on the user information and the content identifier that have been received from the terminal device.

Yet another aspect of the present invention is a usage method for using a content piece. The usage method includes: an accepting step of accepting a content piece selected by a user; reading a usage rule corresponding to the accepted content piece from a storage medium; a checking step of checking whether the content piece is bound with the user based on the read usage rule; a transmitting step of, when the check unit determines that the content piece is bound with the user, transmitting user information and a content identifier to a server device; a receiving step of receiving information indicating whether the content piece can be used from the server device; and a using step of, when the received information indicates that the content piece can be used, using the content piece.

Yet another aspect of the present invention is an integrated circuit of a terminal device that uses a content piece. The integrated circuit includes: an acceptance unit that accepts a content piece selected by a user; a read unit that reads a usage rule corresponding to the accepted content piece from a storage medium; a check unit that checks whether the content piece is bound with the user based on the read usage rule; a transmission unit that, when the check unit determines that the content piece is bound with the user, transmits the user information and the content identifier to a server device; a reception unit that receives information indicating whether the content piece can be used from the server device; and a usage unit that, when the received information indicates that the content piece can be used, uses the content piece.

Yet another aspect of the present invention is a terminal device that uses a content piece. The terminal device includes: an acceptance unit that accepts a content piece selected by the user; a read unit that reads a usage rule corresponding to the accepted content piece from a storage medium; a check unit that checks whether the content piece is bound with the user based on the read usage rule; a display unit that, when the check unit determines that the content piece is bound with the user, displays a screen that prompts the user to input user information; a calculation unit that calculates association information based on the user information input by the user; a comparison unit that compares the calculated association information with association information included in the read usage rule; and a usage unit that, when the two pieces of the association information match as a result of the comparison, uses the content piece.

The association information may be generated by utilizing any one of a server device identifier that uniquely identifies a server device and a service identifier that uniquely identifies a service that provides a content piece, in addition to the user information.

The terminal device may include a display unit that displays a content list of content pieces stored in the storage medium, and the display unit may distinguishably display content pieces bound with users and content pieces not bound with users.

Yet another aspect of the present invention is a usage method for using a content piece. The usage method includes: an accepting step of accepting a content piece selected by a user; a reading step of reading a usage rule corresponding to the accepted content piece from a storage medium; a checking step of checking whether the content piece is bound with the user based on the read usage rule; a displaying step of, when the check unit determines that the content piece is bound with the user, displaying a screen that prompts the user to input user information; a calculating step of calculating association information based on the user information input by the user; a comparing step of comparing the calculated association information with association information included in the read usage rule; and a using step of, when the two pieces of the association information match as a result of the comparison, using the content piece.

Yet another aspect of the present invention is an integrated circuit of a terminal device that uses a content piece. The integrated circuit includes: an acceptance unit that accepts a content piece selected by a user; a read unit that reads a usage rule corresponding to the accepted content piece from a storage medium; a check unit that checks whether the content piece is bound with the user based on the read usage rule; a display unit that, when the check unit determines that the content piece is bound with the user, displays a screen that prompts the user to input user information; a calculation unit that calculates association information based on the user information input by the user; a comparison unit that compares the calculated association information with association information included in the read usage rule; and a usage unit that, when the two pieces of the association information match as a result of the comparison, uses the content piece.

Yet another aspect of the present invention is a terminal device that uses a content piece. The terminal device includes: an acceptance unit that accepts a content piece selected by a user; a read unit that reads a usage rule corresponding to the accepted content piece from a storage medium; a check unit that checks whether the content piece is bound with the user based on the read usage rule; a storage unit that stores therein association information bound with the user; a comparison unit that compares, when the check unit determines that the content piece is bound with the user, the stored association information with association information stored in the read usage rule; and a usage unit that, when the two pieces of the association information match as a result of the comparison, uses the content piece.

Yet another aspect of the present invention is a usage method for using a content piece. The usage method includes: an accepting step of accepting a content piece selected by a user; a reading step of reading a usage rule corresponding to the accepted content piece from a storage medium; a checking step of checking whether the content piece is bound with the user based on the read usage rule; a storing step of storing therein association information bound with the user; a comparing step of, when the check unit determines that the content piece is bound with the user, comparing the stored association information with association information stored in the read usage rule; and a using step of, when the two pieces of the association information match as a result of the comparison, using the content piece.

Yet another aspect of the present invention is an integrated circuit of a terminal device that uses a content piece. The integrated circuit includes: an acceptance unit that accepts a content piece selected by a user; a read unit that reads a usage rule corresponding to the accepted content piece from a storage medium; a check unit that checks whether the content piece is bound with the user based on the read usage rule; a storage unit that stores therein association information bound with the user; a comparison unit that compares, when the check unit determines that the content piece is bound with the user, the stored association information with association information stored in the read usage rule; and a usage unit that, when the two pieces of the association information match as a result of the comparison, uses the content piece.

INDUSTRIAL APPLICABILITY

According to the content distribution system of the present invention, it is possible to bind the content license with users. Therefore, the content distribution system has the advantageous effect of providing content according to a licensing scheme that achieves a proper balance between the protection of content provider's rights and user convenience. As a result, it is useful as technology for managing permission for a user to use digital content.

REFERENCE SIGNS LIST

10*a* content distribution system
100*a* server device
600*a* storage medium
700*b* playback device
10*b* content distribution system
100*b* server device
500*b* download device
600*b* memory card
700*b* playback device
10*c* content distribution system
100 content production device
200 key issuing device
300 content distribution device
400 key distribution device
500 terminal device
600 storage medium device
700 permission management device
10*d* content distribution system
3401 server device
3402 terminal device
3403 storage medium device
10*e* content distribution system
4101 server device
4102 terminal device
3403 storage medium device
10*f* content distribution system
4701 terminal device
3403 storage medium device

The invention claimed is:

1. A playback device, comprising:

a first acquisition unit that acquires, from a recording medium, a binding flag corresponding to a content, the recording medium storing the content and the binding flag, the binding flag indicating whether the content is bound with a user or the recording medium;

a first judgment unit that judges whether the binding flag indicates that the content is bound with the user or that the content is bound with the recording medium and switches between a first determination mode and a second determination mode in accordance with a result of the judgment, the first determination mode for determining whether or not playback of the content is permitted and being used when the content is bound with the user, and the second determination mode for determining whether or not playback of the content is permitted and being used when the content is bound with the recording medium;

an input receiving unit that, when the content is bound with the user, receives unique information for the content from the user, the unique information being specific to the user;

a second judgment unit that, when the content is bound with the user, judges whether or not playback of the content by the user is permitted, the judgment executed by using the unique information; and a playback unit that, when the content is bound with the user and the playback of the content by the user is permitted, and when the content is bound with the recording medium, acquires the content from the recording medium and plays back the content, wherein the first determination mode includes the reception executed by the input receiving unit and the judgment executed by the second judgment unit, in the second determination mode, playback of the content stored in the recording medium is permitted, and the recording medium stores the content and first binding information in an associated state, the first binding information being generated by using the unique information that identifies the user who is permitted to play back the content, and the playback device further comprises:

a generation unit that generates second binding information for the content by using the unique information that has been received, wherein the second judgment unit judges whether or not the first binding information and the second binding information match, when the first binding information and the second binding information match, the second judgment unit judges that playback of the content by the user is permitted, and when the first binding information and the second binding information do not match, the second judgment unit judges that playback of the content by the user is not permitted.

2. A playback device, comprising:

a first acquisition unit that acquires, from a recording medium, a binding flag corresponding to a content, the recording medium storing the content and the binding flag, the binding flag indicating whether the content is bound with a user or the recording medium;

a first judgment unit that judges whether the binding flag indicates that the content is bound with the user or that the content is bound with the recording medium and switches between a first determination mode and a second determination mode in accordance with a result of the judgment, the first determination mode for determining whether or not playback of the content is permitted and being used when the content is bound with the user, and the second determination mode for determining whether or not playback of the content is permitted and being used when the content is bound with the recording medium;

an input receiving unit that, when the content is bound with the user, receives unique information for the content from the user, the unique information being specific to the user;

a second judgment unit that, when the content is bound with the user, judges whether or not playback of the content by the user is permitted, the judgment executed by using the unique information; and a playback unit that, when the content is bound with the user and the playback of the content by the user is permitted, and when the content is bound with the recording medium, acquires the content from the recording medium and plays back the content, wherein the first determination mode includes the reception executed by the input receiving unit and the judgment executed by the second judgment unit, in the second determination mode, playback of the content stored in the recording medium is permitted, the unique information is a user identifier and a password which are assigned to the user, the recording medium stores a plurality of binding flags and a plurality of contents associated one-to-one with the plurality of binding flags, the plurality of contents managed by using folders, when the playback device permits the user to log in by using the unique information, the playback device displays both objects indicating the folders to which contents that are bound with the user belong and objects indicating the folders to which contents that are bound with the recording medium belong, by using the plurality of binding flags associated with the plurality of contents, and when the playback device does not permit the user to log in by using the unique information, the playback device displays only objects indicating the folders to which the contents that are bound with the recording medium belong by using the plurality of binding flags associated with the plurality of contents.

* * * * *